(12) United States Patent
Wang et al.

(10) Patent No.: US 10,318,339 B2
(45) Date of Patent: Jun. 11, 2019

(54) METHOD OF OPERATING A MEMORY SYSTEM, THE MEMORY SYSTEM, AND A MEMORY CONTROLLER

(71) Applicant: Samsung Electronics Co., Ltd., Suwon-si, Gyeonggi-do (KR)

(72) Inventors: Hongmoon Wang, Suwon-si (KR); Jun Kil Ryu, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 97 days.

(21) Appl. No.: 15/343,905

(22) Filed: Nov. 4, 2016

(65) Prior Publication Data

US 2017/0052815 A1 Feb. 23, 2017

Related U.S. Application Data

(62) Division of application No. 14/095,335, filed on Dec. 3, 2013, now Pat. No. 9,501,401.

(30) Foreign Application Priority Data

Mar. 15, 2013 (KR) .......................... 10-2013-0028054

(51) Int. Cl.
*G06F 9/46* (2006.01)
*G06F 3/06* (2006.01)
(Continued)

(52) U.S. Cl.
CPC ............ *G06F 9/467* (2013.01); *G06F 3/0619* (2013.01); *G06F 3/0656* (2013.01);
(Continued)

(58) Field of Classification Search
None
See application file for complete search history.

(56) References Cited

U.S. PATENT DOCUMENTS 4,080,651 A 3/1978 Cronshaw et al.
4,365,312 A 12/1982 Nakano et al.
(Continued)

FOREIGN PATENT DOCUMENTS

CN 1536579 A 10/2004
CN 102760100 A 10/2012
(Continued)

*Primary Examiner* — Denise Tran
(74) *Attorney, Agent, or Firm* — Harness, Dickey & Pierce, P.L.C.

(57) ABSTRACT

In one embodiment, the method includes buffering, under control of a memory controller, received data and an associated program entity in a buffer. The program entity includes first address information and second address information, the first address information indicates an address of the buffer storing the received data, and the second address information indicates an address in the memory to store the received data. The method further includes storing, at the memory controller, management information. The management information includes program information, and the program information includes a pointer to the program entity in the buffer. The method also includes transferring the received data from the buffer to the memory based on the management information and the program entity.

17 Claims, 50 Drawing Sheets

(51) Int. Cl.
*G06F 12/02* (2006.01)
*G06F 13/16* (2006.01)

(52) U.S. Cl.
CPC .......... *G06F 3/0659* (2013.01); *G06F 3/0685* (2013.01); *G06F 12/0246* (2013.01); *G06F 13/16* (2013.01); *G06F 2212/1016* (2013.01); *G06F 2212/7202* (2013.01); *G06F 2212/7203* (2013.01)

(56) References Cited

U.S. PATENT DOCUMENTS

| | | |
|---|---|---|
| 5,530,673 A | 6/1996 | Tobita et al. |
| 5,644,699 A | 7/1997 | Yoshida |
| 6,381,176 B1 | 4/2002 | Kim et al. |
| 7,366,017 B2 | 4/2008 | Abraham |
| 8,270,214 B2 | 9/2012 | Shibata et al. |
| 8,391,062 B2 | 3/2013 | Jang |
| 2004/0202024 A1* | 10/2004 | Shinagawa .......... G11C 16/107 365/185.29 |
| 2008/0091871 A1 | 4/2008 | Bennett et al. |
| 2009/0089491 A1 | 4/2009 | Hatanaka et al. |
| 2010/0235568 A1* | 9/2010 | Inamura .................. G06F 1/30 711/103 |
| 2011/0199823 A1 | 8/2011 | Bar-or et al. |
| 2011/0222342 A1 | 9/2011 | Yoon et al. |
| 2012/0039120 A1 | 2/2012 | Yoon et al. |
| 2012/0173800 A1 | 7/2012 | Yoon et al. |
| 2012/0269018 A1 | 10/2012 | Shin et al. |
| 2013/0166825 A1 | 6/2013 | Kim et al. |

FOREIGN PATENT DOCUMENTS

| | | |
|---|---|---|
| JP | H0540702 A | 2/1993 |
| JP | H0728690 A | 1/1995 |
| JP | 2008-197981 A | 8/2008 |
| JP | 5660615 B2 | 1/2015 |

\* cited by examiner

METHOD OF OPERATING A MEMORY SYSTEM, THE MEMORY SYSTEM, AND A MEMORY CONTROLLER

CROSS-REFERENCE TO RELATED APPLICATIONS

This patent application is a divisional application of U.S. application Ser. No. 14/095,335 filed on Dec. 3, 2013, and claims priority under 35 U.S.C. § 119 of Korean Patent Application No. 10-2013-0028054, filed on Mar. 15, 2013, the entire contents of each of which are hereby incorporated by reference.

BACKGROUND

The inventive concepts described herein relate to a semiconductor device, and more particularly, relate to a memory controller and an operating method thereof.

A semiconductor memory device is a memory device which is fabricated using semiconductors such as silicon (Si), germanium (Ge), gallium arsenide (GaAs), indium phosphide (InP), and so on. Semiconductor memory devices are classified into volatile memory devices and nonvolatile memory devices.

The volatile memory devices may lose stored contents at power-off. The volatile memory devices include a static RAM (SRAM), a dynamic RAM (DRAM), a synchronous DRAM (SDRAM), and the like. The nonvolatile memory devices may retain stored contents even at power-off. The nonvolatile memory devices include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and so on.

A semiconductor memory may be used together with a memory controller, which is configured to control the semiconductor memory. The memory controller may be configured to control read, program, erase and background operations of the semiconductor memory. The memory controller may have various operating methods for controlling the semiconductor memory to improve an operating performance of the semiconductor memory.

SUMMARY

At least one embodiment is directed to a method of operating a memory system including a memory.

In one embodiment, the method includes buffering, under control of a memory controller, received data and an associated program entity in a buffer. The program entity includes first address information and second address information, the first address information indicates an address of the buffer storing the received data, and the second address information indicates an address in the memory to store the received data. The method further includes storing, at the memory controller, management information. The management information includes program information, and the program information includes a pointer to the program entity in the buffer. The method also includes transferring the received data from the buffer to the memory based on the management information and the program entity.

In one embodiment, the transferring is performed over a plurality of program steps, where each program step refines the storage of the received data in the memory.

In one embodiment, the received data includes least significant bit page data and most significant bit page data. In another embodiment, the received data also includes intermediate significant bit page data.

In one embodiment, the method further includes receiving first page data and second page data associated with a first logical address. The first page data represents least significant page data. The second page data represents most significant page data. Here, the buffering buffers the first page data and the second page data as the received data.

In one embodiment, the transferring accesses the received data using the first address information for each program step.

In one embodiment, the storing includes storing the pointer in one of a plurality of stages of a program queue based on the program step of the transferring.

In one embodiment, the plurality of program steps includes first, second and third program steps, and the plurality of stages includes first, second and third program stages. In one embodiment, the transferring performs the first program step if the pointer is stored in the first stage, performs the second program step if the pointer is stored in the second stage, and performs the third program step if the pointer is stored in the third stage. In one embodiment, the transferring includes storing a first command associated with first program step in a memory manager of the memory controller based on the program entity if the pointer is stored in the first stage, storing a second command associated with the second program step in the memory manager of the memory controller based on the program entity if the pointer is stored in the second stage, and storing a third command associated with the third program step in the memory manager of the memory controller based on the program entity if the pointer is stored in the third stage. In one embodiment, the transferring includes performing the first, second and third program steps, by the memory manager, based on the first, second and third commands, respectively.

In one embodiment, the method further includes triggering a roll back operation if a desired condition is met. The roll back operation is performed for the pointer if one of the first, second and third commands is stored at the memory manager and the stored command has not been completed. The roll back operation includes moving the pointer from a current stage of the plurality of stages to a previous stage of the plurality of stages.

In one embodiment, the first, second and third program stages each include more than one pointer entry slot for storing a pointer.

In one embodiment, the plurality of program stages includes at least one additional stage.

In one embodiment, the storing includes moving the pointer from the first program stage to the second program stage after the first program step, moving the pointer from the second program stage to the third program stage after the second program step, and moving the pointer from the third program stage to the additional program stage after the third program step.

In one embodiment, the method further includes releasing the pointer from the program queue once a desired condition has been met after the pointer is stored in the additional program stage. For example, the desired condition may be that a threshold number of pointers are stored in the additional stage.

In one embodiment, releasing the pointer from the program queue after the pointer is stored in the additional stage.

In one embodiment, the method includes reading the received data from the buffer in response to a read request until the pointer is released.

In one embodiment, the method includes performing a roll back operation if a desired condition is met. The roll back operation includes moving the pointer from a current stage of the plurality of stages to a previous stage of the plurality of stages.

In one embodiment, the method further includes allocating the program queue from a program queue pool.

In one embodiment, the first, second and third program steps program the memory with the received data, and the first program step is associated with a fewer number of threshold states than the third program step.

In one embodiment, the first program step is a 1-step program, the second program step is a course program, and the third program step is a fine program.

In one embodiment, the buffering buffers at least first and second received data and corresponding first and second program entities in the buffer, the storing stores first and second pointers for the first and second program entities, respectively, and the transferring performs a first program step for transferring the second received data before performing a second program step for transferring the first received data.

In one embodiment, the buffering buffers a plurality of received data, and the storing stores a plurality of pointers in one of a plurality of stages of a program queue. Each of the plurality of pointers is associated with a respective one of the plurality of received data, and the plurality of stages includes stages respectively associated with each of the plurality of program steps. The transferring performs respective ones of the plurality of program steps for the plurality of received data based on which of the plurality of stages the associated pointer is stored. In one embodiment, the storing includes managing the movement of the plurality of pointers between the plurality of stages. In one embodiment, the transferring transfers the plurality of received data from the buffer to the memory in an order according to a transfer protocol. The transfer protocol determines the order based on which of the plurality of stages the plurality of pointers are stored.

In one embodiment, the buffering, the storing and the transferring are performed based on a state machine executed at the memory controller.

In one embodiment, the buffering buffers the received data and the associated program entity in a dynamic random access memory, the storing stores the management information in a static random access memory, and the transferring transfer the received data from the dynamic random access memory to a non-volatile memory.

In one embodiment, the management information includes a command received from an external device with respect to the received data, an address received from the external device with respect to the received data, a logical address of the received data in the buffer, and a physical address of the received data in the buffer.

In one embodiment, the buffering includes determining if a logical address received from an external device in association with new data matches a logical address associated with the received data, and performing an update process if a match is determined. The update process includes determining if the new data is valid and a same size as the received data. And if the new data is valid and the same size, the buffering update process includes buffering the new data as newly received data in the buffer. If the new data is not both valid and the same size as the received data, the buffering update process includes combining the new data with a portion of the received data to produce combined data, and buffering the combined data as newly received data in the buffer.

In one embodiment, the buffering includes generating the program entity. Here, the generating may generate the program entity after buffering the received data. For example, the generating generates the program entity based on a command and address received from an external device.

In another embodiment, the method includes receiving a set of page data at a buffer, and receiving, at the buffer, a program entity associated with the set of page data from a memory controller. The program entity includes first address information and second address information, the first address information indicates an address of the buffer storing the set of page data, the second address information indicates an address in the non-volatile memory to store the set of page data. The method further includes performing a plurality of program steps on the non-volatile memory to store the set of page data in the non-volatile memory.

In one embodiment, the method further includes receiving a command at a memory manager of the non-volatile memory. The command indicates one of the program steps and the second address information. Here, the performing performs the one of the plurality of program steps based on the command.

In one embodiment, the method further includes reading, by a processor, the program entity; and sending, by the processor, the command to the memory manager.

In one embodiment, the method further includes reading, by the processor, management information from a local memory before reading the program entity, the memory controller including the local memory. For example, the management information may indicates a location of the program entity in the buffer.

At least one embodiment is also directed to a memory system.

In one embodiment, the memory system includes a non-volatile memory, a buffer and a processor of a memory controller. The buffer is configured to store a plurality of sets of page data, and is configured to store a plurality of program entities. Each of the plurality of program entities is associated with a different one of the plurality of sets of page data. The processor of the memory controller is configured such that at least two different program entities of the plurality of program entities are sequentially accessed. The processor is configured to send commands to a memory manager of the memory controller based on the accessed program entities. The memory manager is configured to store page data from the plurality of sets of page data in the non-volatile memory based on the commands.

In another embodiment, the memory system includes a non-volatile memory, a buffer and a processor of a memory controller. The buffer is configured to store a plurality of sets of page data, and is configured to store a plurality of program entities. Each of the plurality of program entities is associated with a different one of the plurality of sets of page data. The processor of the memory controller is configured to read management information from a local memory. The memory controller includes the local memory. The processor is configured to access program information from the program entities and send commands based on the management information to a memory manager of the memory controller. The memory manager is configured to store page data from the plurality of sets of page data in the non-volatile memory based on the commands. The processor is configured such that at least two different program entities of the plurality of program entities are sequentially accessed.

In yet another embodiment, the memory system includes a non-volatile memory, a buffer and a processor of a memory controller. The buffer is configured to store a plurality of sets of page data, and is configured to store a plurality of program entities. Each of the plurality of program entities is associated with a different one of the plurality of sets of page data. The processor of the memory controller is configured to read management information from a local memory. The memory controller includes the local memory. The processor is configured to access program information from the program entities and send commands based on the management information to a memory manager of the memory controller. The memory manager is configured to store page data from the plurality of sets of page data in the non-volatile memory based on the commands. The processor is configured to send the commands such that (i) the memory manager programs a set of page data in a plurality of program steps, and (ii) at least two sequentially performed program steps are associated with different sets of pages data.

In another embodiment, the memory system includes a local memory of a memory controller that is configured to store management information. The memory system also includes a buffer memory divided into a data area and program information area. The data area is configured to store sets of page data, and the program information area is configured to store program information for each of the sets of page data. The program information for each of the sets of page data indicates an address in a non-volatile memory for storing the set of page data. A processor of the memory controller is configured to access the local memory and the buffer memory.

At least one embodiment is also directed to a memory controller.

In one embodiment, the memory controller is configured to store received data and an associated program entity in a buffer. The program entity includes first address information and second address information. The first address information indicates an address of the buffer storing the received data, and the second address information indicates an address in a non-volatile memory to store the received data. The memory controller is configured to store management information in a local memory of the memory controller. The management information includes program information, and the program information includes a pointer to the program entity in the buffer. The memory controller is configured to transfer the received data from the buffer to the non-volatile memory based on the management information and the program entity.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
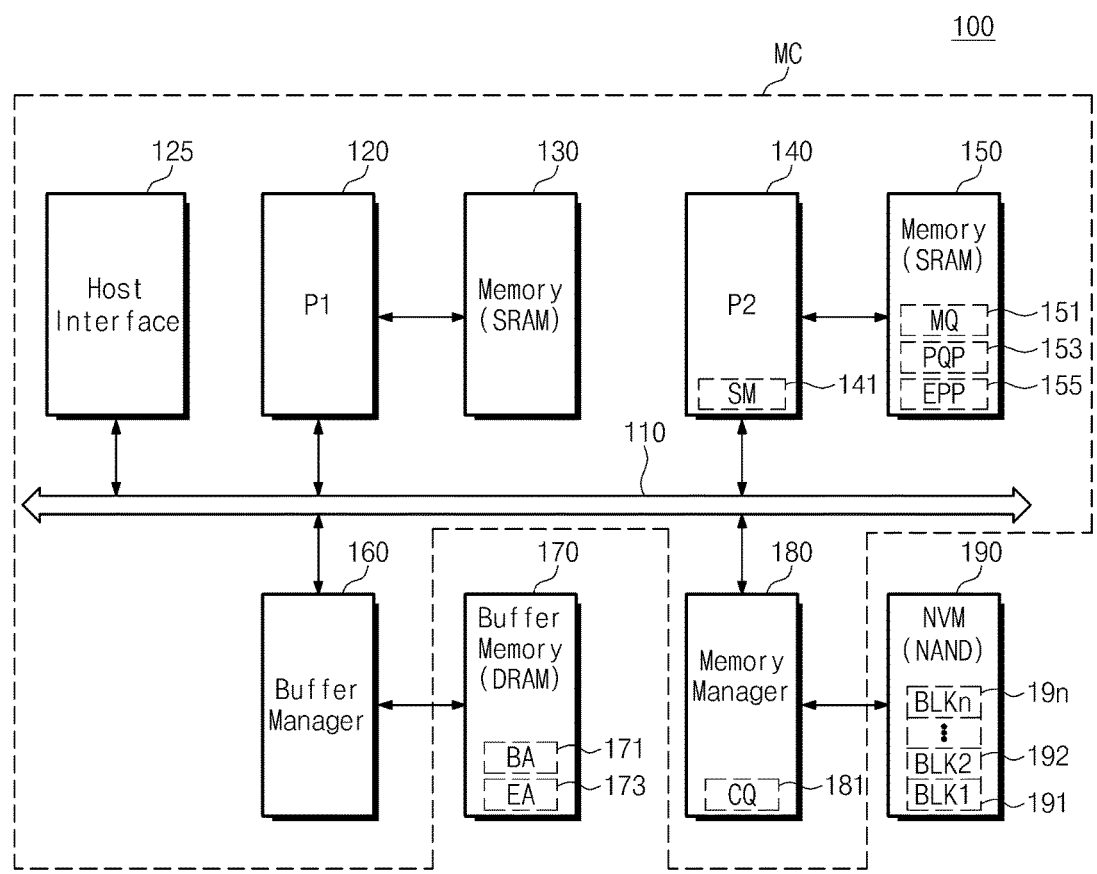
FIG. 1 is a block diagram schematically illustrating a memory system according to an embodiment of the inventive concepts.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a memory system 100 according to an embodiment of the inventive concepts. Referring to FIG. 1, a memory system 100 includes a bus 110, a first processor 120, a host interface 125, a first memory 130, a second processor 140, a second memory 150, a buffer manager 160, a buffer memory 170, a memory manager 180, and a nonvolatile memory 190. While operations will be described with respect to first and second processors 120 and 140, it will be understood that the operation could be performed by a single processor, or by more than two processors. Also, it will be understood that first and second memories 130 and 150 may be instead be a single memory.

The bus 110 provides a channel between constituent elements of the memory system 100. The bus 110 may operate based on at least one of various standards such as AMBA, AHB, and the like.

The first processor 120 processes communications with an external device (e.g., a host). For example, the first processor 120 may process a command, an address, and data received through the host interface 125 from the external device. The first processor 120 may send the command and address received through the host interface 125 from the external device to the second processor 140. The first processor 120 may control storing the data received through the host interface 125 in the buffer memory 170 using the buffer manager 160.

For example, when data is received through the host interface 125, the first processor 120 may allocate an area of the buffer memory 170 where data is to be stored. The data received through the host interface 125 is stored in the allocated storage area of the buffer memory 170 using the buffer manager 160. For example, when the command and address is received through the host interface 125, the first processor 120 may receive the address and the command from the host interface 125. The first processor 120 may store the received address and command in the first memory 130. After the data received through the host interface 125 is stored at the buffer memory 170, the host interface 125 may send a signal informing that a request corresponding to the command is completed, to the external device. After the data received through the host interface 125 is stored in the buffer memory 170, the first processor 120 may send the address and the command stored at the first memory 130 to the second memory 150. The first processor 120 may convert the address and the command stored at the first memory 130 to have a data structure for the second processor 140, and may transfer the converted address and command to the second processor 140. The converted address may include a logical address for the stored data in the buffer memory 170 and a physical address indicating where the stored data is located in the buffer memory 170.

The host interface 125 may communicate with the external device according to a control of the first processor 120. The host interface 125 may store data received from the external device in the buffer memory 170 using the buffer manager 160. The host interface 125 may send a command or address received from the external device to the first processor 120.

The first memory 130 may be a working memory of the first processor 120. The first memory 130 may be an SRAM. The first memory 130 may be integrated in a semiconductor chip with the first processor 120. The first memory 130 may be integrated in the same hardware block as the first processor 120 in a semiconductor chip. The first memory 130 may be an embedded SRAM which is integrated with the first processor 120.

The second processor 140 operates based on the converted command and address received from the first processor 120. Based on the received command or address, the second processor 140 may control read, program, erase or background operation of the nonvolatile memory 190 using the memory manager 180. For example, the nonvolatile memory 190 may be a flash memory, and the second processor 140 may be configured to control an operation of the flash memory.

The second processor 140 may include a state machine 141. The state machine 141 may be hardware implemented within the second processor 140 or software executed by the second processor 140. The state machine 141 may control a program operation of the nonvolatile memory 190. In example embodiments, the state machine 141 may control a program operation of the nonvolatile memory 190, based on a program queue managed within the second memory 150.

The first and second processors 120 and 140 may be hardware separated from each other. For example, first and second processor 120 and 140 may be integrated in a semiconductor chip, and may be formed of hardware blocks separated in the semiconductor chip. Alternatively, the first and second processor 120 and 140 may be semiconductor chips separated from each other.

The second processor 140 may include at least two or more processors. When the second processor 140 is formed of at least two or more processors, the second memory 150 may include at least two or more memories respectively corresponding to the at least two or more processors.

The second memory 150 may be a working memory of the second processor 140. The second memory 150 may include an SRAM. The second memory 150 may store information related to a message queue 151, a program queue pool 153, and an entity pointer pool 155.

The message queue 151 may be allocated to a specific storage area of the second memory 150. The message queue 151 may be configured to store a message (e.g., a command and an address) transferred from the first processor 120. The second processor 140 may manage a program queue stored at the second memory 150 and data stored at the buffer memory 170, based on a message (e.g., a command and an address) stored at the message queue 151, and may control a program operation of the nonvolatile memory 190 under the control of the state machine.

The program queue pool 153 may be allocated to a specific storage area of the second memory 150. The specific storage area may be a storage area prepared to assign the program queue. The second processor 140 may assign the program queue from the program queue pool 153, update the program queue or release the program queue, based on a message (e.g., a command and an address) stored at the message queue 151. The second processor 140 may control a program operation of the nonvolatile memory 190, based on the program queue under the control of the state machine.

The entity pointer pool 155 may be allocated to a specific storage area of the second memory 150. The specific storage area may be a storage area prepared to assign an entity pointer. The entity pointer may include information (e.g., an address, state information, etc.) on a program entity stored at an entity area 173 of the buffer memory 170. The second processor 140 may assign the entity pointer from the entity pointer pool 155, based on a message stored at the message queue 151. The allocated entity pointer may be stored at the program queue. The second processor 140 may manage or release the entity pointer, based on a message stored at the message queue 151 under the control of the state machine.

The buffer manager 160 controls the buffer memory 170 under a control of the first processor 120 or the second processor 140. The buffer manager 160 may control read or write operations of the buffer memory 170.

The buffer memory 170 may operate in response to a control of the buffer manager 160. The buffer memory 170 may be used to store data for the second processor 140 to control the nonvolatile memory 190 to perform a read operation, a program operation or an erase operation. The buffer memory 170 may include a DRAM. The buffer memory 170 may include a buffer area 171 and an entity area 173.

The buffer area 171 may store data received through the host interface 125 from the external device (e.g., a host). The buffer area 171 may store data in response to controls of the first processor 120 and the buffer manager 160.

The entity area 173 may store program entities. The program entities may include information (e.g., an address) of data stored at the buffer area 171 and information (e.g., an address) of the nonvolatile memory 190 at which the data stored at the buffer area 171 is to be stored. The entity area 173 may store program entities in response to controls of the second processor 140 and the buffer manager 160.

The memory manager 180 may control the nonvolatile memory 190 in response to control by the second processor 140. The memory manager 180 may control a read, a program, an erase or background operation of the nonvolatile memory 190.

The memory manager 180 includes a command queue 181. The command queue 181 may store a command (e.g., information associated with programming) in response to a control of the second processor 140. The memory manager 180 may control a read, a program, erase or background operation of the nonvolatile memory 190 based on a command (e.g., information associated with programming) stored at the command queue 181.

The nonvolatile memory 190 may operate in response to a control of the memory manager 180. The nonvolatile memory 190 may include a plurality of memory blocks 191 to 19n, each of which may include a plurality of memory cells (not shown). Memory cells in each memory block may be connected with word lines (not shown) and bit lines (not shown). For example, rows of memory cells in each memory block may be connected with the word lines, respectively. Columns of memory cells in each memory block may be connected with the bit lines, respectively.

Each of the memory cells may store two or more bits. In the event that each memory cell stores two bits, bits stored at each memory cell may be a least significant bit and a most significant bit. In the event that each memory cell stores three bits, bits stored at each memory cell may be a least significant bit, an intermediate bit, and a most significant bit. In the event that each memory cell stores four bits, bits stored at each memory cell may be a least significant bit, a first intermediate bit, a second intermediate bit, and a most significant bit. The number of bits stored at each memory cell may not be limited. Below, it assumed that each memory cell stores at least a significant bit, an intermediate bit, and a most significant bit.

In memory cells connected to a word line, each one bit stored at each memory cell may form a page. For example, LSBs stored at memory cells connected to the same word line may form an LSB page. Intermediate bits stored at memory cells connected to the same word line may form an intermediate page. MSBs stored at memory cells connected to the same word line may form an MSB page.

As will be described in greater detail below, the storing of these multiple pages at memory cells connected to the same wordline may be accomplished according to a direct reprogram method. The direct reprogram method includes a plurality of program steps, where each program step refines the storage of the received data in the memory.

Figure 42:
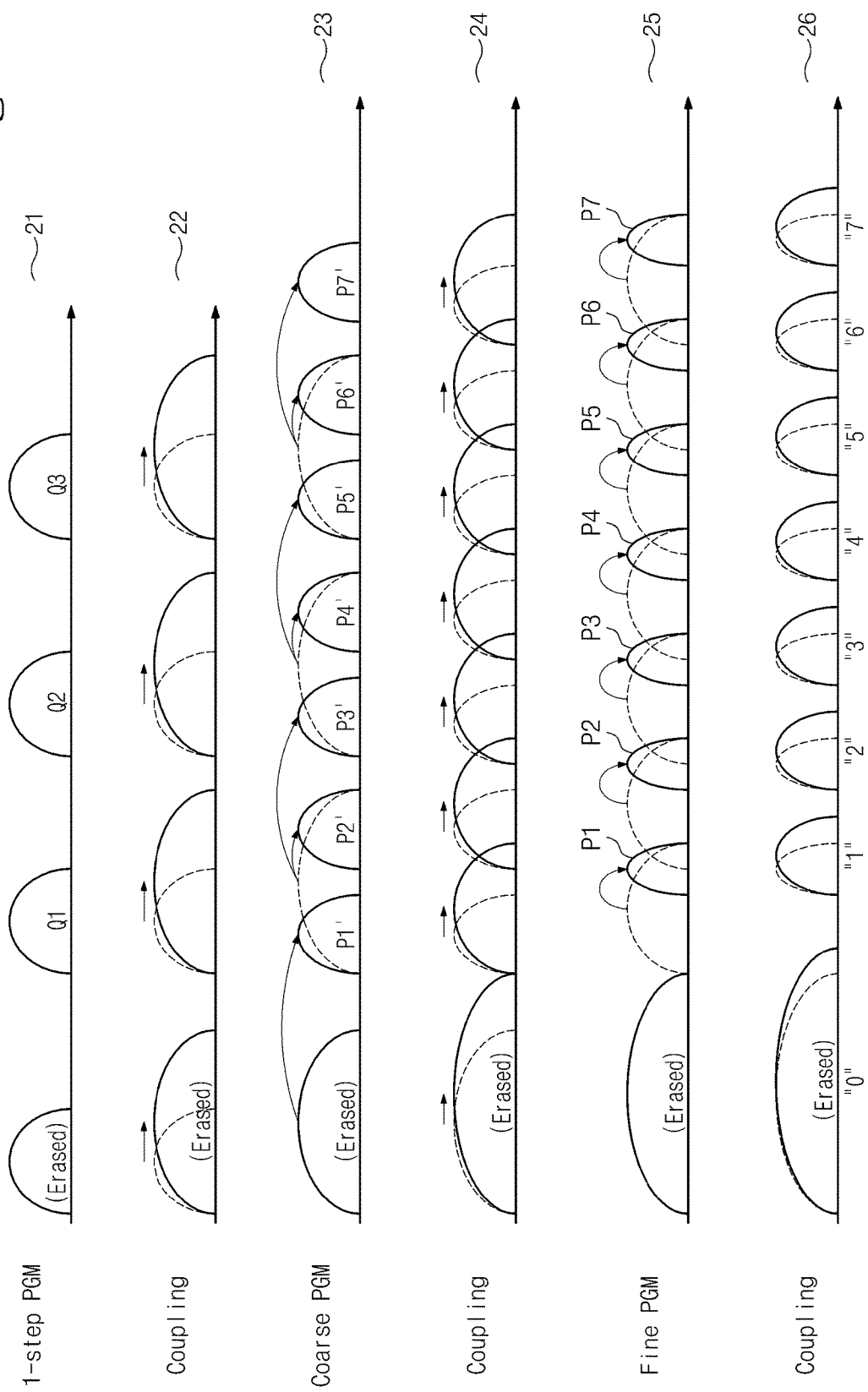
FIG. 42 is a diagram schematically illustrating a variation in threshold voltages of memory cells when a nonvolatile memory performs 1-step programming, coarse programming and fine programming.

As illustrated in FIG. 42, in one embodiment, the direct reprogram may be performed in an order of a 1-step programming, a coarse programming and a fine programming. In particular, FIG. 42 illustrates a variation in threshold voltages of memory cells when the 1-step programming, the coarse programming and the fine programming are performed. The 1-step programming, coarse programming and fine programming may have an increasingly improved precision in consideration of the coupling from an adjacent word line. The 1-step programming, coarse programming and fine programming may be performed based on data stored at a buffer memory 170, not data stored at a nonvolatile memory 190. Thus, when the 1-step programming, coarse programming and fine programming are sequentially performed, it is possible to prevent the coupling from an adjacent word line from being accumulated.

In example embodiments, a word line of the nonvolatile memory 190 may have three program addresses and three read addresses. The three program address may correspond to the 1-step programming, coarse programming and fine programming, respectively. At programming, the memory manager 180 may send one of the three program addresses and a program command to the nonvolatile memory 190. At reading, the memory manager 180 may send one of the three read addresses and a read command to the nonvolatile memory 190. The three read addresses may correspond to LSB, intermediate and MSB pages, respectively.

In example embodiments, a word line of the nonvolatile memory 190 may have a program address and three read addresses. At programming, the memory manager 180 may send one program address and a program command indicating 1-step programming, coarse programming or fine programming to the nonvolatile memory 190. At reading, the memory manager 180 may send one of the three read addresses and a read command to the nonvolatile memory 190. The three read addresses may correspond to LSB, intermediate and MSB pages, respectively.

The direct reprogramming will also be described in greater detail below.

In example embodiments, the nonvolatile memory 190 may be a NAND flash memory. However, the inventive concepts are not limited thereto. The nonvolatile memory 190 may include at least one of nonvolatile memories such as a phase-change RAM (PRAM), a magnetic RAM (MRAM), a resistive RAM (RRAM), a ferroelectric RAM (FRAM), and the like. Below, it is assumed that the nonvolatile memory 190 is a NAND flash memory.

In example embodiments, the bus 110, the first processor 120, the first memory 130, the second processor 140, the second memory 150, the buffer manager 160, and the memory manager 180 may form a memory controller MC for controlling the nonvolatile memory 190. The memory controller may be formed of a semiconductor package. The buffer memory 170 may be formed of another semiconductor package separated from the memory controller.

Figure 2:
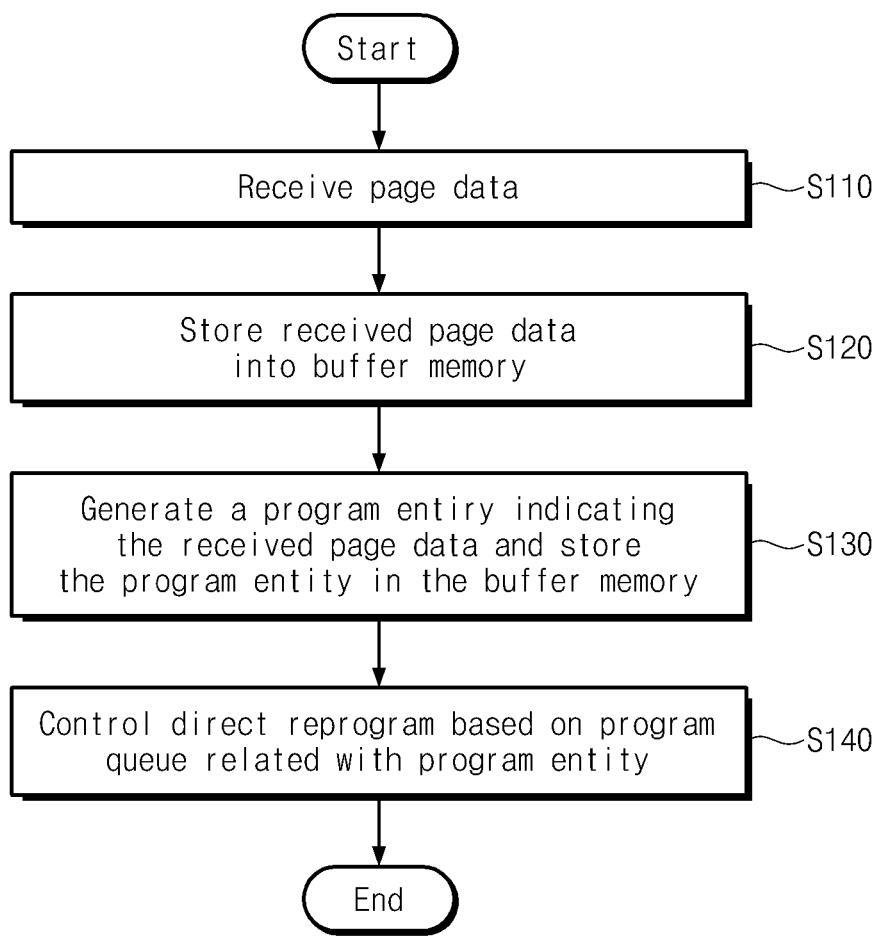
FIG. 2 is a flowchart illustrating an operating method of a memory controller according to an embodiment of the inventive concepts.

FIG. 2 is a flowchart illustrating an operating method of a memory controller according to an embodiment of the inventive concepts. In FIG. 2, an operating method for controlling a program operation of a nonvolatile memory 190 will be exemplarily shown. Referring to FIG. 2, in operation S110, page data may be received, for example, from a host device.

In operation S120, the received page data may be stored at a buffer memory 170.

In operation S130, a program entity indicating the received page data may be generated, and the generated program entity may be stored at the buffer memory 170. For example, a program entity may indicate the desired (or, alternatively, predetermined) number of page data of data stored at the buffer memory 170. The page data may be data programmed into one page of the nonvolatile memory 190. For example, the number of page data indicated by one program entity may be the number of page data programmed at memory cells connected to one word line.

In operation S140, direct reprogram of data may be controlled based on a program queue related to the program entity. For example, after all page data corresponding to the program entity generated in operation S130 are stored at the buffer memory 170, in operation S140, the direct reprogram may be executed.

The direct reprogram may be a program method in which memory cells connected to one word line of the nonvolatile memory 190 are programmed at least twice using data of pages (e.g., LSB, intermediate and MSB pages) corresponding to the one word line. The direct reprogram will be more fully described with reference to FIG. 43.

Figure 3:
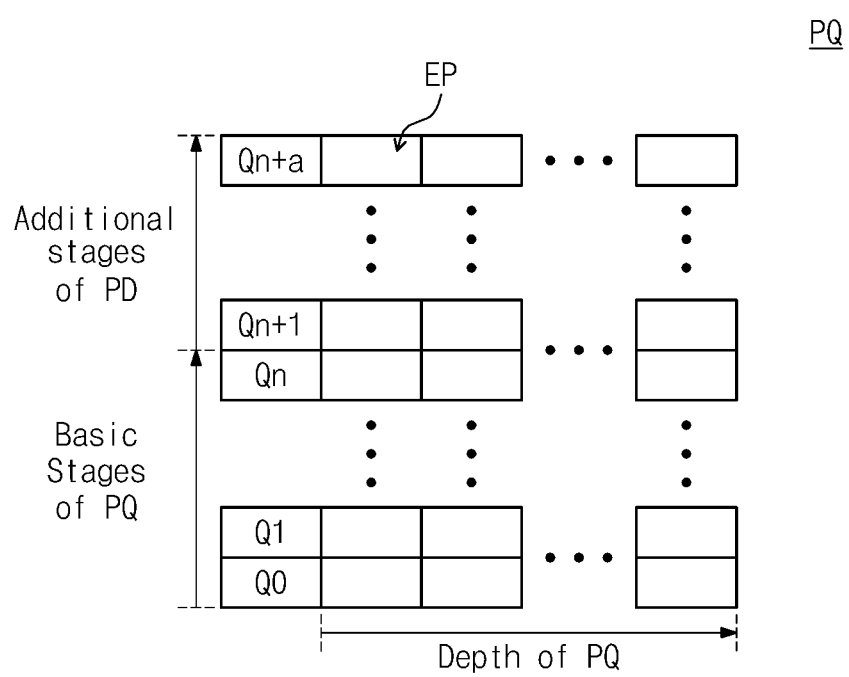
FIG. 3 is a diagram schematically illustrating a program queue.

FIG. 3 is a diagram schematically illustrating a program queue. Referring to FIGS. 1 and 3, a program queue PQ may be assigned from a program queue pool 153 when a new memory block is requested for reprogram. The program queue PQ may include a plurality of stages. For example, a plurality of queues may be assigned from the program queue pool 153. The plurality of queues assigned may form the stages of the program queue PQ, respectively.

A plurality of entity pointers EP may be registered (or, enqueued) at each stage of the program queue PQ. The number of entity pointers EP registered at each stage may form a depth of the program queue PQ. The depth of the program queue PQ may be adjusted according to a sort and an execution method of a program algorithm applied to a memory controller. For example, depths of the stages of the program queue PQ may be set to be different from each other.

The stages of the program queue PQ may include basic stages Q0 to Qn and additional stages Qn+1 to Qn+a. The basic stages Q0 to Qn may be stages essentially required when direct reprogram of a nonvolatile memory 190 is performed. For example, the number of basic stages Q0 to Qn may be the number of programs required to complete reprogram of memory cells connected to one word line when the direct reprogram is performed.

The additional stages Qn+1 to Qn+a may be additionally provided to improve an operating performance of the nonvolatile memory 190. The number of additional stages Qn+1 to Qn+a may be adjusted according to a sort and an execution method of a program algorithm applied to the memory controller MC.

For a simple and distinct description of the inventive concepts, it is assumed that basic stages are formed of three stages Q0 to Q2 and additional stage is formed of a stage QC. Also, it is assumed that a depth of the stages Q0 to Q2 and QC is 3.

Figure 4:
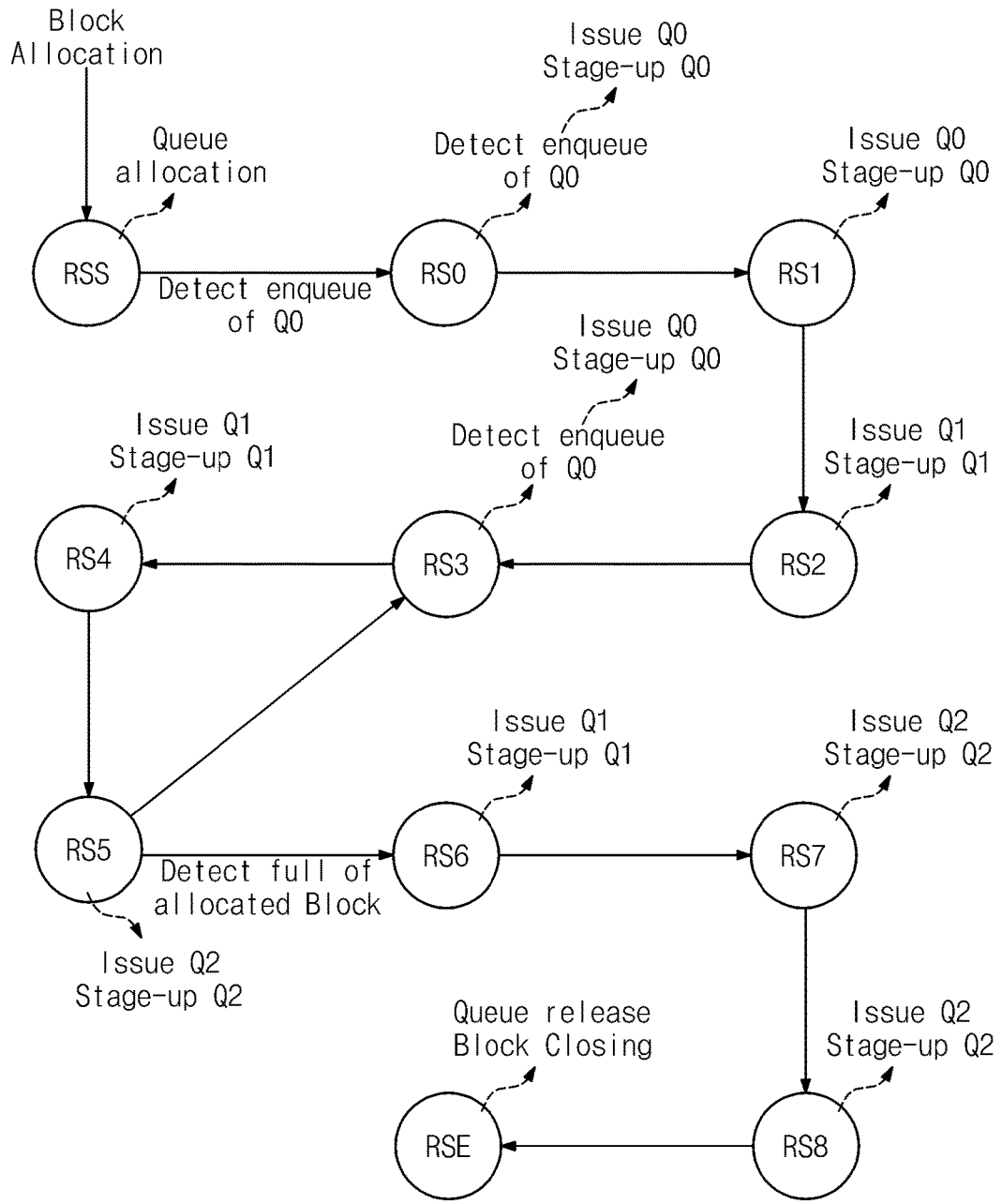
FIG. 4 is a state transition diagram illustrating an operating method of a second processor and a state machine 141.

FIG. 4 is a state transition diagram illustrating an operating method of the second processor 140 executing a state machine 141. Below, a general description of the state transition diagram is provided. However, the state transition diagram will be described in detail with respect to a specific example in FIGS. 6-29 and 31-41.

Referring to FIGS. 3 and 4, if a new memory block of the nonvolatile memory 190 is allocated, the state machine 141 may enter a reset state RSS. For example, if a command, an address and data to be programmed at a new memory block of a nonvolatile memory 190 are received, the new memory block may be allocated. At the reset state RSS, a program queue PQ may be allocated. The second processor 140 according to the state machine 141 may allocate the program queue PQ from a program queue pool 153 of a second memory 150. Namely, an available program queue from the pool is selected.

If enqueue is detected from the allocated program queue PQ, the state machine 141 may enter a $0^{th}$ state RS0. In detail, if enqueue is detected from a first stage Q0 of the allocated program queue PQ, the state machine 141 may enter a $0^{th}$ state RS0. Namely, enqueue detection is when an entity pointer is stored in the first stage Q0 of the program queue PQ.

At the $0^{th}$ state RS0, the state machine 141 may issue programming of data corresponding to a first entity pointer (e.g., a first enqueued entity pointer) of entity pointers existing at the first stage Q0 of the program queue PQ. The memory manager 180 may program the nonvolatile memory 190 in response to the program issue. An entity pointer corresponding to the program issue may be enqueued at a next stage (e.g., a second stage Q1). Afterwards, the state machine 141 may enter a $1^{st}$ state RS1. The state machine 141 may maintain the $1^{st}$ state RS1 until enqueue is detected from the first stage Q0 of the program queue PQ.

If enqueue is detected from the first stage Q0 of the allocated program queue PQ, at the $1^{st}$ stage RS1, the state machine 141 (i.e., the second processor 140) may issue programming of data corresponding to a first entity pointer (e.g., a first enqueued entity pointer) of entity pointers existing at the first stage Q0 of the program queue PQ. An entity pointer corresponding to the program issue may be enqueued at a next stage (e.g., the second stage Q1).

After a program issue and enqueue are performed in the $1^{st}$ state RS1, the state machine 141 may enter a $2^{nd}$ state RS2. At the $2^{nd}$ state RS2, the state machine 141 may issue programming of data corresponding to a first entity pointer (e.g., a first enqueued entity pointer) of entity pointers existing at the second stage Q1 of the program queue PQ. Then an entity pointer corresponding to the program issue may be enqueued at a next stage (e.g., a third stage Q2).

After a program issue and enqueue are performed at the $2^{nd}$ state RS2, the state machine 141 may enter a $3^{rd}$ state RS3. The state machine 141 may maintain the $3^{rd}$ state RS3 until enqueue is detected from the first stage Q0 of the program queue PQ.

If enqueue is detected from the first stage Q0 of the program queue PQ, at the $3^{rd}$ stage RS3, the state machine 141 may issue programming of data corresponding to a first entity pointer (e.g., a first enqueued entity pointer) of entity pointers existing at the first stage Q0 of the program queue PQ. An entity pointer corresponding to the program issue may be enqueued at a next stage (e.g., the second stage Q1).

After a program issue and enqueue are performed at the $3^{rd}$ state RS3, the state machine 141 may enter a $4^{th}$ state RS4. At the $4^{th}$ state RS4, the state machine 141 may issue programming of data corresponding to a first entity pointer (e.g., a first enqueued entity pointer) of entity pointers existing at the second stage Q1' of the program queue PQ. An entity pointer corresponding to the program issue may be enqueued at a next stage (e.g., the third stage Q2).

After a program issue and enqueue are performed at the $4^{th}$ state RS4, the state machine 141 may enter a $5^{th}$ state RS5. At the $5^{th}$ state RS5, the state machine 141 may issue programming of data corresponding to a first entity pointer (e.g., a first enqueued entity pointer) of entity pointers existing at the third stage Q2 of the program queue PQ. An entity pointer corresponding to the program issue may be enqueued at a next stage (e.g., an additional stage QC).

After a program issue and enqueue are performed at the $5^{th}$ state RS5, an operation of the state machine 141 may be diverged according to a state of the program queue PQ or a program state of a nonvolatile memory 190. If an allocated memory block is detected to be full, the state machine 141 may enter a $6^{th}$ state RS6. For example, if programming of the allocated memory block is completed using data stored at a buffer memory 170, the allocated memory block may be determined to be full.

In example embodiments, determining whether the allocated memory block is full may be made by an address of the nonvolatile memory 190 where data stored at the buffer memory 170 is programmed. In other example embodiments, determining whether the allocated memory block is full may be made on the basis of the number of word lines of the allocated memory block and the number of program operations executed at the allocated memory block.

If the allocated memory block is not full, the state machine 141 may enter the $3^{rd}$ state RS3. At the $3^{rd}$ state RS3, the state machine 141 may wait until enqueue is detected from the first state Q0 of the program queue PQ.

If the allocated memory block is full, the state machine 141 may enter the $6^{th}$ state RS6. At the $6^{th}$ stage RS6, the state machine 141 may issue programming of data corresponding to a first entity pointer (e.g., a first enqueued entity pointer) of entity pointers existing at the second stage Q1 of the program queue PQ. An entity pointer corresponding to the program issue may be enqueued at a next stage (e.g., the third stage Q2).

After a program issue and enqueue are performed at the $6^{th}$ state RS6, the state machine 141 may enter a $7^{th}$ state RS7. At the $7^{th}$ state RS7, the state machine 141 may issue programming of data corresponding to a first entity pointer (e.g., a first enqueued entity pointer) of entity pointers existing at the third stage Q2 of the program queue PQ. An entity pointer corresponding to the program issue may be enqueued at a next stage (e.g., an additional stage QC).

After a program issue and enqueue are performed at the $7^{th}$ state RS7, the state machine 141 may enter an $8^{th}$ state RS8. At the $8^{th}$ state RS8, the state machine 141 may issue programming of data corresponding to a first entity pointer (e.g., a first enqueued entity pointer) of entity pointers existing at the third stage Q2 of the program queue PQ. An entity pointer corresponding to the program issue may be enqueued at a next stage (e.g., an additional stage QC).

After a program issue and enqueue are performed at an $8^{th}$ state RS8, the state machine 141 may enter an end state RSE. At the end state RSE, the state machine 141 may release the allocated program queue PQ and close the allocated block.

Figure 5:
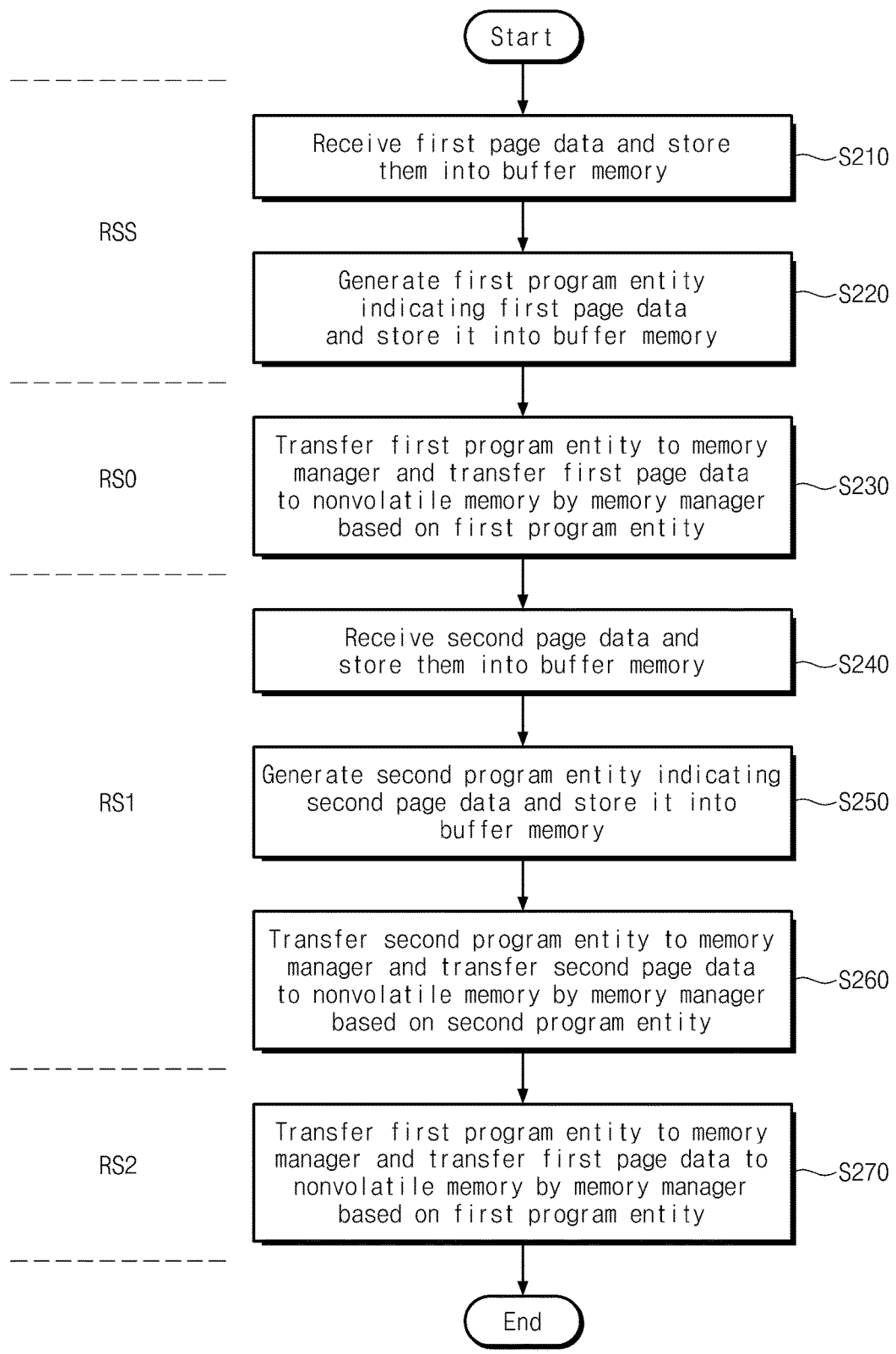
FIG. 5 is a flowchart illustrating an operating method of a memory controller according to another embodiment of the inventive concepts.

FIG. 5 is a flowchart illustrating an operating method of a memory controller according to another embodiment of the inventive concepts. Referring to FIGS. 1 and 3 to 5, in operation S210, first page data may be received, and the first page data received may be stored in a buffer memory 170. The first page data may be data to be stored at memory cells connected with a first word line of a nonvolatile memory 190. The first page data may be LSB page data. As the first page data to be stored at memory cells connected with the first word line is received, a state machine 141 may allocate a program queue PQ.

In operation S220, a first program entity indicating the first page data stored in the buffer memory 170 may be generated. The first program entity may be stored into the buffer memory 170.

Afterwards, page data corresponding to the first page data (e.g., the LSB page data) may be received. For example, intermediate and MSB page data corresponding to the first page data may be received. The received page data may be stored in the buffer memory 170. As the received page data is stored at the buffer memory 170, the first program entity corresponding to the first page data may be updated. The first program entity may be updated to further include information on the intermediate and MSB page data. This will be described in greater detail below with respect to FIGS. 6-29.

If all page data to be programmed at the memory cells of the first word line is received, the first program entity may be enqueued at the program queue PQ.

Operations S210 and S220 may correspond to a reset state RSS of the state machine 141. As the first program entity is enqueued at the program queue PQ, the state machine 141 may enter a $0^{th}$ state RS0.

In operation S230, program information of the first program entity may be sent to the memory manager 180. For example, after the first program entity is enqueued to the program queue PQ, the program information of the first program entity may be sent to the memory manager 180. Data (e.g., first page data) to be programmed at memory cells of the first word line may be transferred to the nonvolatile memory 190 by the memory manager 180, based on the program information of the first program entity.

Operation S230 may correspond to a $0^{th}$ state RS0 of the state machine 141. The state machine 141 may issue programming of the memory cells connected with the first word line, based on the program information of the first program entity. Then the state machine 141 may enqueue the first program entity at a next stage of the program queue PQ. As programming based on the first program entity is issued, the state machine 141 may enter the $1^{st}$ state RS1.

In operation S240, if second page data is received, it may be stored in the buffer memory 170. The second page data may be data to be programmed at memory cells of a second word line in the nonvolatile memory 190. The second page data may be LSB page data.

In operation S250, a second program entity indicating the second page data stored at the buffer memory 170 may be generated. The second program entity may be stored in the buffer memory 170.

Afterwards, page data corresponding to the second page data may be received. For example, intermediate and MSB data corresponding to the second page data may be received. The received page data may be stored at the buffer memory 170. As the received page data is stored at the buffer memory 170, the second program entity corresponding to the second page data may be updated. The second program entity may be updated to further include information on the intermediate and MSB page data.

If all page data to be programmed at the memory cells of the second word line is received, the second program entity may be enqueued at the program queue PQ.

In operation S260, program information of the second program entity may be sent to a memory manager 180. For example, as the second program entity is enqueued at the program queue PQ, the program information of the second program entity may be sent to the memory manager 180. Data (e.g., second page data) to be programmed at memory cells of the second word line may be transferred to the nonvolatile memory 190 by the memory manager 180, based on the program information of the second program entity. Operations S240 to S260 may correspond to the $1^{st}$ state RS1 of the state machine 141.

The state machine 141 may enqueue the second program entity at a next stage of the program queue PQ. As programming based on the second program entity is issued, the state machine 141 may enter a $2^{nd}$ state RS2.

In operation S270, program information of the first program entity may be sent to the memory manager 180. Data (e.g., all page data including the first page data) to be programmed at the memory cells of the first word line may be sent to the nonvolatile memory 190 by the memory manager 180, based on the first program entity.

Operation S270 may correspond to the $2^{nd}$ state RS2 of the state machine 141. The state machine 141 may issue programming of the memory cells connected with the first word line. The state machine 141 may enqueue the first program entity at a next stage of the program queue PQ. As programming based on the first program entity is issued, the state machine 141 may enter a $3^{rd}$ state RS3.

FIGS. 6 to 29 are diagrams illustrating a data processing operation of a memory system 100 according to an operating method illustrated in FIG. 5.

Figure 6:
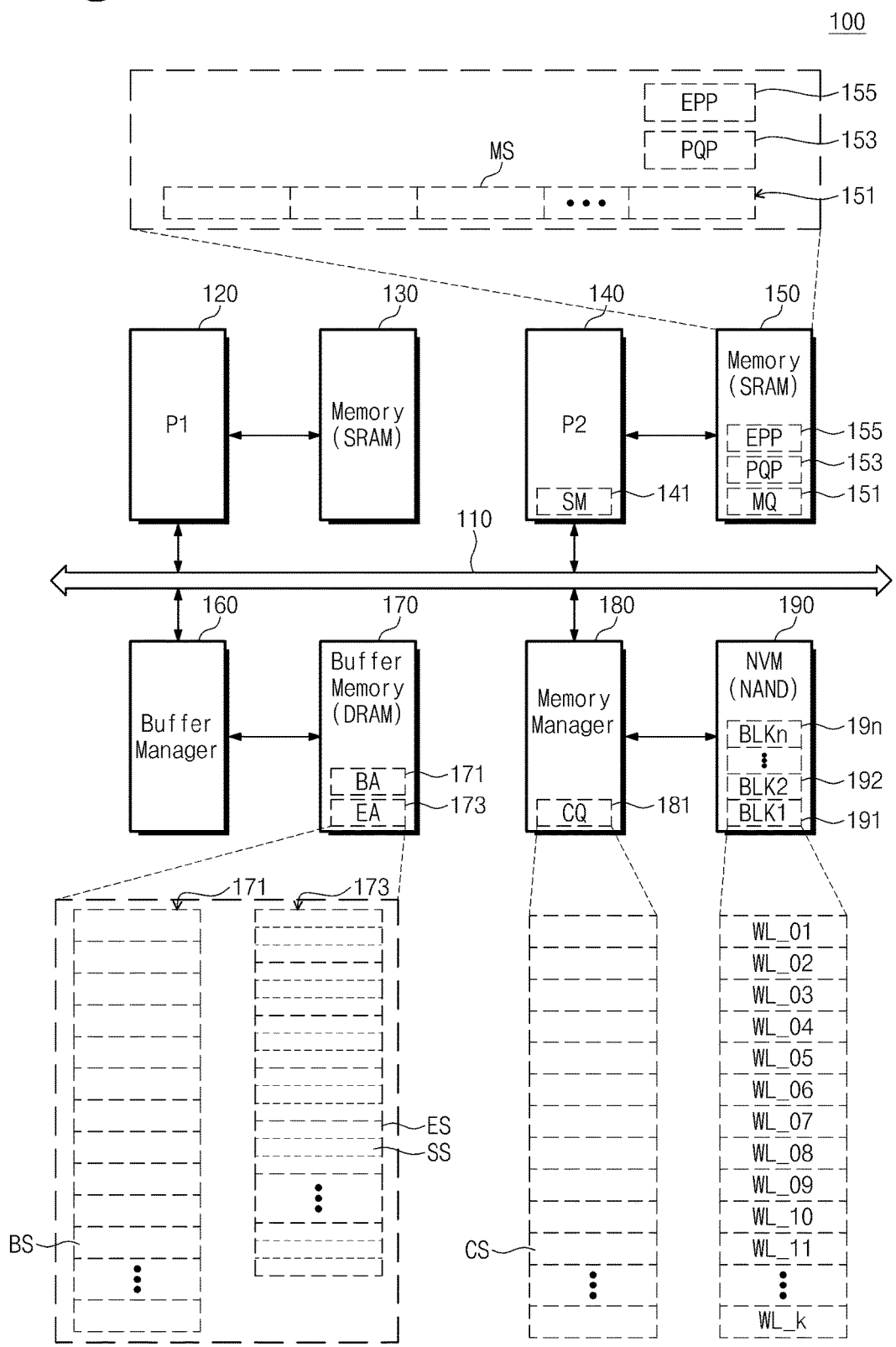
FIGS. 6 to 29 are diagrams illustrating a data processing operation of a memory system according to an operating method illustrated in FIG. 5.

Referring to FIG. 6, a message queue 151 may be allocated to a specific storage area of a second memory 150. The message queue 151 may include a plurality of message slots MS for storing messages (e.g., a command or an address) transferred from a first processor 120. Each of the message slots MS may correspond to a program management unit of the nonvolatile memory 190. For example, if a nonvolatile memory 190 is formed of a plane, one message slot may correspond to a page of a word line of a memory block in the plane. If nonvolatile memory 190 is formed of a first plane and a second plane, a message slot may correspond to a page of the first plane and a page of the second plane. For a simple and distinct description of the inventive concepts, it is assumed that a message slot corresponds to a page. Information included in the message may be the command and address received from the host, a converted address determined by the first processor 120 and the address indicating where data is stored in the buffer memory 170. A program queue pool 153 may be capable of allocating a plurality of program queues PQs. An entity point pool 155 may be capable of allocating a plurality of entity pointers.

The message queue 151 may be an empty state when data, a command, and an address are not sent to a memory system 100. Also, a program queue PQ and an entity pointer may not be allocated.

A buffer area 171 may include a plurality of buffer slots BS for storing page data. Each of the buffer slots BS may store a page of data.

An entity area 173 may include a plurality of entity slots ES for storing a plurality of program entities. Each of the entity slots ES may store a program entity. An entity slot ES may include a plurality of sub slots SS. The number of sub slots SS in an entity slot ES may be the number of page data being programmed at memory cells of a word line. A sub slot SS may correspond to a page of data. That is, an entity slot may store information (e.g., an address) on a plurality of slots of the buffer area 171. An entity slot may store information on all page data to be programmed at a word line.

A program entity may include information (e.g., addresses of buffer slots BS) on corresponding buffer slots of the buffer area 171. A program entity may include information (e.g., an address of the nonvolatile memory 190) on the nonvolatile memory 190 at which data stored at the plurality of buffer slots BS is to be programmed. The information included in the program entity may be the same as in the message, and may additionally include the wordline address of the nonvolatile memory 190.

In example embodiments, the entity area 173 may form a queue based on the entity slots ES.

The buffer area 171 and the entity area 173 may be at an empty state when data, a command, and an address are not sent to the memory system 100.

A command queue 181 of the memory manager 180 may include a plurality of command slots CS. Each of the command slots CS may store a command (e.g., a program entity) transferred from a buffer memory 170 under a control of the second processor 140. The memory manager 180 may control the nonvolatile memory 190 according to commands stored at the command queue 181.

The command queue 181 may be at an empty state when data, a command, and an address are not sent to the memory system 100.

A memory block of the nonvolatile memory 190 may include a plurality of word lines WL_01 to WL_k. Memory cells connected with a word line may form a plurality of pages. A page may store a page of data. For example, a memory block illustrated in FIG. 6 may be a free memory block.

Below, a program operation of a free memory block in the nonvolatile memory 190 will be described.

Figure 7:
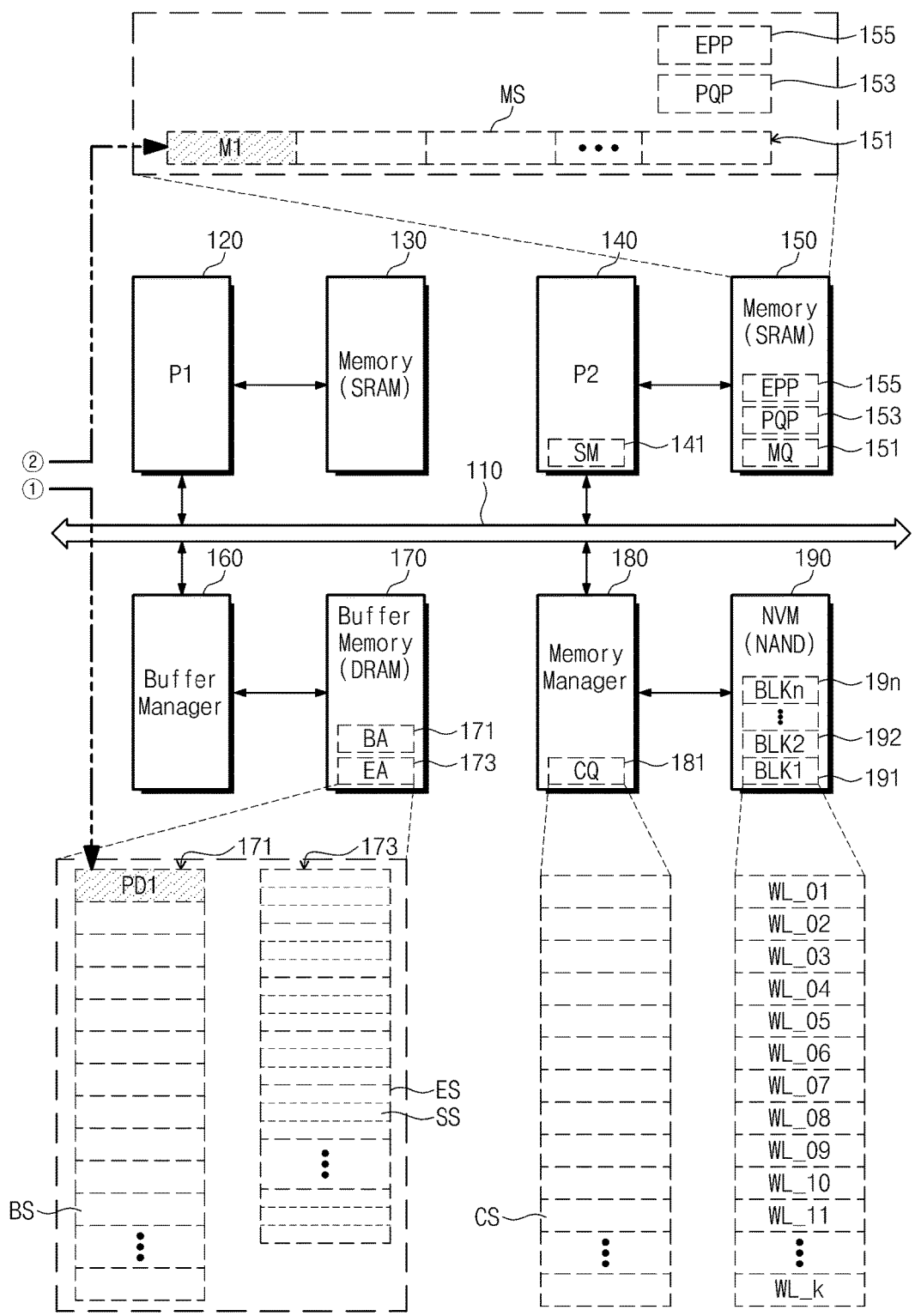

Referring to FIGS. 4 and 7, page data PD1 may be received from an external device (e.g., a host) (①). The page data PD1 may be stored at a buffer slot of the buffer area 171 in the buffer memory 170 according to controls of the first processor 120 and the buffer manager 160. For example, the page data PD1 may be LSB page data to be programmed at an LSB page of the first word line WL_01 of the nonvolatile memory 190.

As the page data PD1 is received from the external device (e.g., a host), a memory block at which the page data PD1 is to be programmed may be allocated. That is, a state machine 141 may enter a reset state RSS.

Reset State (RSS)

An address and a command corresponding to the page data PD1 may be received (②). The received address and command may be registered (or, enqueued) at a first message slot of the message queue 151 in the second memory 150 as a message M1 according to controls of the first processor 120 and the second processor 140. Alternatively, a message M1 may be generated on the basis of an address and a command, and may be enqueued at the message queue 151.

In example embodiments, the address and command may be enqueued at the message queue 151 after the page data PD1 is stored at the buffer area 171. The message M1 may include information (e.g., an address of a buffer slot) on the page data PD1 stored at the buffer area 171. The message M1 may further include information indicating that the message M1 is associated with programming.

Figure 8:
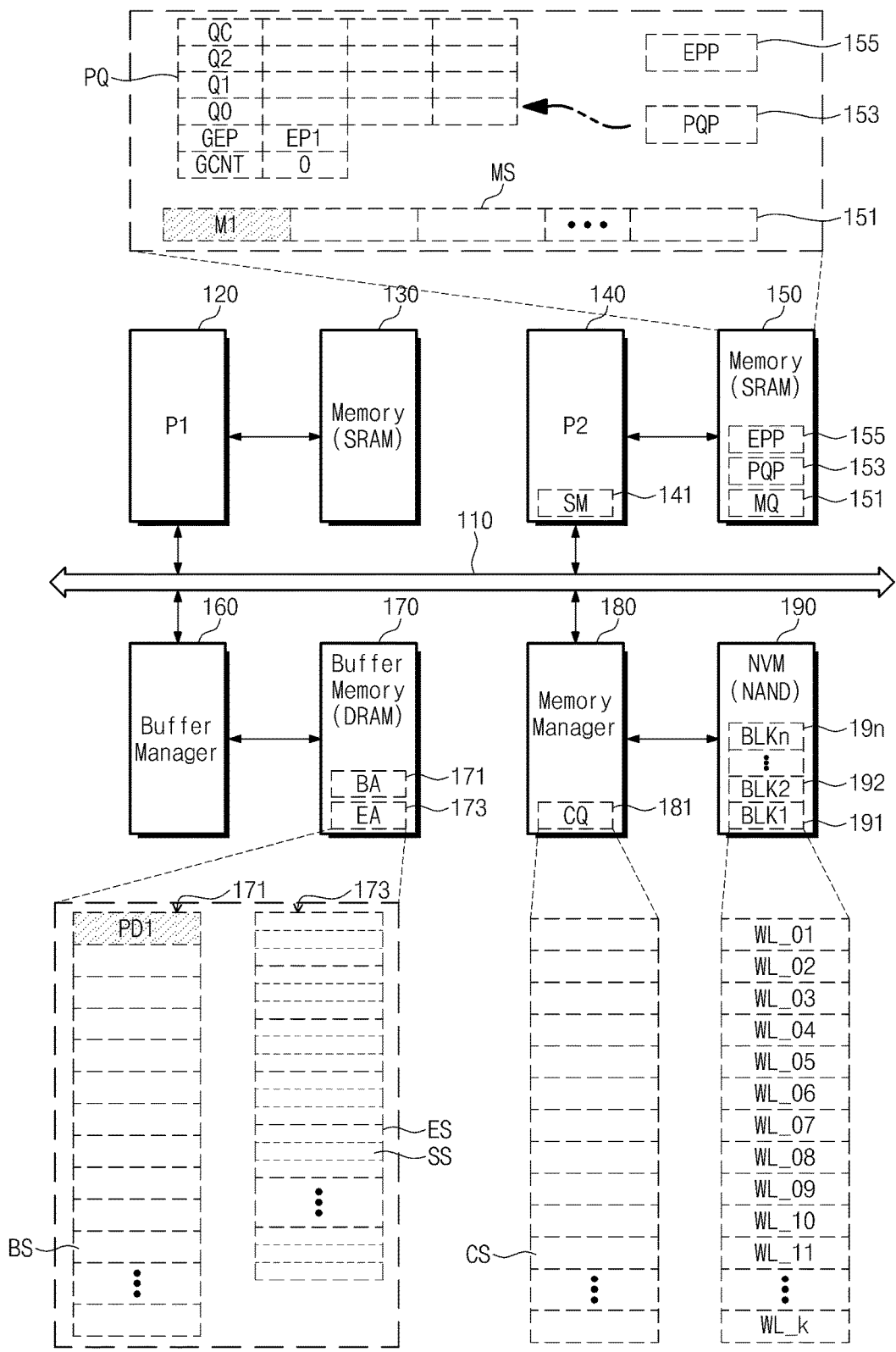

Although the message M1 and the page data PD1 are received, the program queue PQ for managing the message M1 and the program data PD1 is not allocated yet. Thus, as illustrated in FIG. 8, as the message M1 is stored at the message queue 151, the program queue PQ may be allocated from the program queue pool 153. The program queue PQ may include basic stages Q0 to Q2 and an additional stage QC. A depth of each stage may be 3.

When the program queue PQ is allocated, a gathering entity pointer register GEP and a gathering count register GNCT may be further allocated. In example embodiments, the gathering entity pointer register GEP and the gathering count register GNCT may be allocated from the program queue pool 153. The gathering entity pointer register GEP and the gathering count register GNCT may be managed as a part of the program queue PQ.

If the program queue PQ is allocated, an entity pointer EP1 may be allocated from the entity point pool 155. The entity pointer EP1 may include information (e.g., an address of an entity slot) indicating one of entity slots ES of the entity area 173. For example, when the entity pointer EP1 is allocated, one of the entity slots ES of the entity area 173 may be allocated to an entity slot associated with the entity pointer EP1. The allocated entity pointer EP1 may be registered at the gathering entity pointer register GEP.

The entity pointer may be managed at the gathering entity pointer register GEP until a program entity corresponding to an entity pointer registered at the gathering entity pointer register GEP accumulates information on all page data of a word line.

For example, a specific program entity may not have information on all page data (e.g., LSB, intermediate and MSB page data) programmed at memory cells of a word line. At this time, an entity pointer indicating the specific program entity may be managed at the gathering entity pointer register GEP. When a specific program entity has information on all page data programmed at memory cells of a word line, it may be registered (or, enqueued) at a first stage Q0 of the program queue PQ.

When the entity pointer EP1 is registered at the gathering entity pointer register GEP, a count value of the gathering count register GNCT may be set to '0'. A count value of the gathering count register GNCT may increase whenever a program entity corresponding to a registered entity pointer accumulates information corresponding to a page of data. That is, a count value of the gathering count register GNCT may indicate the number of information on page data accumulated at a program entity corresponding to an entity pointer managed at the gathering entity pointer register GEP. In other words, a count value of the gathering count register GNCT may indicate the number of pages of data, collected, from among all pages of data to be programmed at memory cells of a word line.

Figure 9:
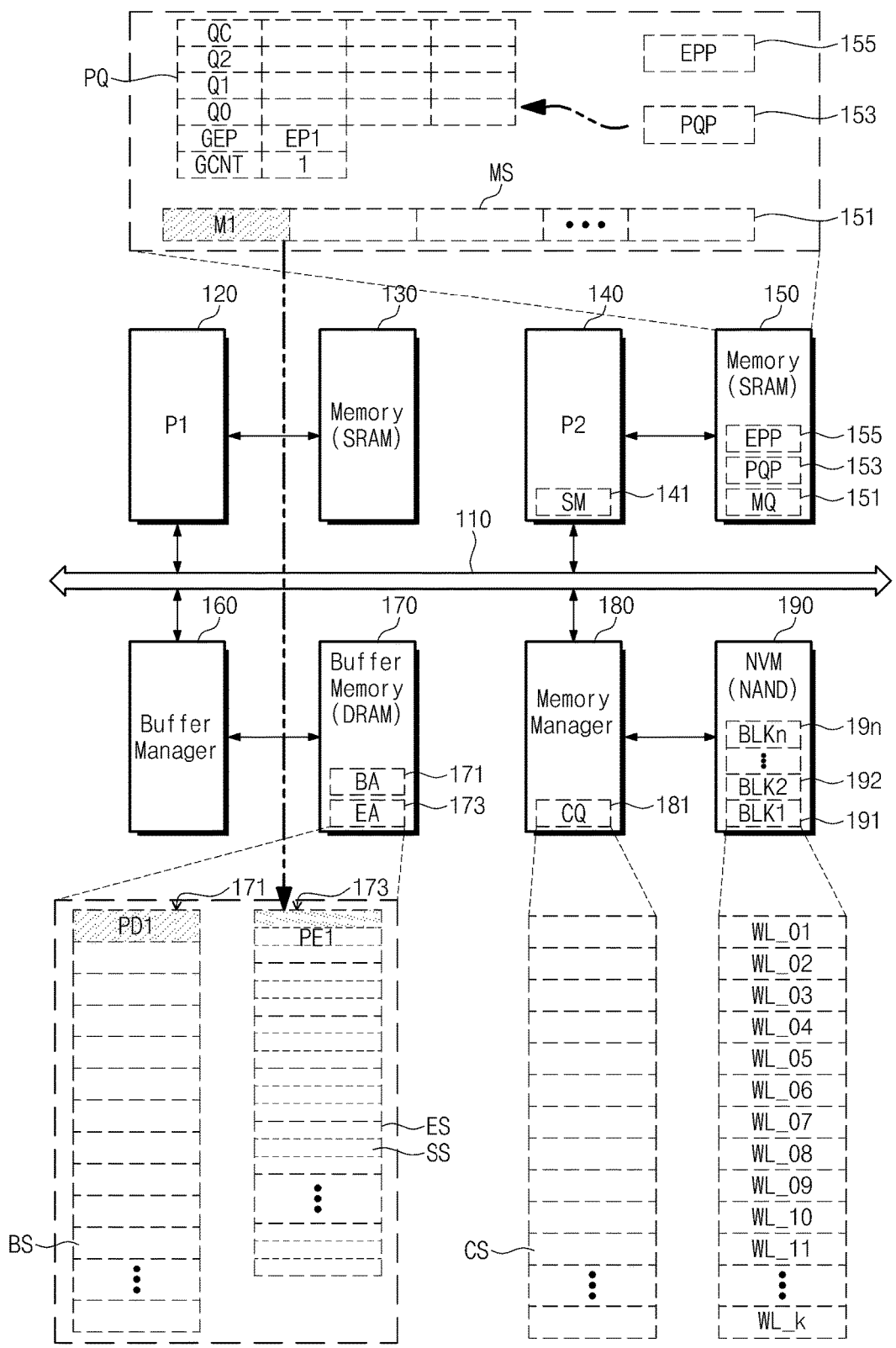

Referring to FIG. 9, the message M1 stored at the message queue 151 may be sent to a first entity slot of the entity area 173. For example, the message M1 may be stored at an entity slot of the entity area 173 as a program entity PE1. In example embodiments, the message M1 may be stored at an entity slot, directed by the entity pointer EP1, from among entity slots of the entity area 173. The message M1 may be stored at a first sub slot of an entity slot. In example embodiments, the program entity PE1 may be generated on the basis of the message M1, and may be stored at an entity slot ES.

As information on the page data PD1 is stored at the program entity PE1 of the entity area 173, a count value of the gathering count register GNCT may increase.

Figure 10:
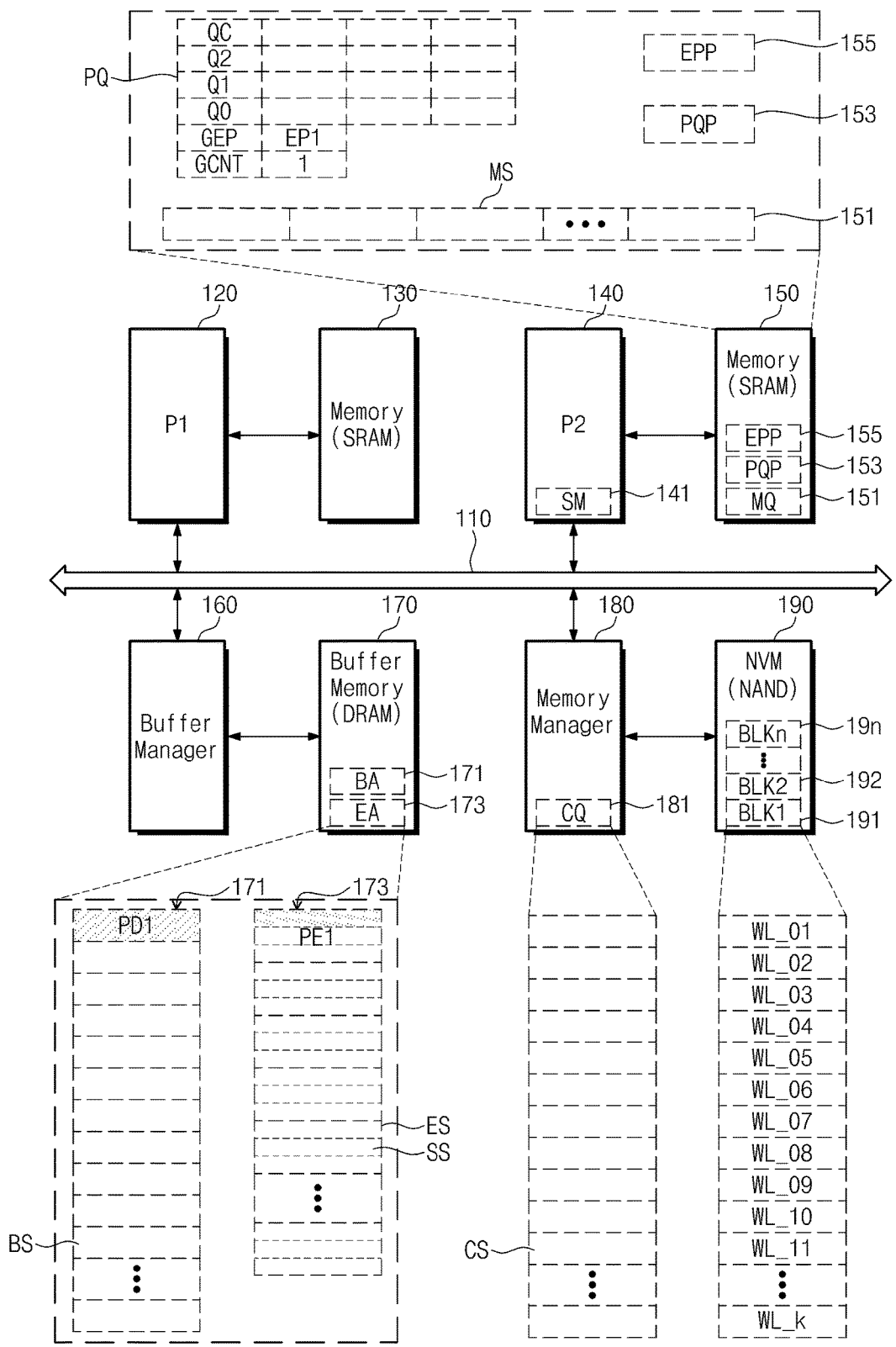

Referring to FIG. 10, after information on the page data PD1 is stored as the program entity PE1, the message M1 may be released from the message queue 151. After the message M1 is released, other messages stored at the message queue 151 may be shifted. In other example embodiments, a first message slot MS at which the message M1 is stored may be released. As the first message slot MS is released, the remaining message slots MS other than the first message slots MS may be shifted.

Figure 11:
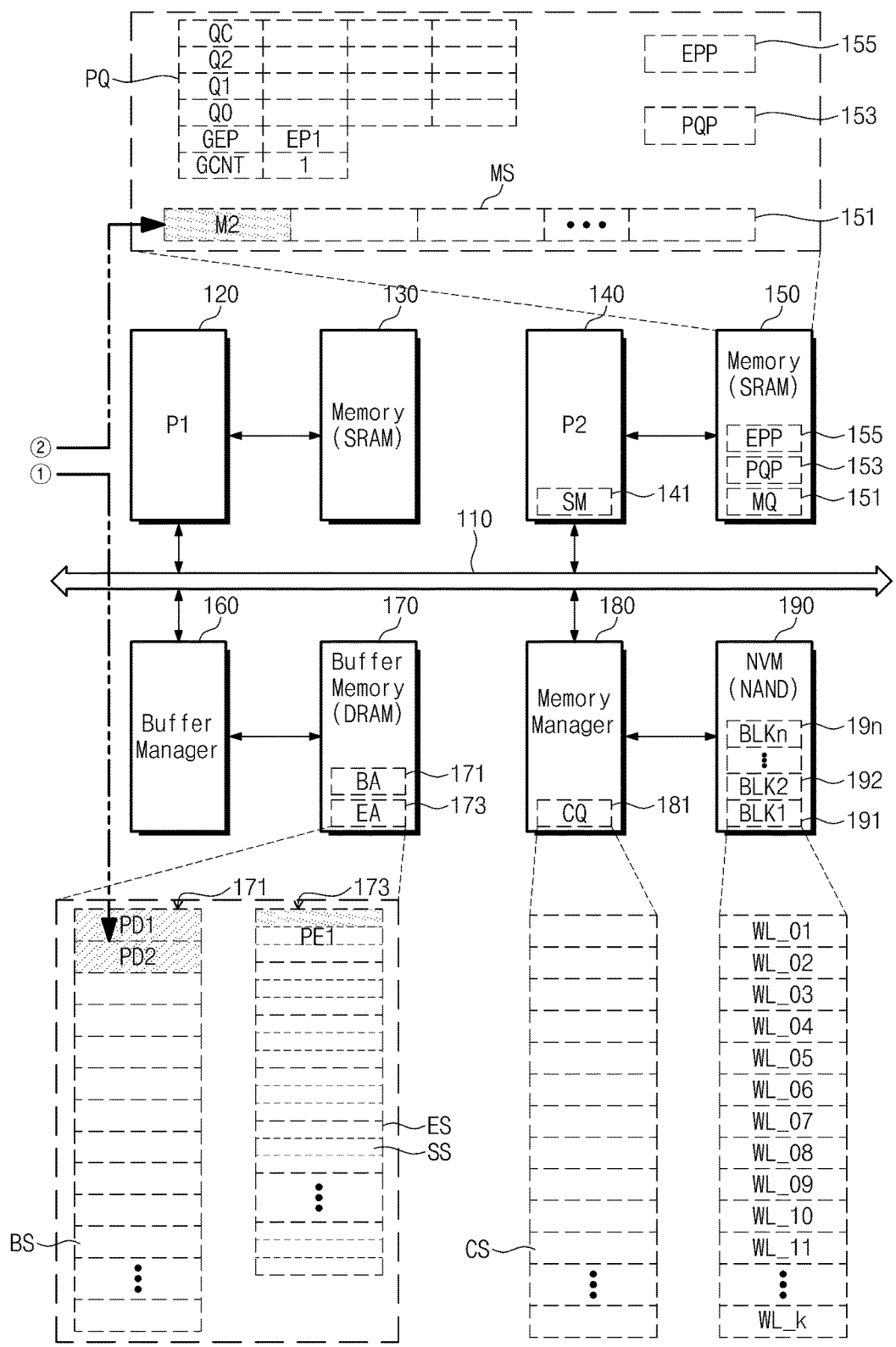

Referring to FIG. 11, page data PD2 may be received from the external device (e.g., a host) (①). The page data PD2 may be stored at an empty buffer slot of the buffer area 171 in the buffer memory 170 according to controls of the first processor 120 and the buffer manager 160. For example, the page data PD2 may be data to be programmed at an intermediate page of the first word line WL_01 of the nonvolatile memory 190.

An address and a command corresponding to the page data PD2 may be received (②). The received address and command may be stored at a message slot MS of the message queue 151 in the second memory 150 as a message M2 according to controls of the first processor 120 and the second processor 140. For example, a message M2 may be generated on the basis of an address and a command, and may be stored at the message queue 151. It will be understood that while page data PD2 is described as having an address and command independent from page data PD1, this depends on whether either a sequential write operation or a random operation is requested.

For a simple description, there is described an example in which after a message M1 stored at the message queue 151 is released, a message M2 is stored at the message queue 151. However, the message M2 may be enqueued at the message queue 151 regardless of whether a previous message M1 is released.

For example, the message M1 may be stored at a first message slot MS. The message M2 may be received before the message M1 processed is released. The message M2 may be stored at a second message slot MS. The messages M1 and M2 stored at the message queue 151 may be sequentially processed and released according to a stored order.

Figure 12:
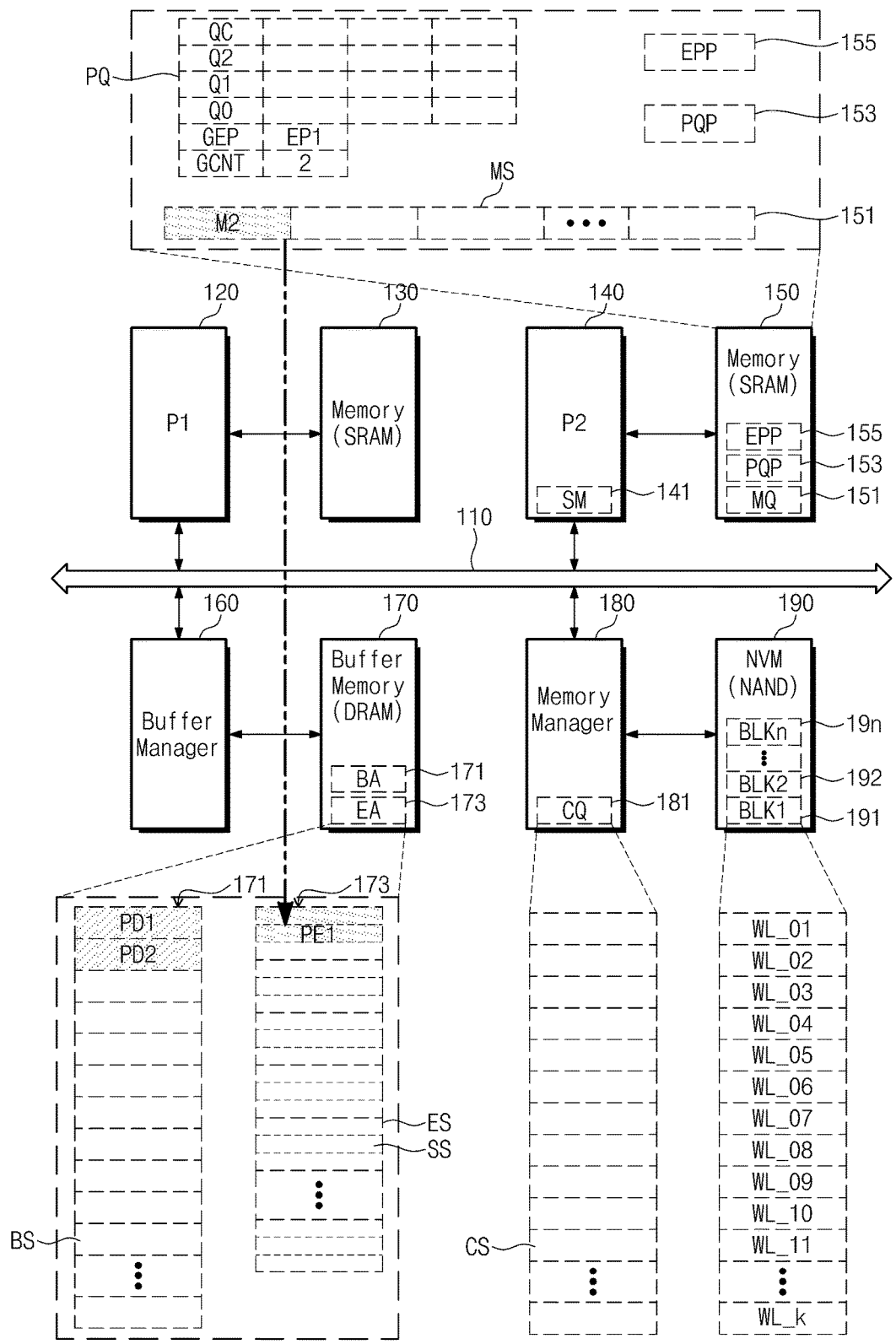

The program queue PQ has been generated, and the entity pointer EP1 managed by the gathering entity pointer register GEP exists already. Thus, as illustrated in FIG. 12, the message M2 stored at the message queue 151 may be transferred to an entity slot directed by the entity pointer EP1. The message M2 may be stored at a second sub slot in an entity slot directed by the entity pointer EP1. The program entity PE1 may be updated by combining information stored at the first and second sub slots.

As information on the page data PD2 is stored at the program entity PE1 of the entity area 173, a count value of the gathering count register GNCT may increase. The count value may indicate that the program entity PE1 collects information on two pages of data (e.g., LSB and intermediate page data). It will be appreciated that, in this example, the page data PD2 and the page data PD3 (described below) correspond to the first page data PD1, and therefore, information regarding these page data are grouped in same program entity PE1.

Figure 13:
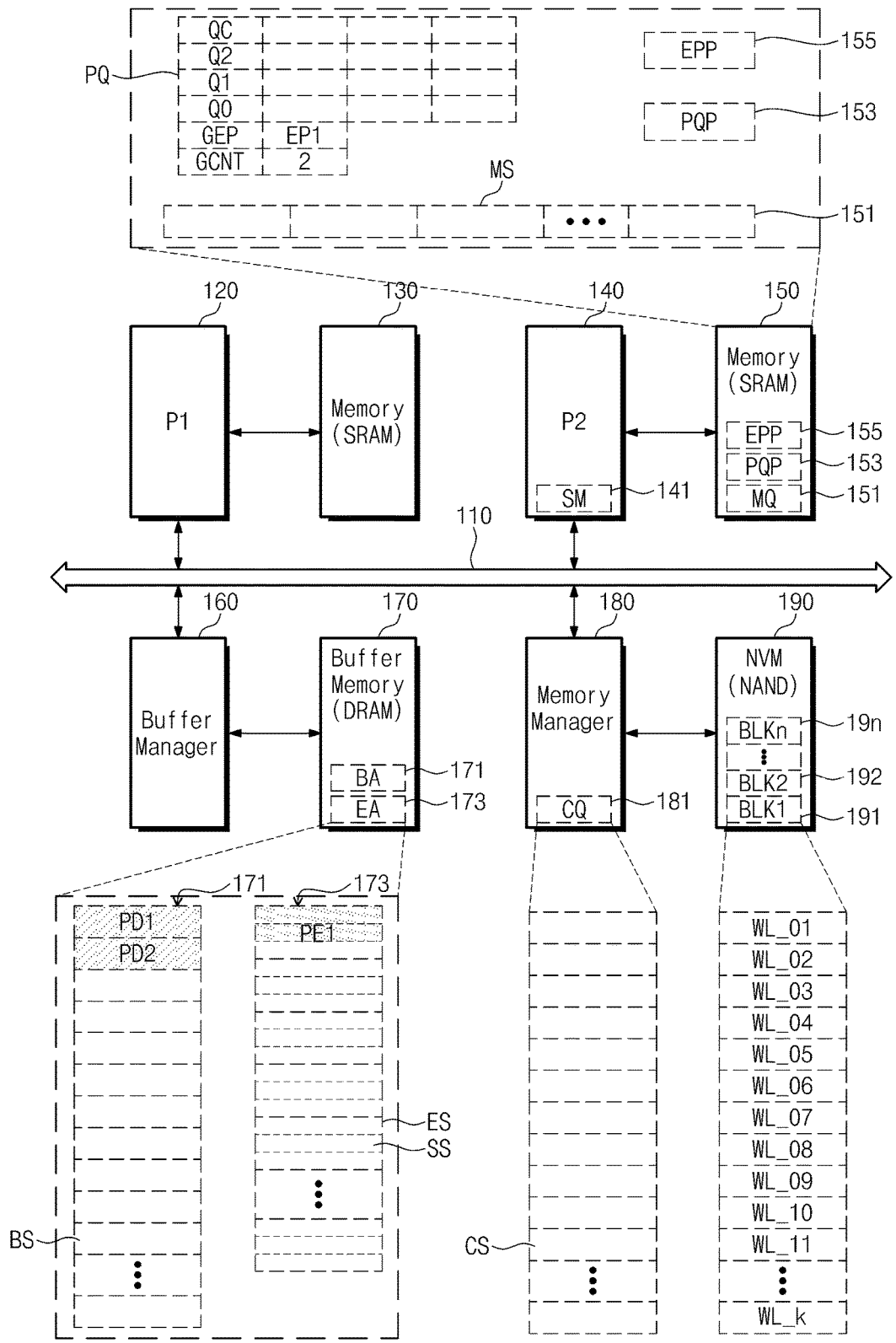

Referring to FIG. 13, the message M2 stored at the message queue 151 may be released.

Figure 14:
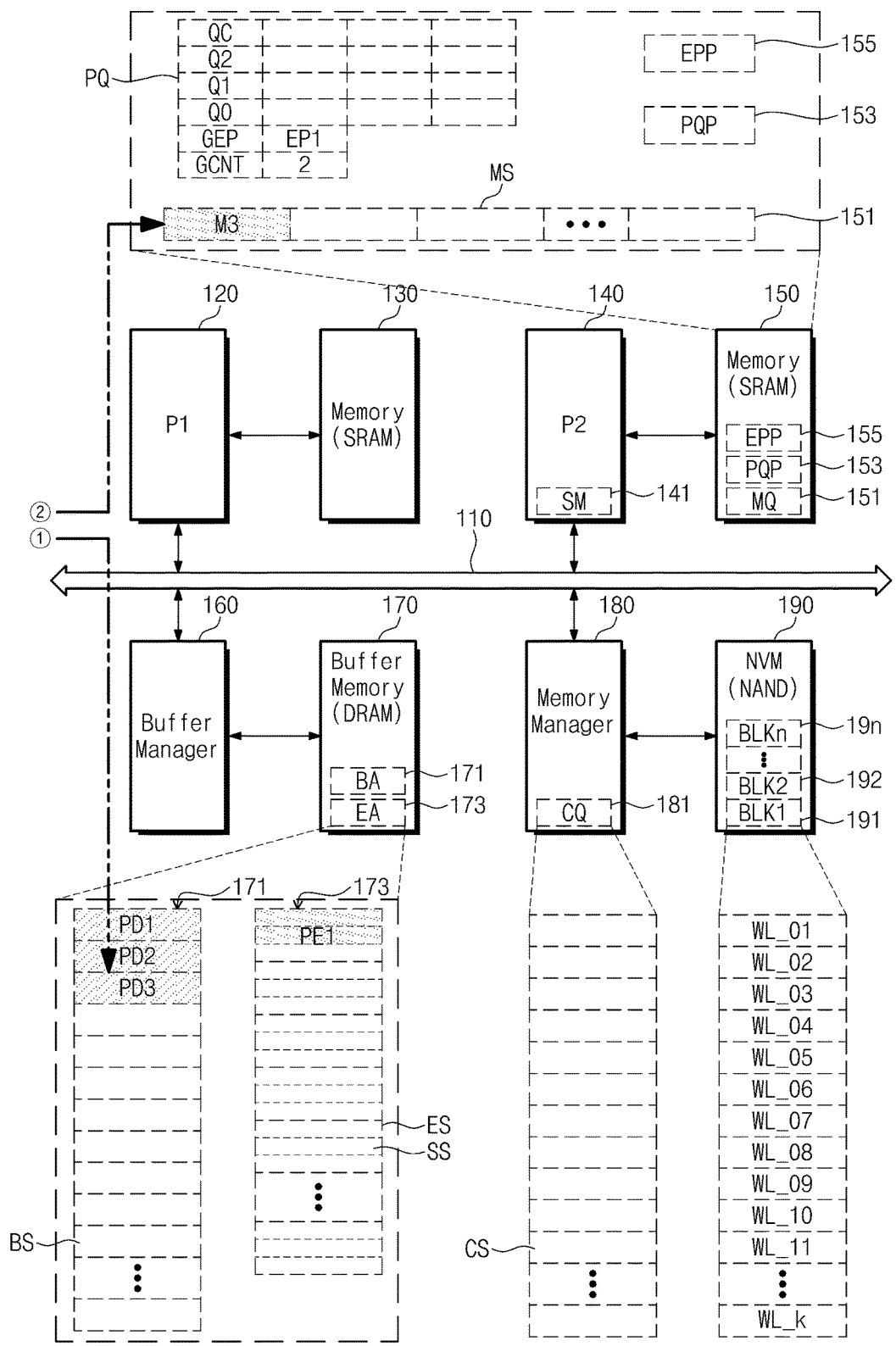

Referring to FIG. 14, page data PD3 may be received from the external device (e.g., a host) (1̂). The page data PD3 may be stored at an empty buffer slot of the buffer area 171. For example, the page data PD3 may be MSB page data corresponding to the first page data PD1, and is to be programmed at an MSB page of the first word line WL_01 of the nonvolatile memory 190.

An address and a command corresponding to the page data PD3 may be received (2̂). The received address and command may be enqueued at the message queue 151 as a message M3. For example, a message M3 may be generated on the basis of an address and a command, and may be enqueued at the message queue 151.

Figure 15:
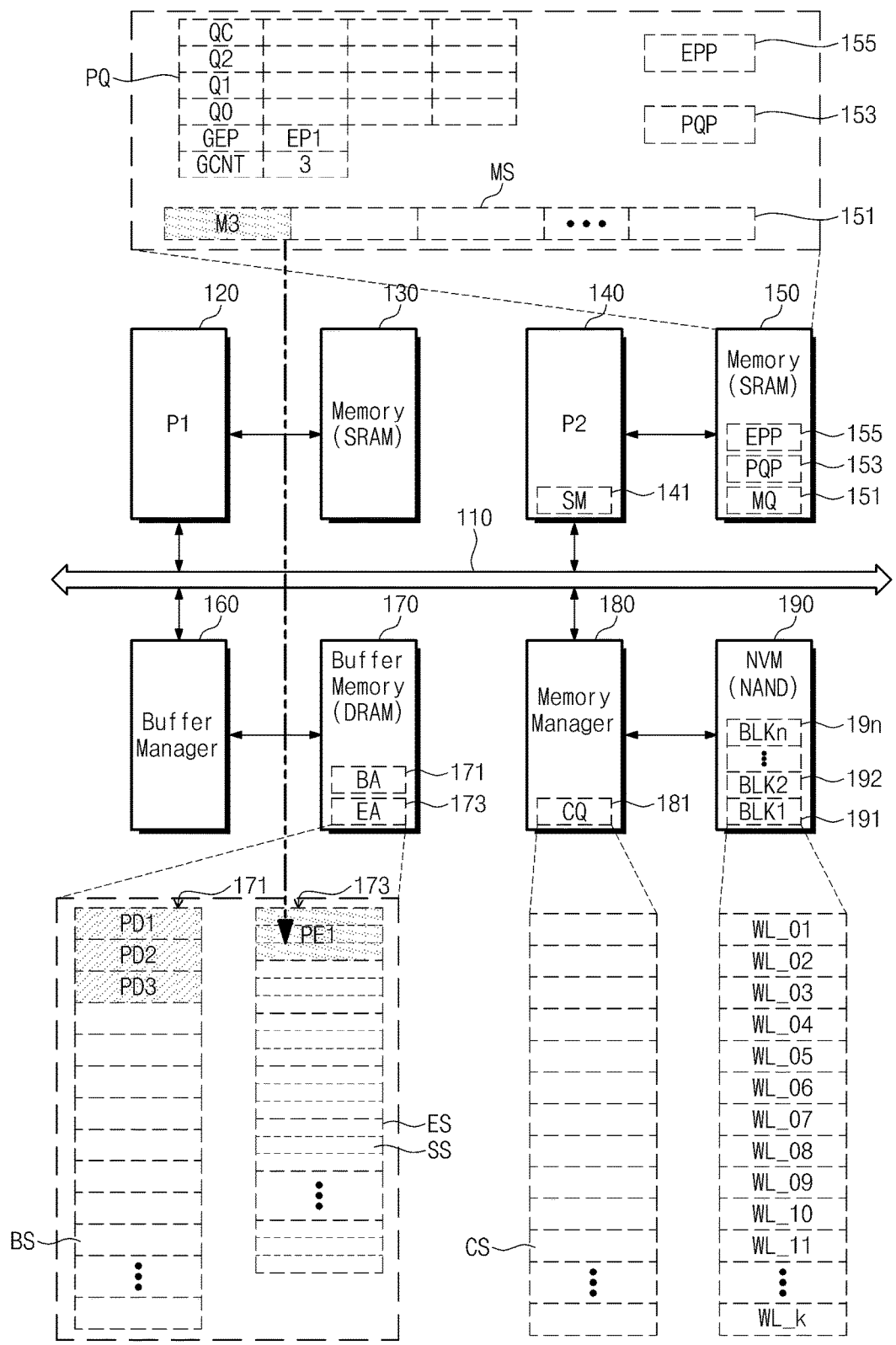

The program queue PQ has been generated, and the entity pointer EP1 managed by the gathering entity pointer register GEP has existed already. Thus, as illustrated in FIG. 15, the message M3 stored at the message queue 151 may be transferred to an entity slot directed by the entity pointer EP1. The message M3 may be stored at a third sub slot in an entity slot directed by the entity pointer EP1. The program entity PE1 may be updated by combining information stored at the first to third sub slots.

As information on the page data PD3 is stored at the program entity PE1 of the entity area 173, a count value of the gathering count register GNCT may increase. The count value may indicate that the program entity PE1 collects information on all pages of data (e.g., LSB, intermediate and MSB page data).

Figure 16:
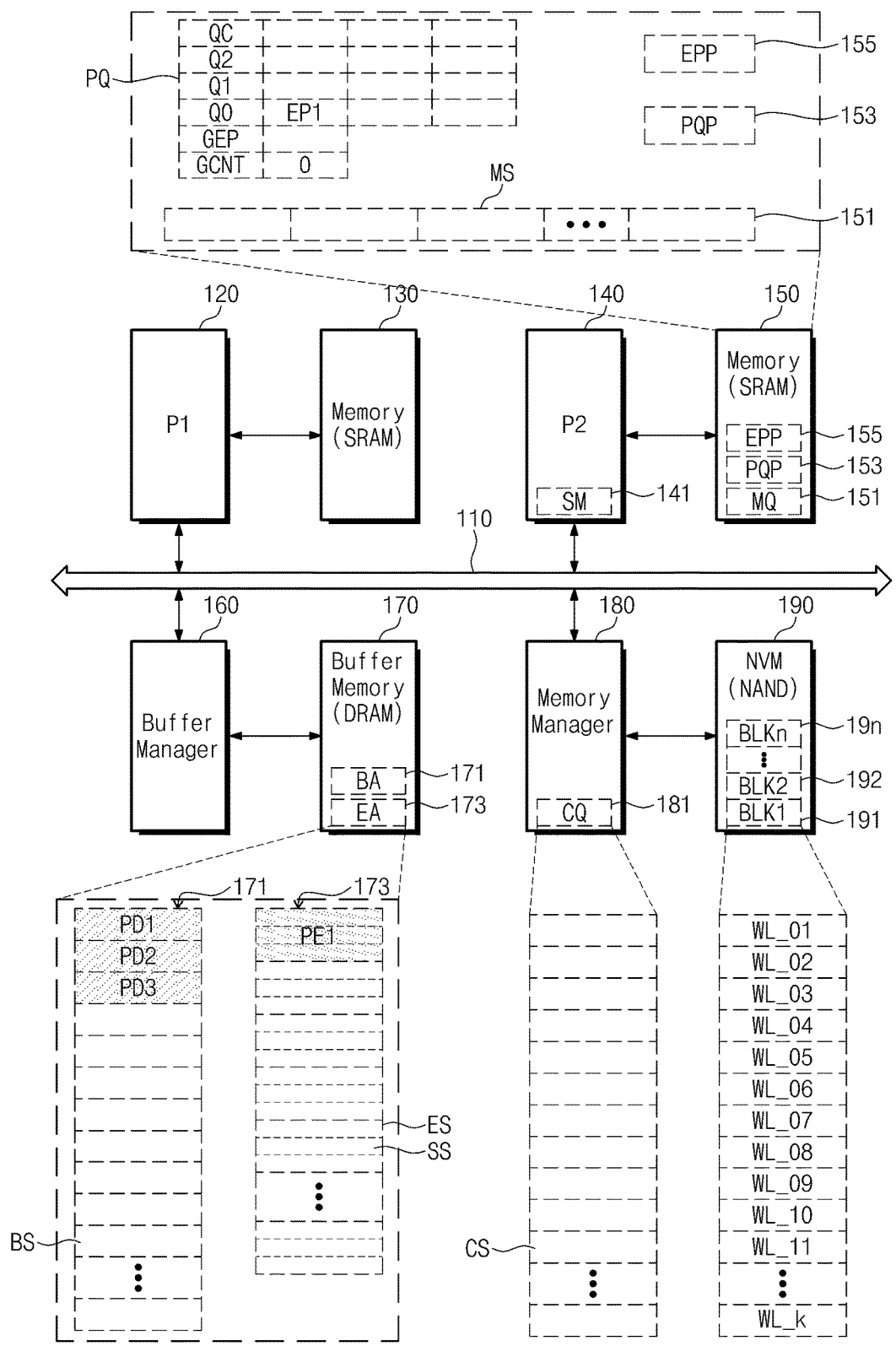

Referring to FIG. 16, the message M3 stored at the message queue 151 may be released. A count value of the gathering count register GNCT may indicate that all pages of data are collected. The entity pointer EP1 stored at the gathering entity pointer register GEP may be enqueued at the program queue PQ. For example, the entity pointer EP1 may be enqueued at a first stage Q0 of the program queue PQ. As the entity pointer EP1 is enqueued, a count value of the gathering count register GNCT may be reset.

As the entity pointer EP1 is enqueued at the first stage Q0 of the program queue PQ, the state machine 141 may enter a $0^{th}$ state RS0.

$0^{th}$ Stage (RS0)

Figure 17:
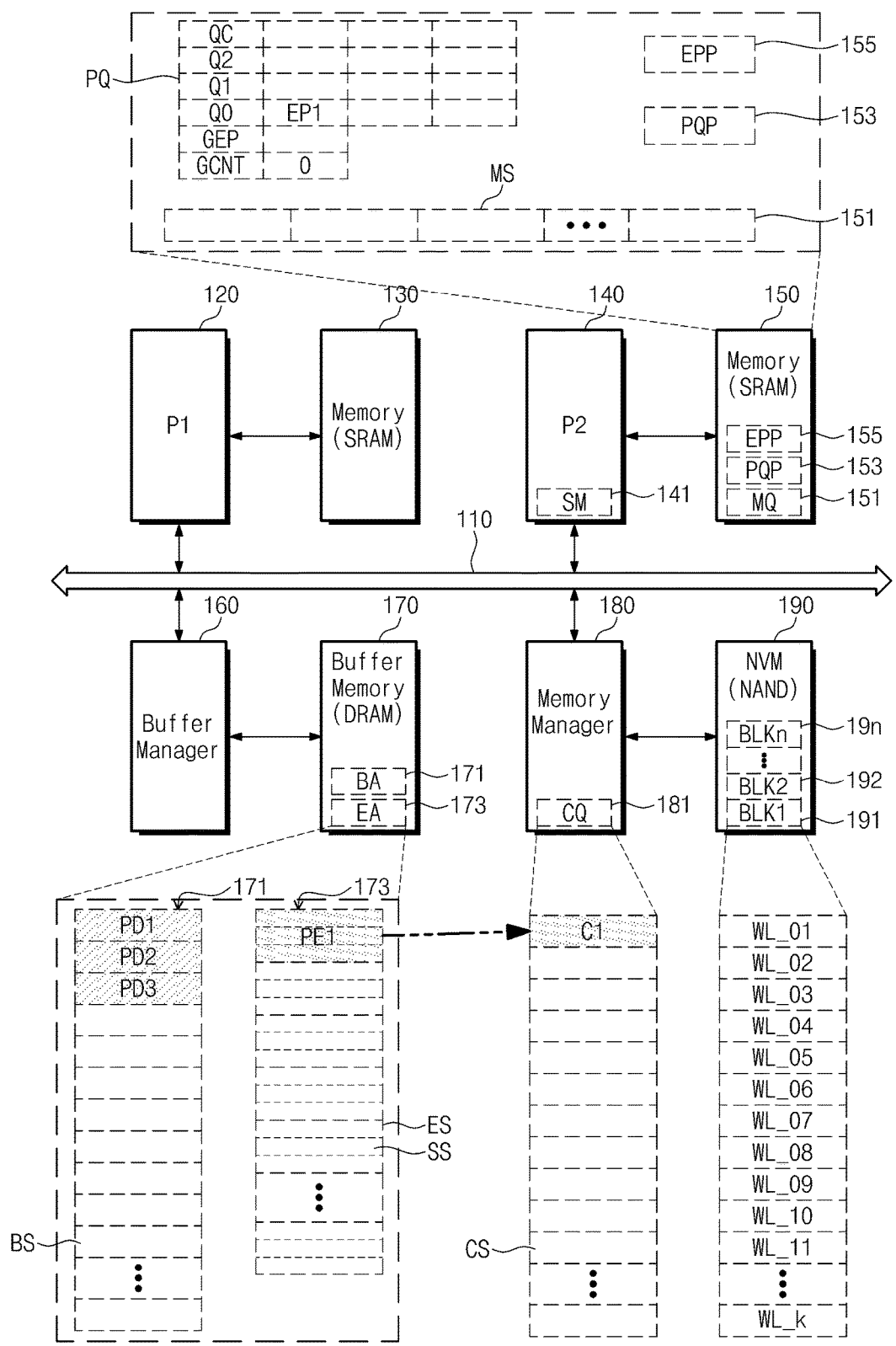

Referring to FIG. 17, the program entity PE1 directed by the entity pointer EP1 enqueued at the first state Q0 of the program queue PQ may be enqueued at the command queue 181 of the memory manager 180. For example, an entity slot, at which the program entity PE1 is stored, from among entity slots ES of the entity area 173 may be read by entity pointer EP1. Program information (e.g., the program entity PE1 or information of a program entity) stored at the detected entity slot may be enqueued at the command queue 181 as a command C1. For example, a command C1 may be generated on the basis of the program entity PE1, and may be enqueued at the command queue 181. For example, the second processor 140 may read the program entity PE1 from the entity area 173, and may convert the program entity PE1 to have a data structure for the memory manager 180. The second processor 140 may enqueue the conversion result at the command queue 181 as the command C1.

Figure 18:
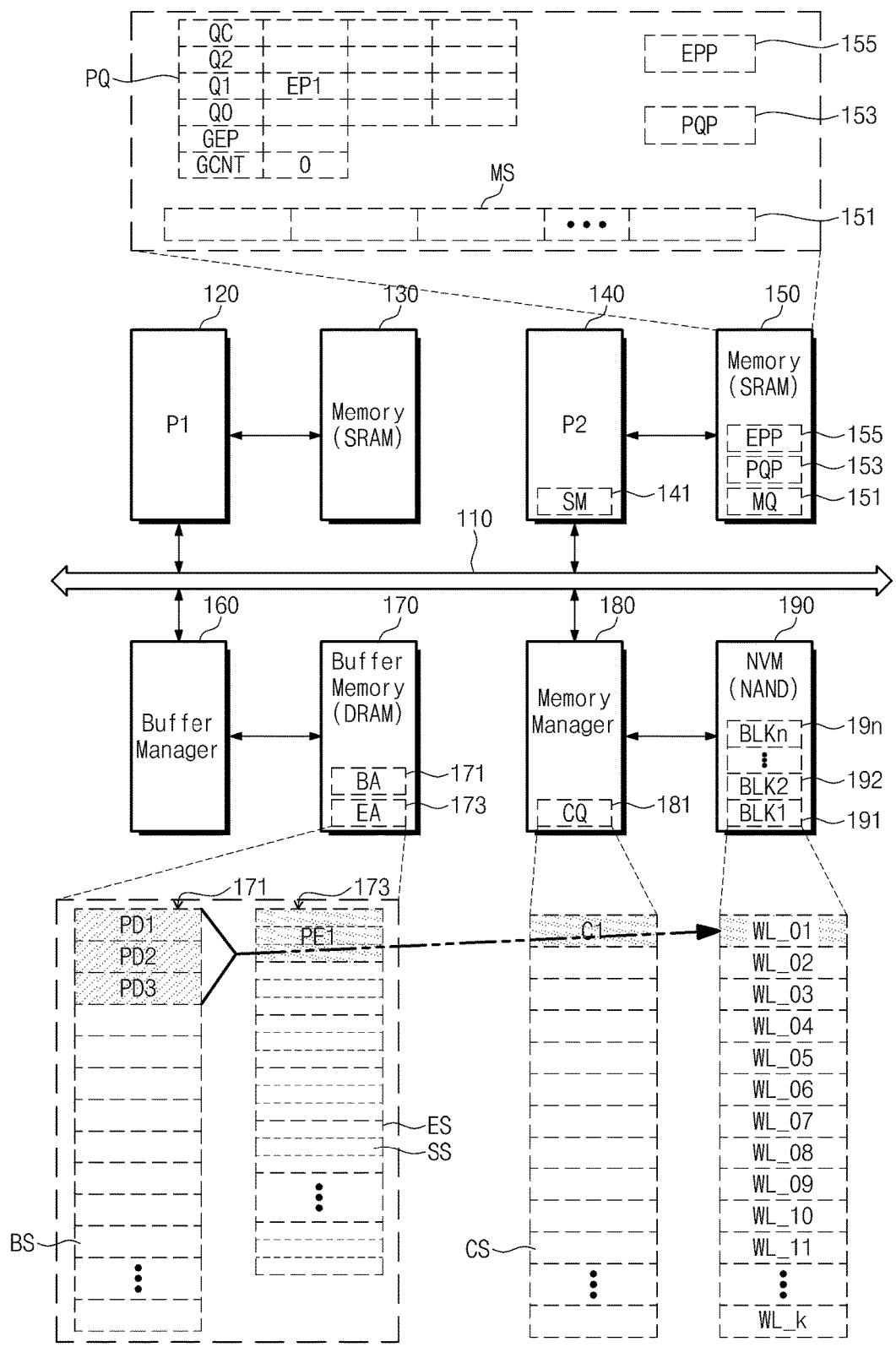

Referring to FIG. 18, as the command C1 is enqueued at the command queue 181, the page data PD1, PD2, and PD3 directed by the command C1 may be programmed at memory cells corresponding to a first word line of the nonvolatile memory 190. The memory manager 180 may detect addresses of buffer slots, at which the page data PD1, PD2, and PD3 are stored, from the command C1 stored at the command queue 181. The memory manager 180 may detect an address (e.g., a word line or page address) of the nonvolatile memory 190, at which the page data PD1, PD2, and PD3 is to be programmed, from the command C1. The page data PD1, PD2, and PD3 may be read through the buffer manager 160 based on the addresses of buffer slots detected. The page data PD1, PD2, and PD3 read may be sent to the nonvolatile memory 190 with the address of the nonvolatile memory 190 detected. For example, at least two or more pages of data (e.g., at least LSB and intermediate page data) of the page data PD1, PD2, and PD3 may be sent to the nonvolatile memory 190.

For example, at least two or more pages of data (e.g., at least LSB and intermediate page data) of the page data PD1, PD2, and PD3 may be programmed at the nonvolatile memory 190. Programming according to the entity pointer EP1 or the program entity PE1 registered at the first stage Q0 of the program queue PQ may be 1-step programming of program steps of direct reprogram. A word line WL_01 that connects to memory cells programmed by the 1-step programming is shown as a light black rectangular.

An enqueue of the command queue 181 may be an operation of issuing programming corresponding to the program entity PE1. As the command C1 is enqueued at the command queue 181, the entity pointer EP1 may be shifted into a second stage Q1 from the first stage Q0 (stage-up). The entity pointer EP1 may be enqueued at the second stage Q1. For example, after the command C1 is enqueued at the command queue 181, the entity pointer EP1 may be enqueued at the second stage Q1. An operation of enqueuing the entity pointer EP1 at the second stage Q1 may be performed independently from an operation of programming the page data PD1, PD2, and PD3 at the nonvolatile memory 190 according to the command enqueued at the command queue 181.

Figure 19:
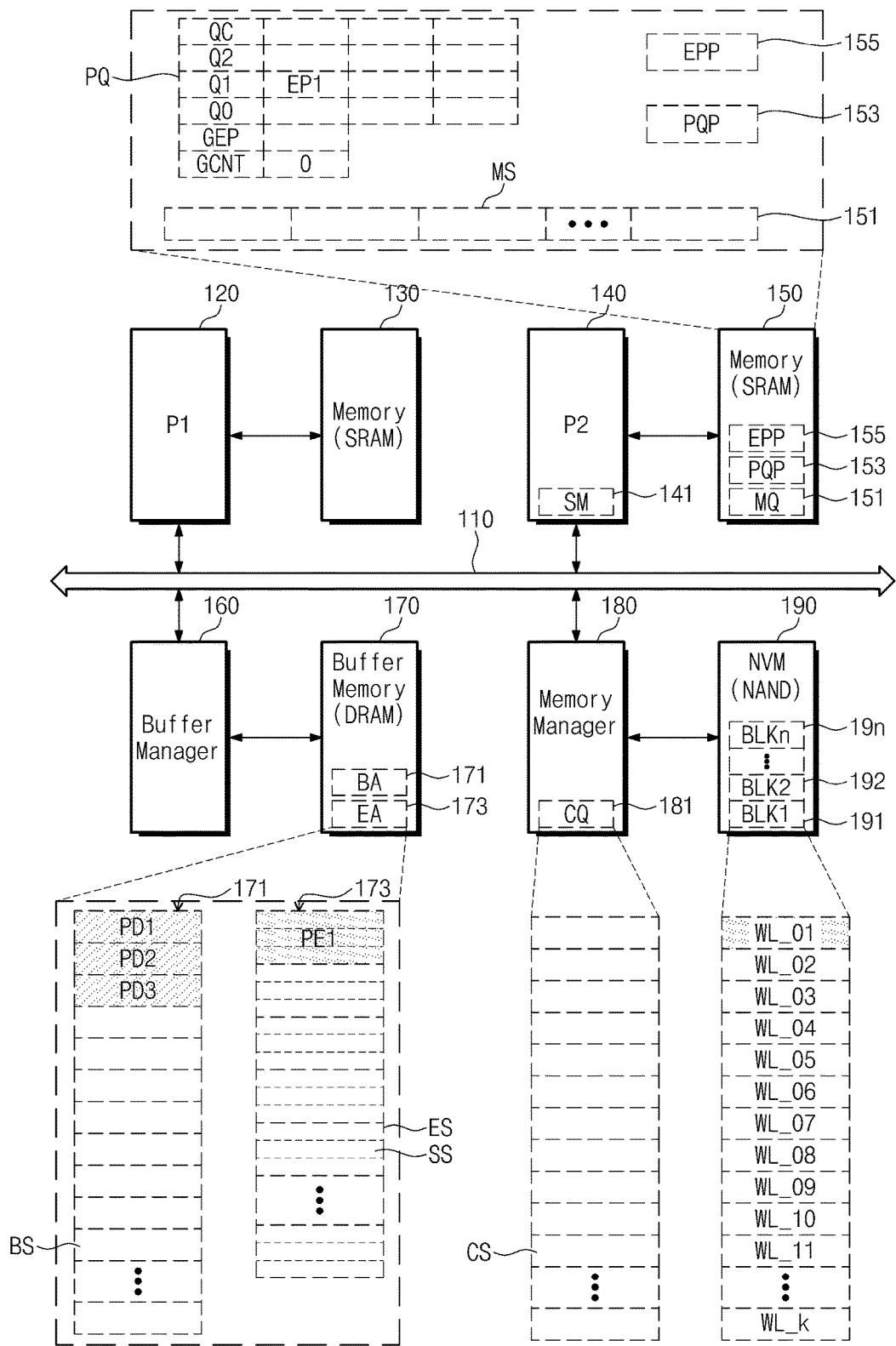

Referring to FIG. 19, as the 1-setp programming of the page data PD1, PD2, and PD3 is ended, the command C1 registered at the command queue 181 may be released. At this time, the program entity PE1 and the page data PD1, PD2, and PD3 corresponding to the command C1 may not be released in the buffer memory 170.

As described with reference to FIG. 4, as programming corresponding to the entity pointer EP1 is issued and the entity pointer EP1 is enqueued at the second stage Q1 of the program queue PQ, the state machine 141 may enter a $1^{st}$ state RS1.

$1^{st}$ State (RS1)

Figure 20:
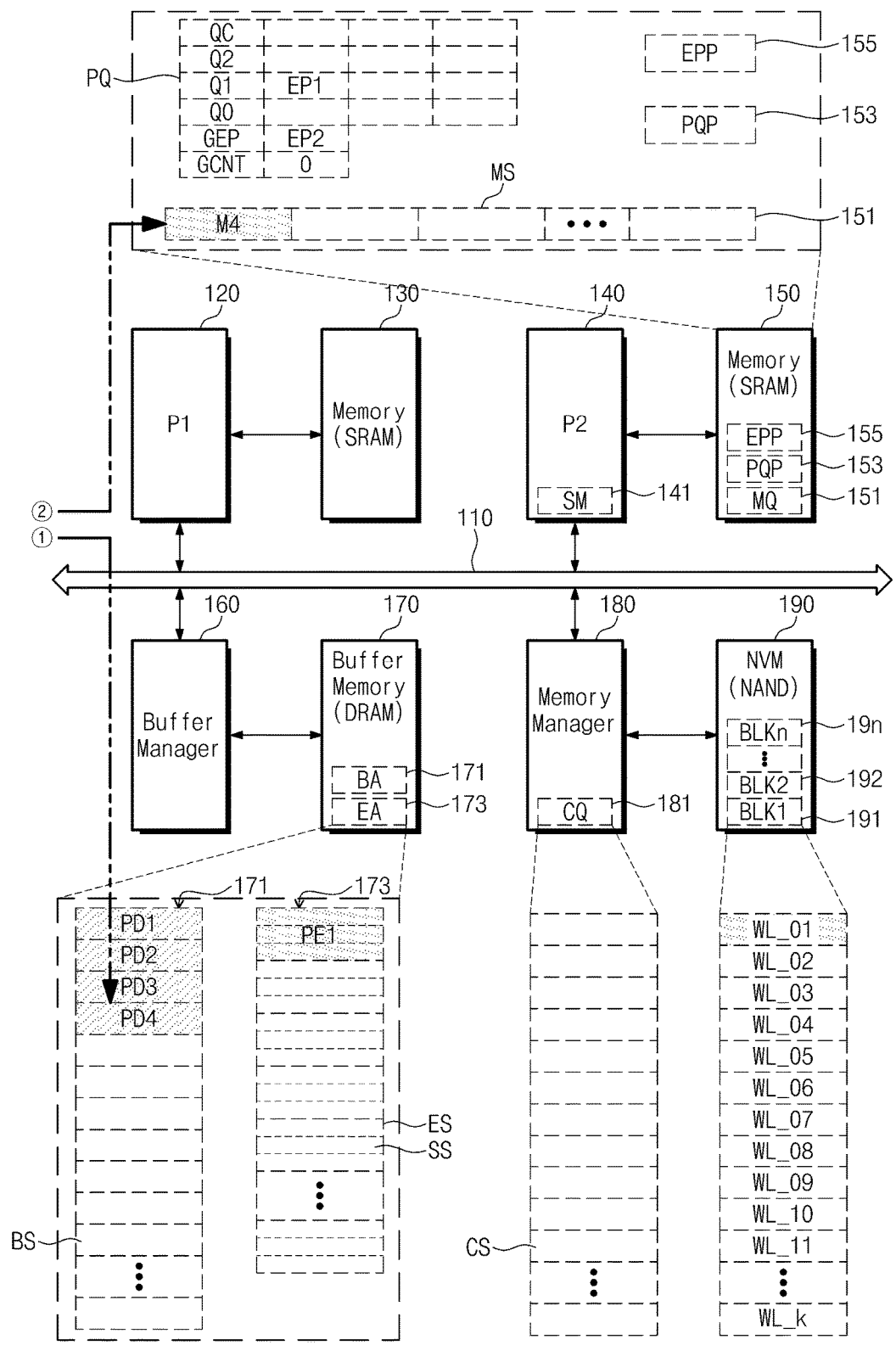

Referring to FIG. 20, page data PD4 may be received from the external device (e.g., a host) (①). The page data PD4 may be stored at an empty buffer slot of the buffer area 171. For example, the page data PD4 may be LSB page data to be programmed at an LSB page of the second word line WL_02 of the nonvolatile memory 190.

An address and a command corresponding to the page data PD4 may be received (②). The received address and command may be registered (or, enqueued) at the message queue 151 as a message M4. For example, a message M4 may be generated on the basis of an address and a command, and may be enqueued at the message queue 151.

Since the program queue PQ corresponding to the memory block at which the page data PD4 is to be programmed has been generated, the program queue may not be generated separately. Since an entity pointer managed at the gathering entity pointer register GEP does not exist, a new entity pointer EP2 may be allocated from the entity pointer pool 155. The entity pointer EP2 may be registered at the gathering entity pointer register GEP. For example, the entity pointer EP2 may be allocated together with an empty entity slot.

Figure 21:
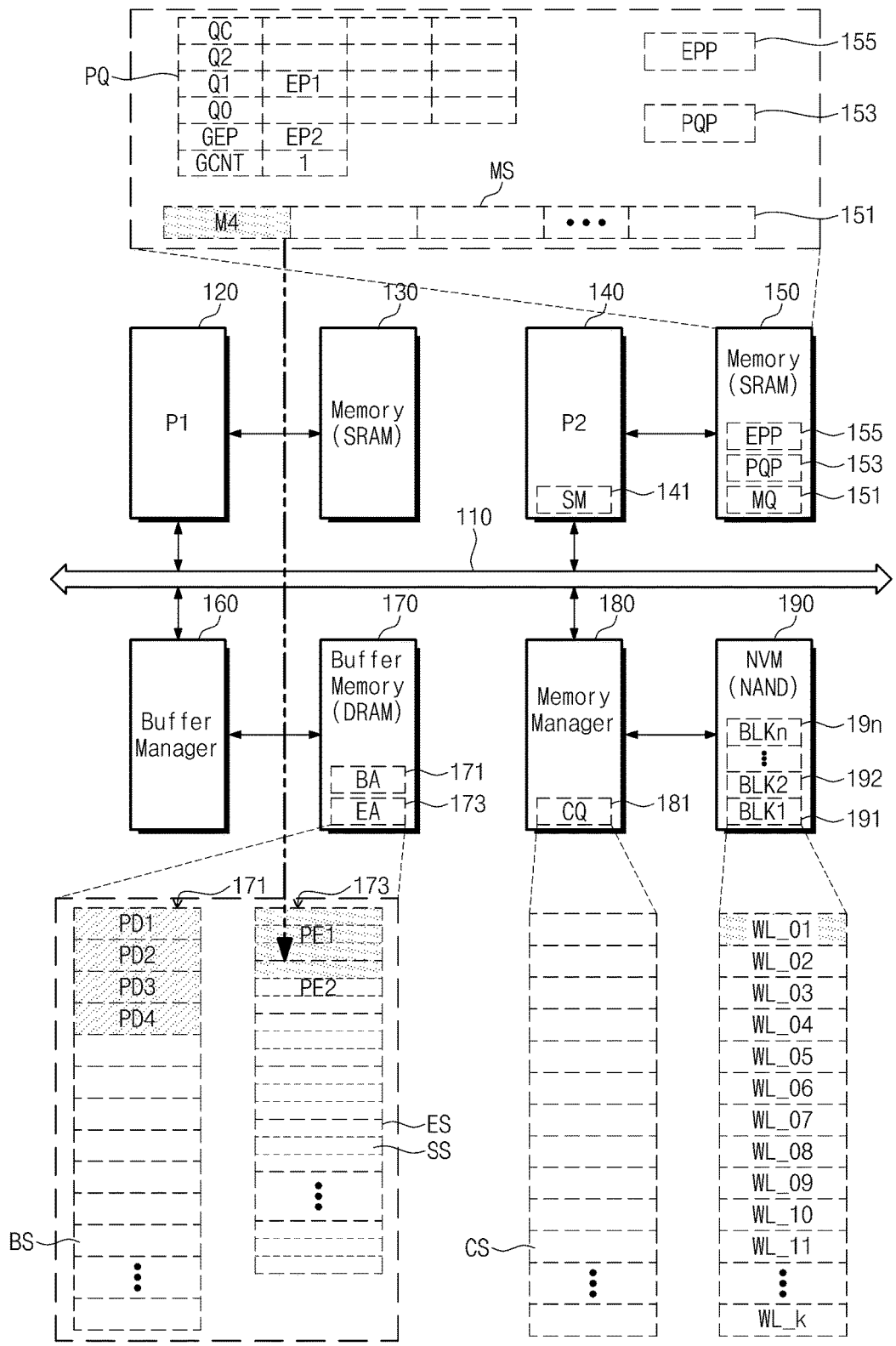

Referring to FIG. 21, the message M4 stored at the message queue 151 may be sent to an entity slot directed by the entity pointer EP2. The message M4 may be stored at a first sub slot of the entity slot directed by the entity pointer EP2 as a program entity PE2.

As information on the page data PD4 is stored at the program entity PE2 of the entity area 173, a count value of the gathering count register GNCT may increase. The count value may indicate that the program entity PE2 collects information on a page of data (e.g., LSB page data).

Figure 22:
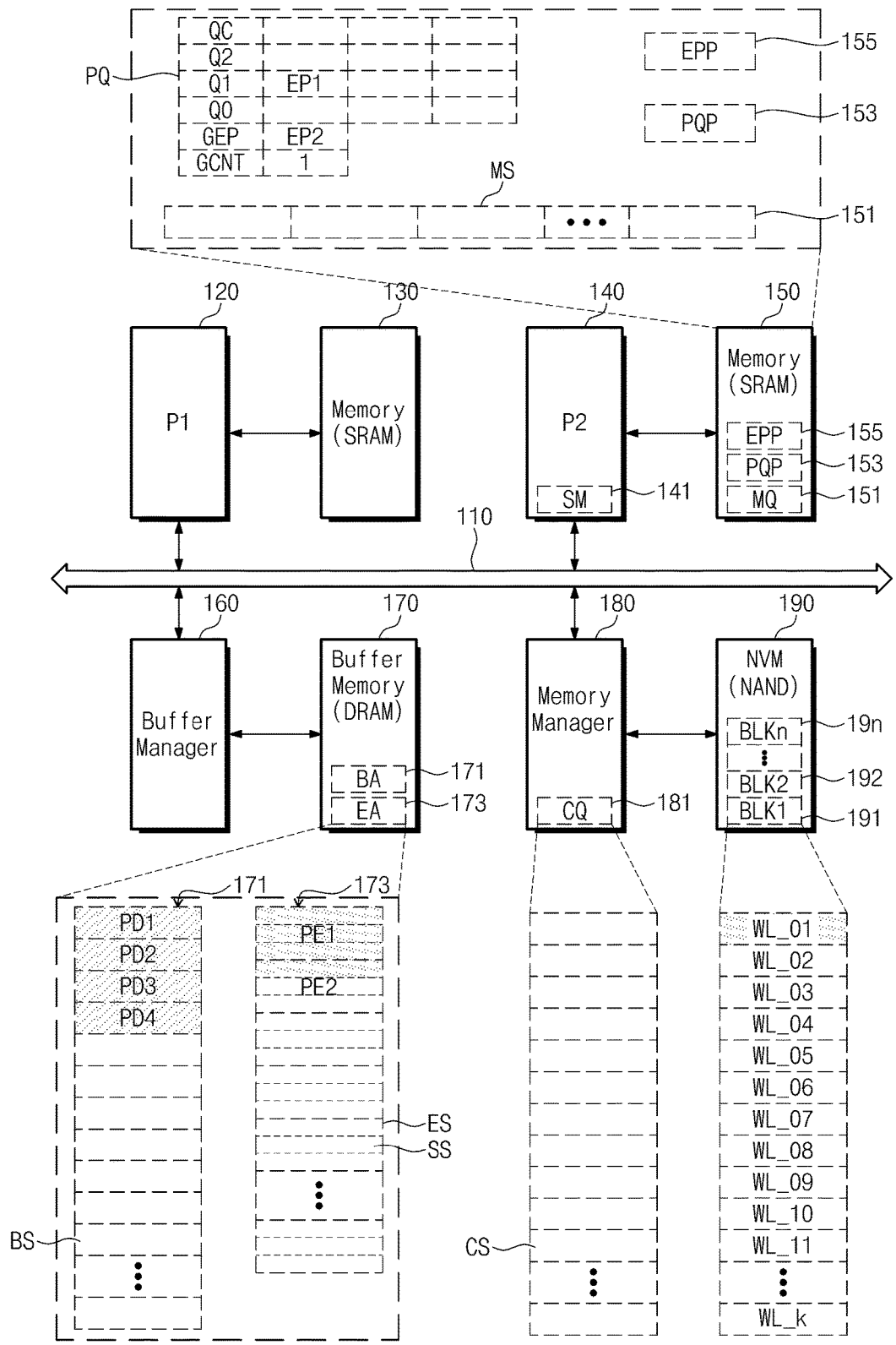

Referring to FIG. 22, the message M4 stored at the message queue 151 may be released.

As described with reference to FIGS. 11 to 13, a page of data (e.g., intermediate page data) corresponding to the program entity PE2 may be collected. Also, as describe with reference to FIGS. 14 to 16, another page of data (e.g., MSB page data) corresponding to the program entity PE2 may be collected.

Figure 23:
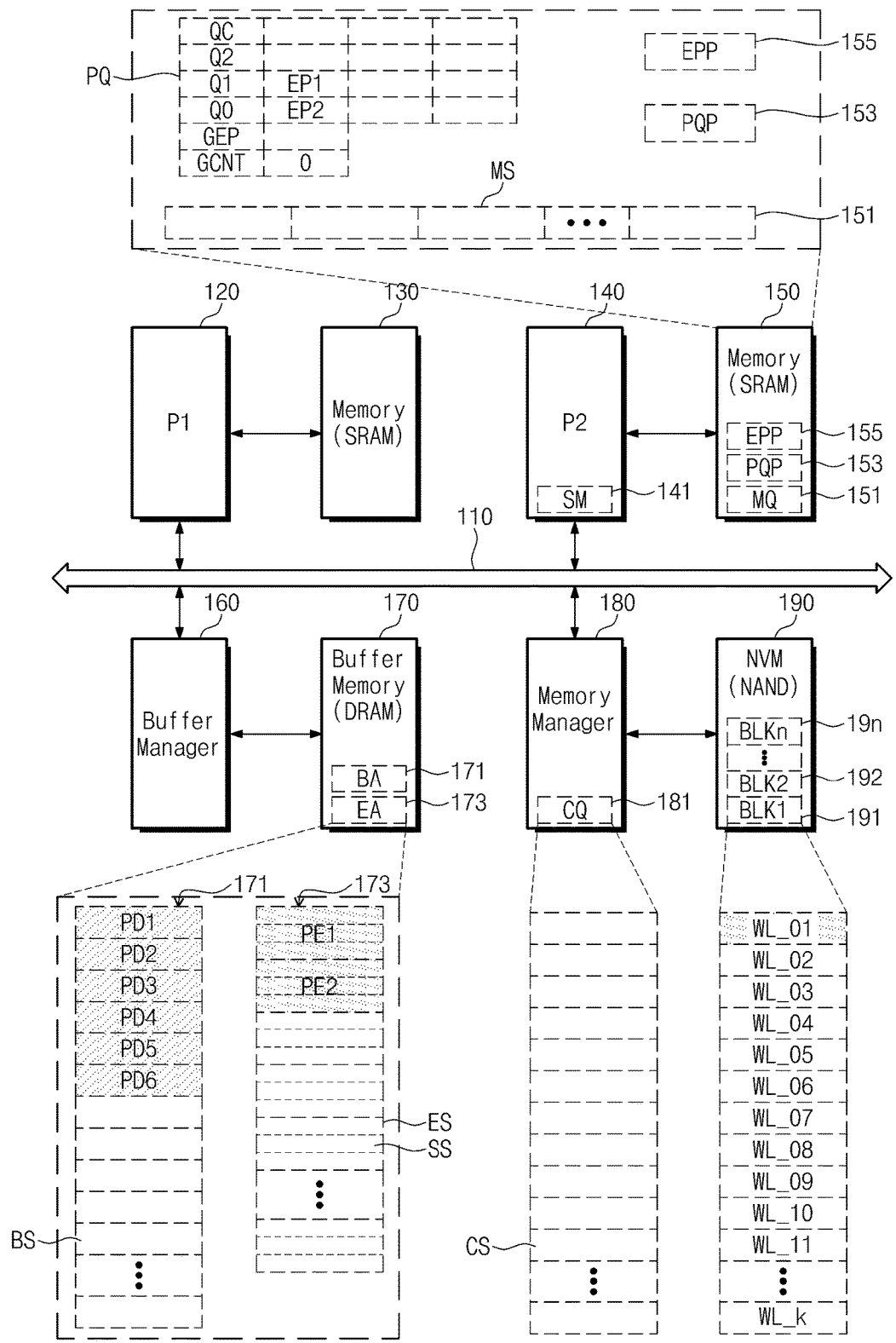

An example in which all pages of data corresponding to the program entity PE2 is collected may be illustrated in FIG. 23. In FIG. 23, intermediate page data corresponding to the program entity PE2 may be PD5 and MSB page data corresponding to the program entity PE2 may be PD6.

If all pages of data corresponding to the program entity PE2 are collected, a count value of the gathering count register GNCT may be 3. In response to the count value, the entity pointer EP2 indicating the program entity PE2 may be enqueued at the first stage Q0 of the program queue PQ. Then a count value of the gathering count register GNCT may be reset.

Figure 24:
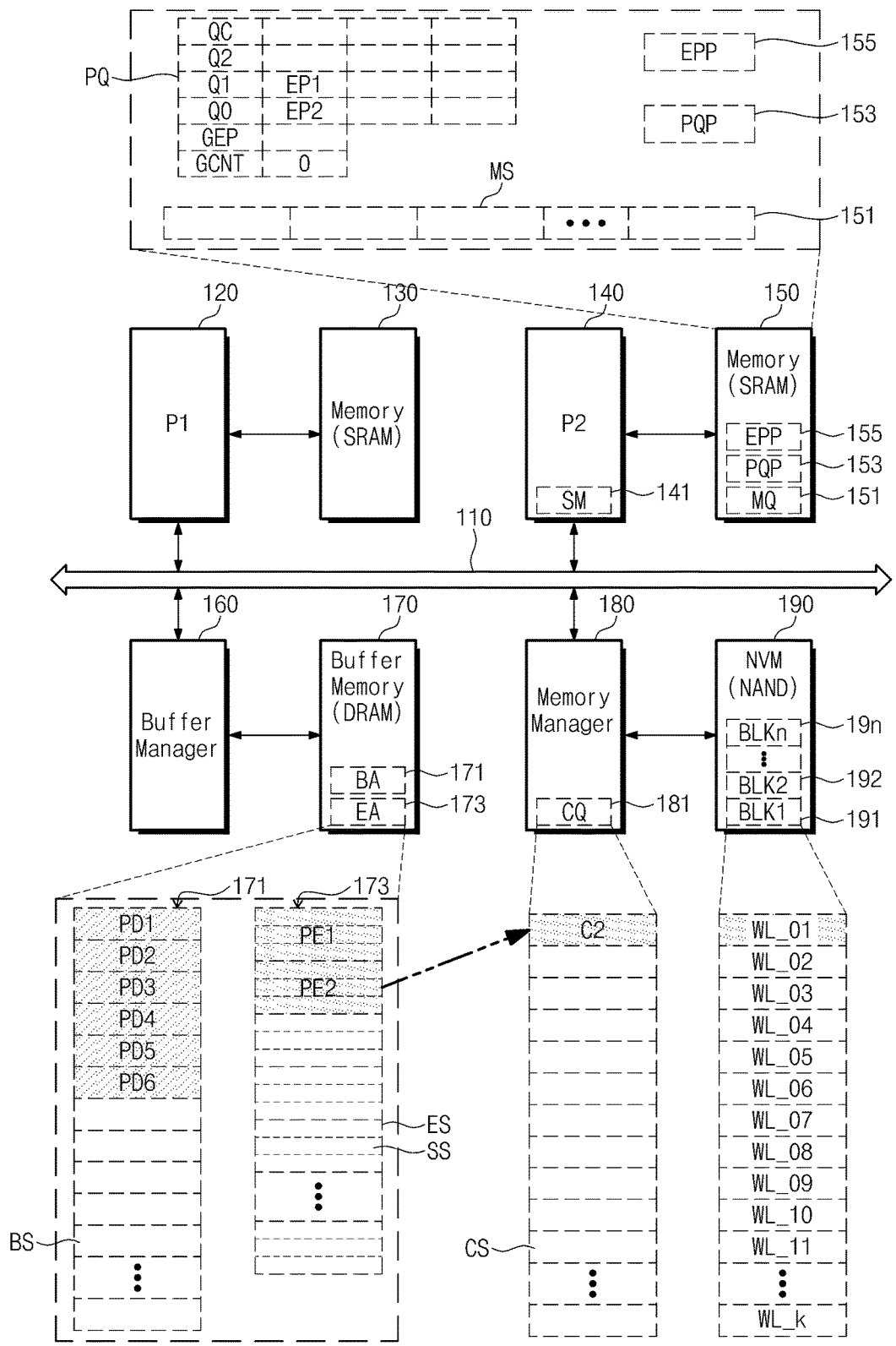

Referring to FIG. 24, as the entity pointer EP2 is enqueued at the first stage Q0 of the program queue PQ, program information of the program entity PE2 directed by the entity pointer EP2 may be enqueued at the command queue 181 as a command C2. The command C2 may be generated on the basis of the program entity PE2, and may be enqueued at the command queue 181.

Figure 25:
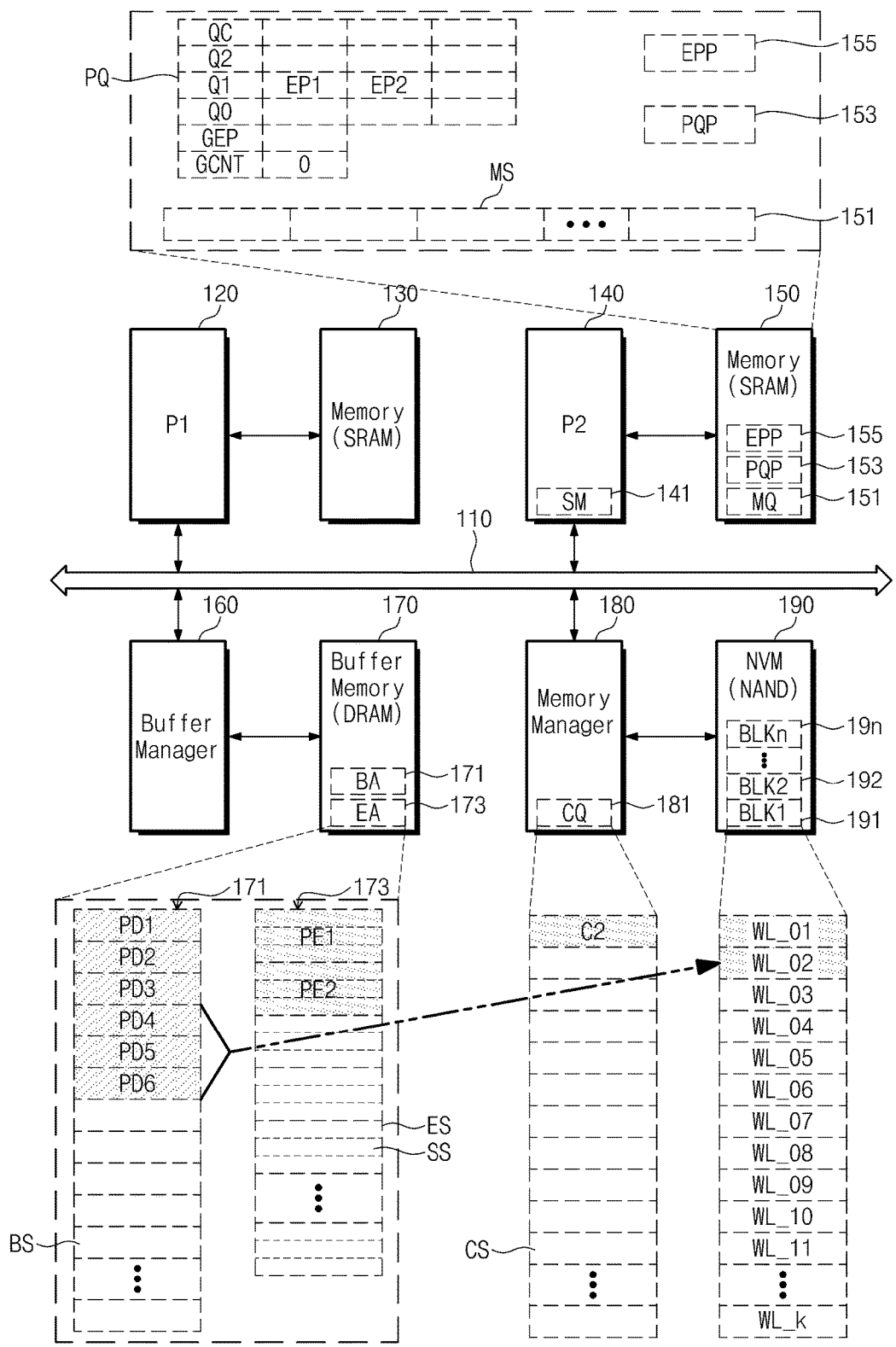

Referring to FIG. 25, as the command C2 is enqueued at the command queue 181, memory cells of the word line WL_02 directed by the program entity PE2 may be programmed based on the page data PD4, PD5, and PD6 directed by the program entity PE2. For example, at least two or more pages of data (e.g., at least LSB and intermediate page data) of the page data PD4, PD5, and PD6 may be sent to the nonvolatile memory 190. For example, at least two or more pages of data (e.g., at least LSB and intermediate page data) of the page data PD4, PD5, and PD6 may be programmed at the nonvolatile memory 190. Programming corresponding to the entity pointer EP2 or the program entity PE2 registered at the first stage Q0 of the program queue PQ may be 1-step programming of program steps of direct reprogram. The word line WL_02 connected to memory cells programmed by the 1-step programming is shown as alight black rectangular.

As the command C2 is enqueued at the command queue 181, the entity pointer EP2 causing an enqueue of the command C2 may be enqueued at a next stage Q1 of the program queue PQ.

As described with reference to FIG. 4, programming based on the entity pointer EP2 registered at the first stage Q0 of the program queue PQ may be issued in the $1^{st}$ state RS1. If the entity pointer EP2 is enqueued at a next stage Q1, the state machine 141 may enter the 2nd state RS2.

Figure 26:
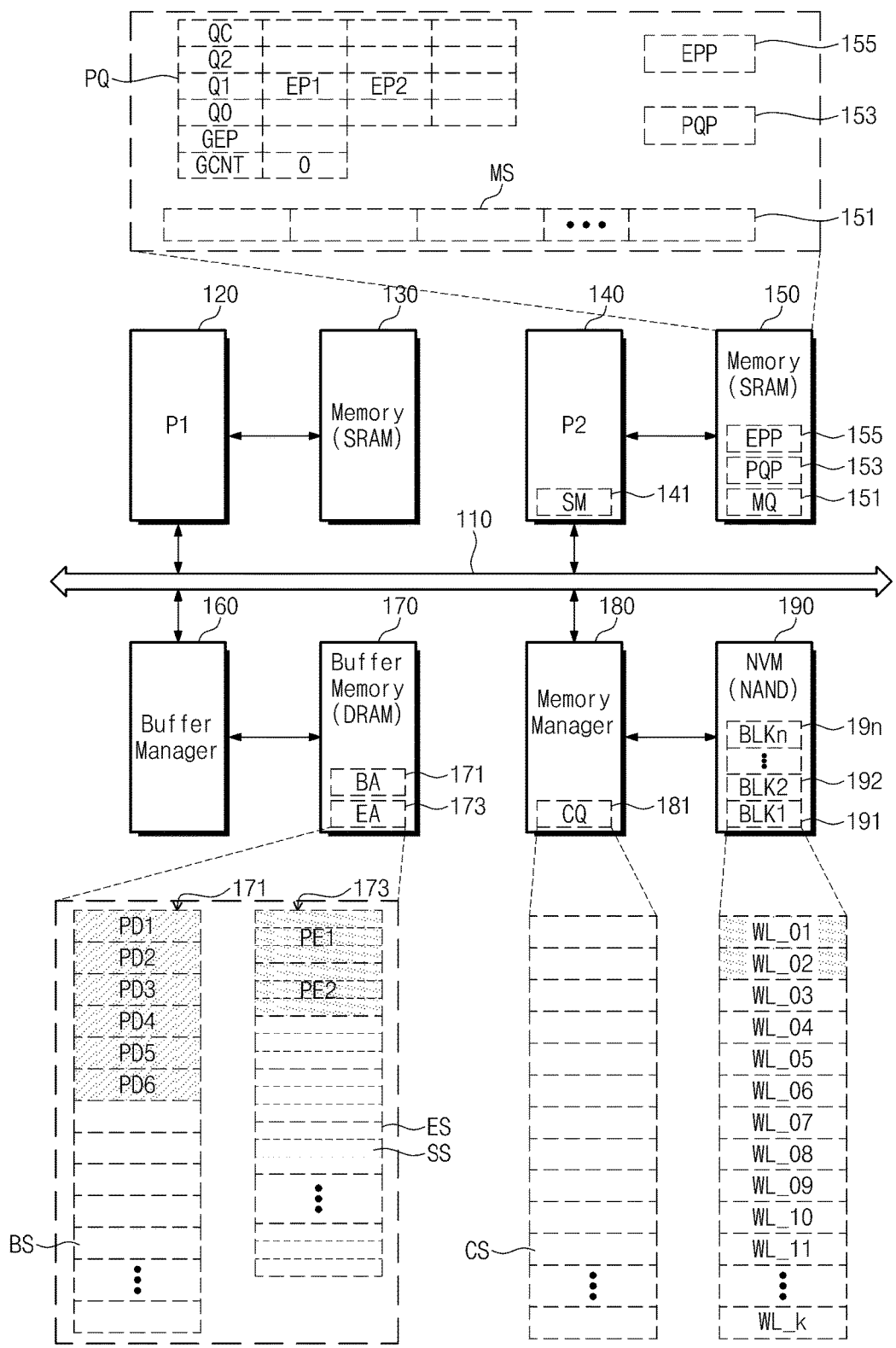

Referring to FIG. 26, if the 1-step programming based on the page data PD4, PD5, and PD6 is ended, the command C2 may be released from the command queue 181. At this time, the program entity PE2 and the page data PD4, PD5, and PD6 corresponding to the command C2 may not be released in the buffer memory 170.

For a simple description, it is described an example in which the state machine 141 enters the $2^{nd}$ state RS2 after programming based on the entity pointer EP2 is ended. However, the state machine 141 may enter the $2^{nd}$ state RS2 when the command C2 is enqueued at the command queue 181 in response to an enqueue of the entity pointer EP2. Although programming according to the command C2 is being performed at the nonvolatile memory 190, the state machine 141 may enter the $2^{nd}$ state RS2. The state machine 141 can enter the $2^{nd}$ state RS2 before the command C2 is released.

$2^{nd}$ State (RS2)

Figure 27:
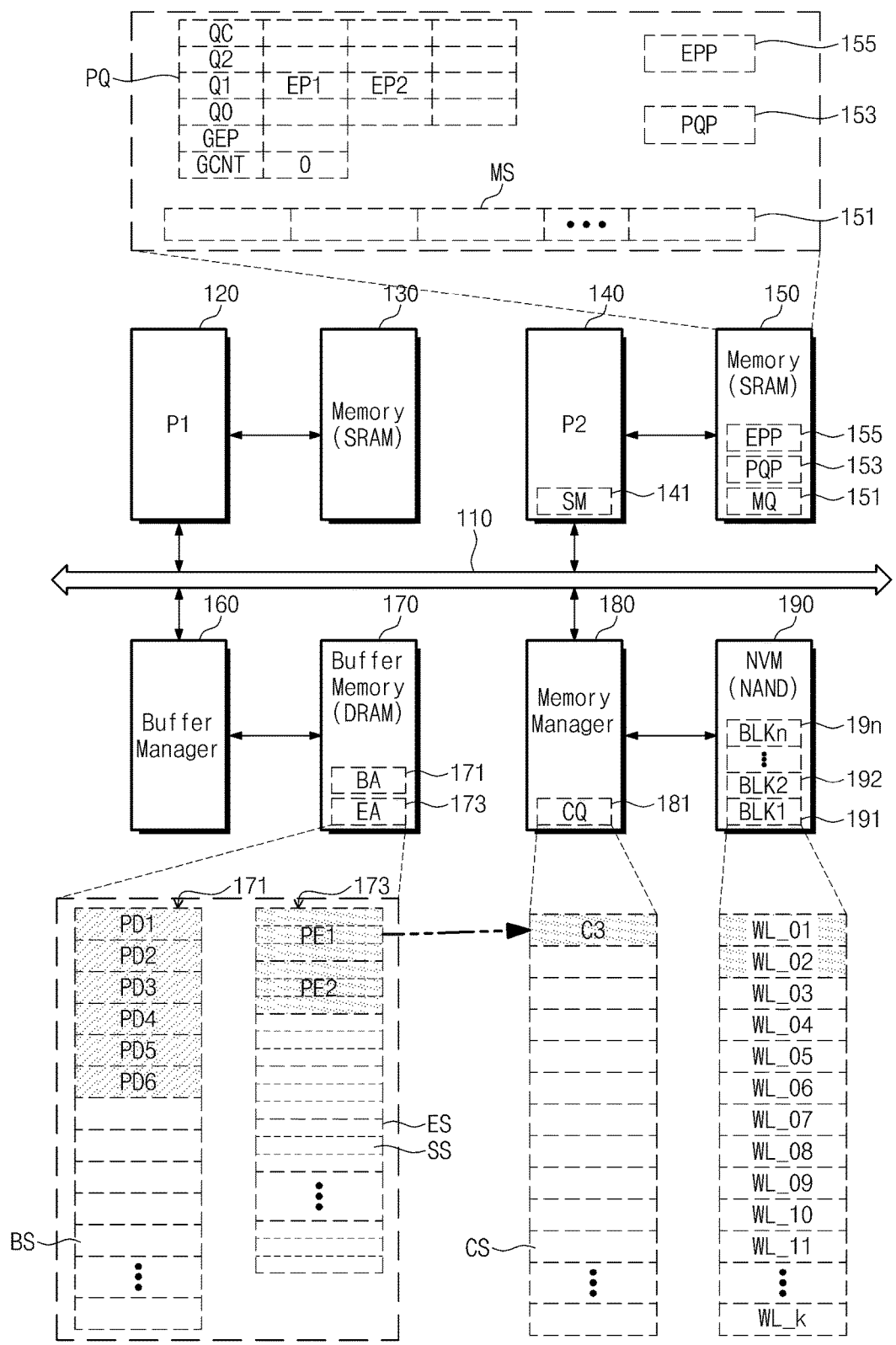

Referring to FIGS. 4 and 27, an operation based on the first entity pointer EP1 registered at a second slot Q1 of the program queue PQ is performed. For example, program information of the program entity PE1 directed by the entity pointer EP1 is enqueued at the command queue 181. A command C3 may be generated based on the program entity PE1, and is enqueued at the command queue 181.

Figure 28:
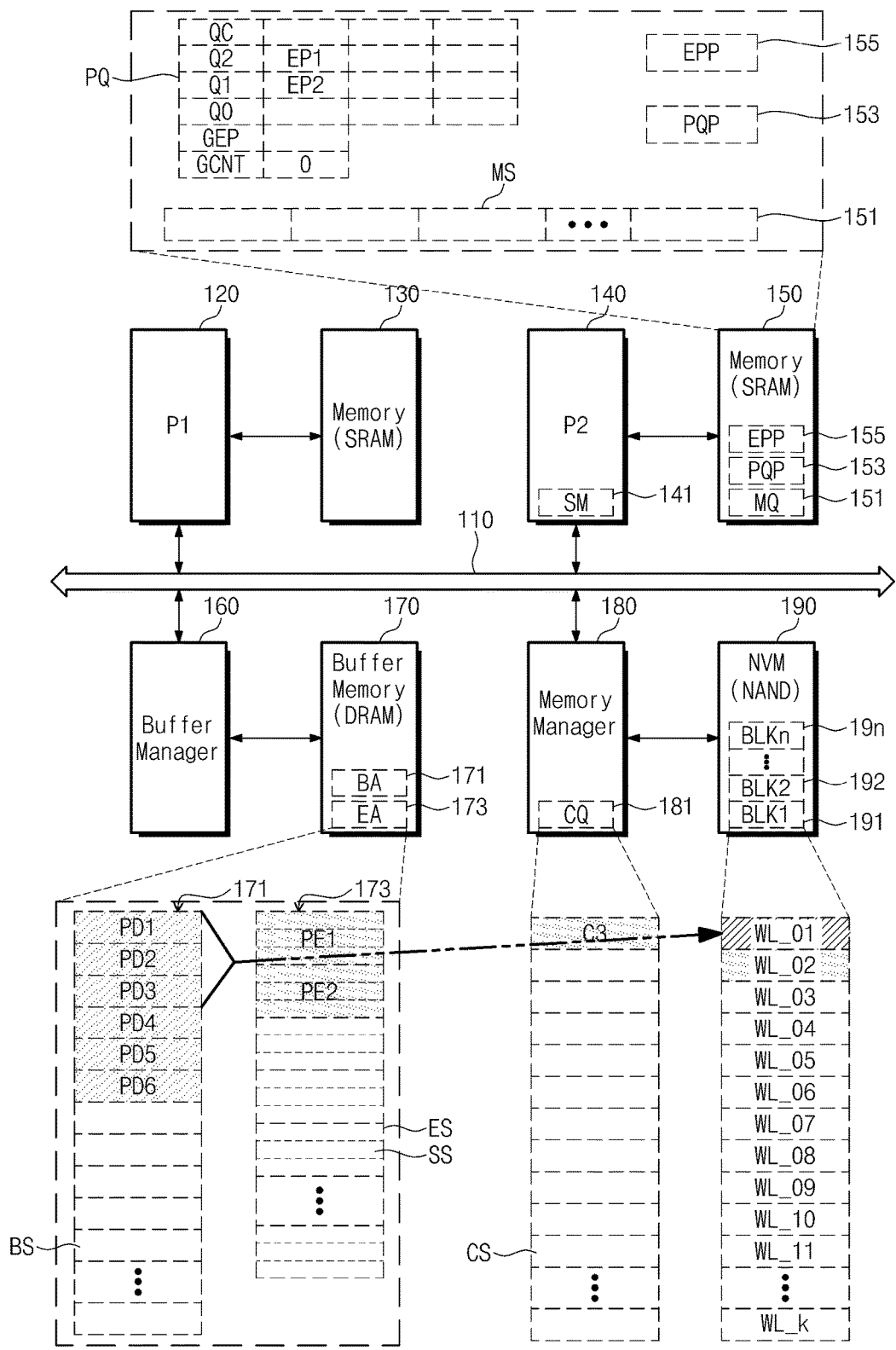

Referring to FIG. 28, as the command C3 is enqueued at the command queue 181, memory cells of the word line WL_01 directed by the program entity PE1 may be programmed based on the page data PD1, PD2, and PD3 directed by the program entity PE1. Programming corresponding to the entity pointer EP1 or the program entity PE1 registered at the second stage Q1 of the program queue PQ may be coarse programming of program steps of the direct reprogram. The word line WL_01 connected to memory cells programmed by the coarse programmed is shown as a rectangular filled with oblique lines.

As the command C3 is enqueued at the command queue 181, the entity pointer EP1 causing an enqueue of the command C3 may be enqueued at a next stage Q2 of the program queue PQ.

As described with reference to FIG. 4, if programming based on the entity pointer EP1 registered at the second stage Q1 of the program queue PQ is issued in the $2^{nd}$ state RS2, the state machine 141 enters the $3^{rd}$ state RS3.

Figure 29:
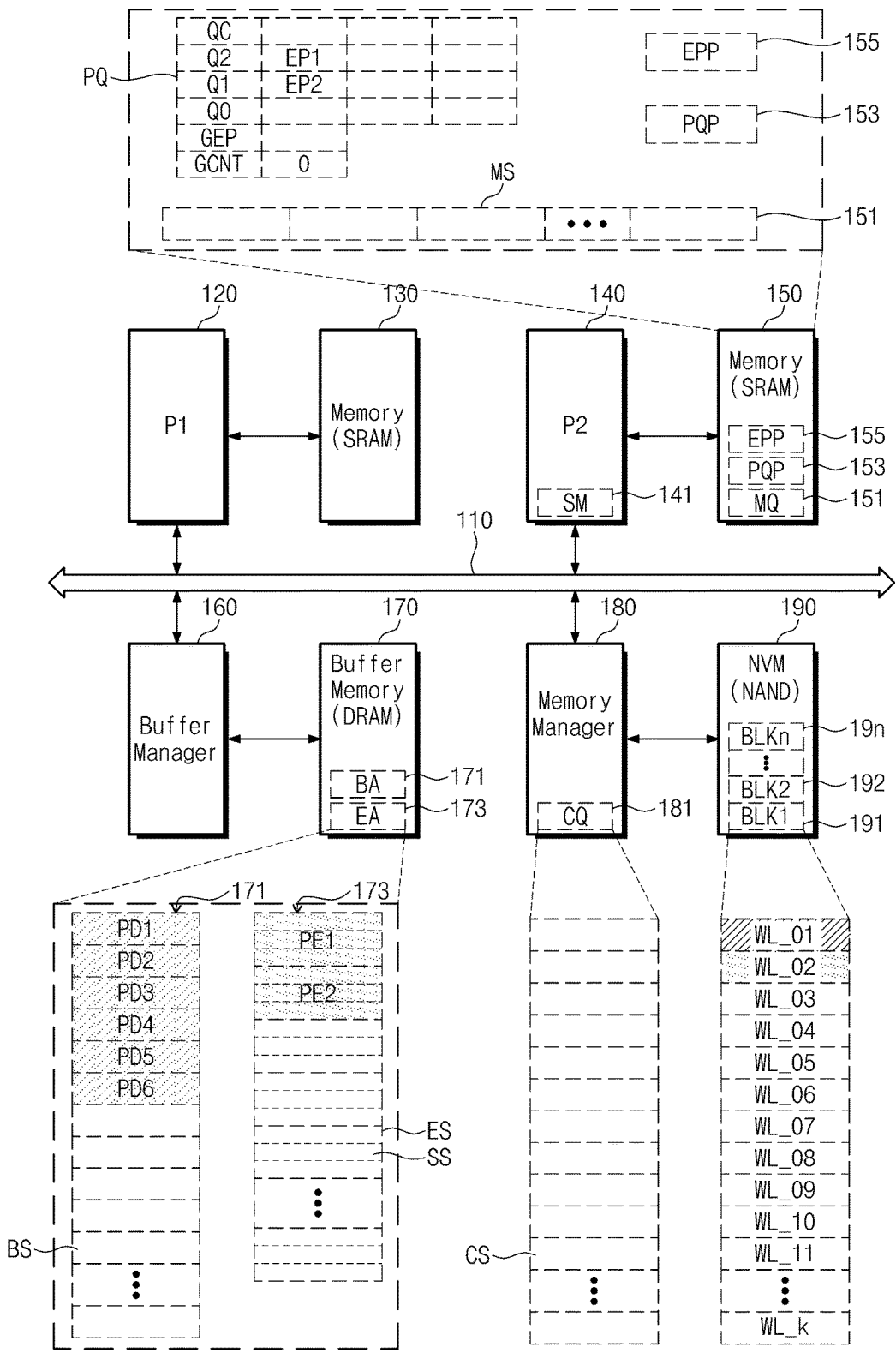

Referring to FIG. 29, if the coarse programming based on the page data PD1, PD2, and PD3 is ended, the command C3 may be released from the command queue 181. At this time, the program entity PE1 and the page data PD1, PD2, and PD3 corresponding to the command C3 are not released in the buffer memory 170.

Figure 30:
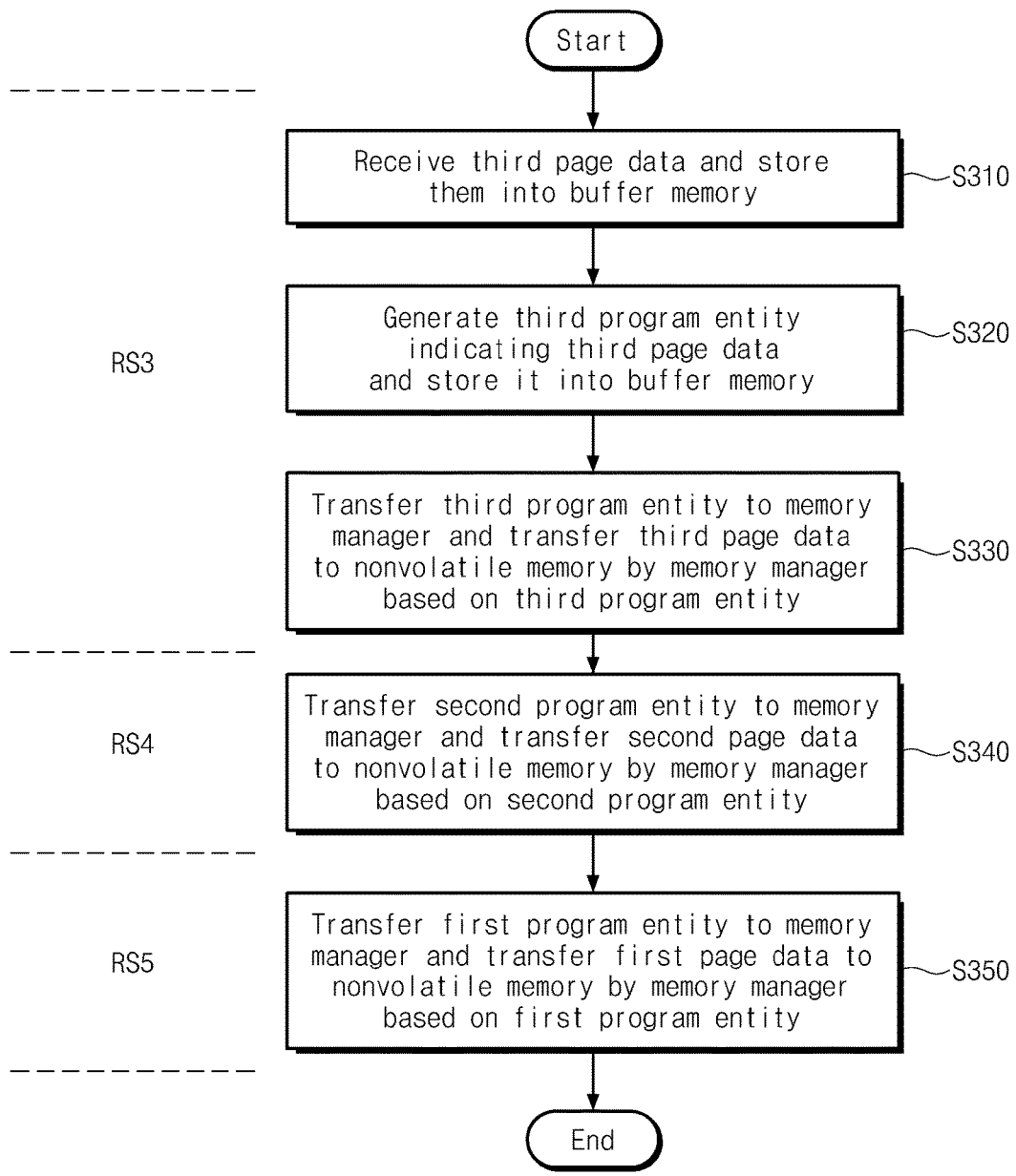
FIG. 30 is a flowchart illustrating an operating method of a memory controller according to still another embodiment of the inventive concepts.

FIG. 30 is a flowchart illustrating an operating method of a memory controller according to still another embodiment of the inventive concepts. In FIG. 30, an operation following an operation illustrated in FIG. 5 may be shown. Referring to FIGS. 1, 3, 4, and 30, in operation S310, third page data is received, and the third page data received is stored into a buffer memory 170. The third page data is data to be stored at memory cells connected with a third word line of a nonvolatile memory 190. The third page data may be LSB page data.

In operation S320, a third program entity indicating the third page data stored at the buffer memory 170 is generated. The third program entity is stored into the buffer memory 170.

If all page data to be programmed at the memory cells of the third word line is received, the third program entity is enqueued at a program queue PQ.

In operation S330, program information of the third program entity is sent to a memory manager 180. Page data (e.g., two or more pages of data to be programmed at a third word line WL_03) including the third page data is transferred to a nonvolatile memory 190 by the memory manager 180, based on the program information of the third program entity.

Operations S310 to S330 corresponds to a $3^{rd}$ state RS3 of the state machine 141. The state machine 141 issues programming of the memory cells connected with the third word line WL_03, based on the third program entity corresponding to the third word line WL_03. The state machine 141 enqueues the third program entity at a next stage of the program queue PQ.

In operation S340, program information of the second program entity is sent to the memory manager 180. Second data is sent to the nonvolatile memory 190 based on program information of the second program entity by the memory manager 180.

Operation S340 corresponds to a $4^{th}$ state RS4. The state machine 141 issues programming of memory cells connected with the second word line WL_02, based on the second program entity corresponding to memory cells of the second word line WL_02. The state machine 141 can enqueue the second program entity at a next stage of the program queue PQ.

In operation S350, program information of the first program entity is sent to the memory manager 180. First data is transferred to the nonvolatile memory 190 by the memory manager 180, based on the program information of the first program entity.

Operation S350 corresponds to a $5^{th}$ state RS5 of the state machine 141. The state machine 141 issues programming of memory cells connected with the first word line WL_01, based on the first program entity corresponding to the first word line WL_01. The state machine 141 may enqueue the first program entity at a next stage of the program queue PQ.

FIGS. 31 to 41 are diagrams illustrating a data processing operation of a memory system 100 according to an operating method illustrated in FIG. 30. As described with reference to FIG. 30, an operation of a state machine 141 will be described from the $3^{rd}$ state RS3.

$3^{rd}$ State (RS3)

Figure 31:
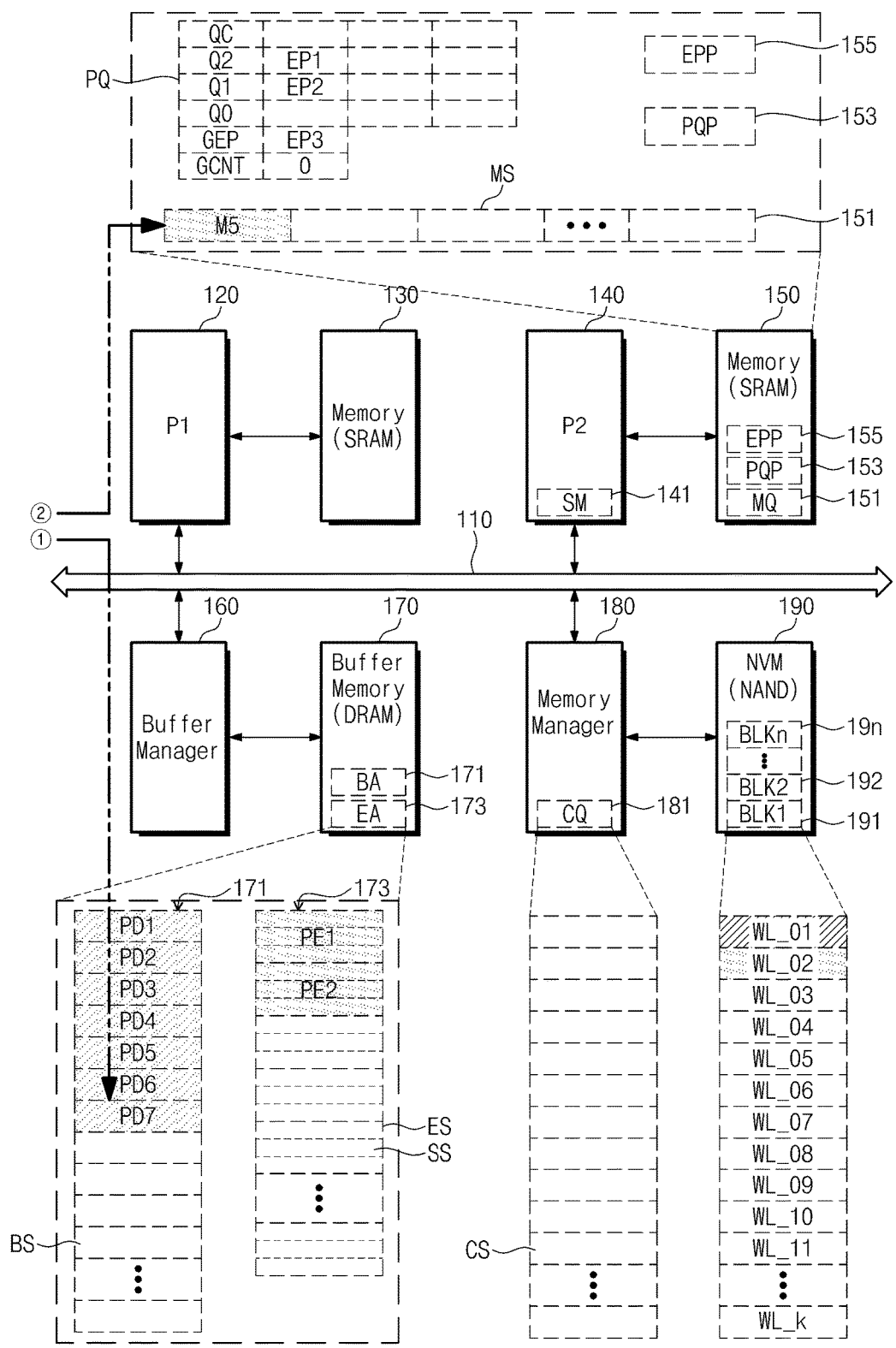
FIGS. 31 to 41 are diagrams illustrating a data processing operation of a memory system according to an operating method illustrated in FIG. 30.

Referring to FIGS. 4, 30, and 31, page data PD7 is received from an external device (e.g., a host) (①). The page data PD7 is stored at an empty buffer slot of the buffer area 171. For example, the page data PD7 may be LSB page data to be programmed at an LSB page of a third word line WL_03 of a nonvolatile memory 190.

An address and a command corresponding to the page data PD1 is received (②). The received address and command may be enqueued at a message queue 151 as a message M5. For example, a message M5 may be generated on the basis of an address and a command, and may be enqueued at the message queue 151.

Since a program queue PQ corresponding to the memory block at which the page data PD7 is to be programmed has been generated, the program queue PQ may not be generated separately. Since an entity pointer EP3 managed at a gathering entity pointer register GEP does not exist, a new entity pointer EP3 may be allocated from an entity pointer pool 155. The entity pointer EP3 indicates an empty entity slot of entity slots of an entity area 173. For example, the entity pointer EP3 may be allocated together with an empty entity slot.

Afterwards, as described with reference to FIGS. 21 and 22, a program entity PE3 corresponding to the entity pointer EP3 may be stored at the entity area 173.

As described with reference to FIGS. 11 to 13, a page of data (e.g., intermediate page data) corresponding to the program entity PE3 may be collected. As described with reference to FIGS. 14 to 16, another page of data (e.g., MSB page data) corresponding to the program entity PE3 may be collected.

Figure 32:
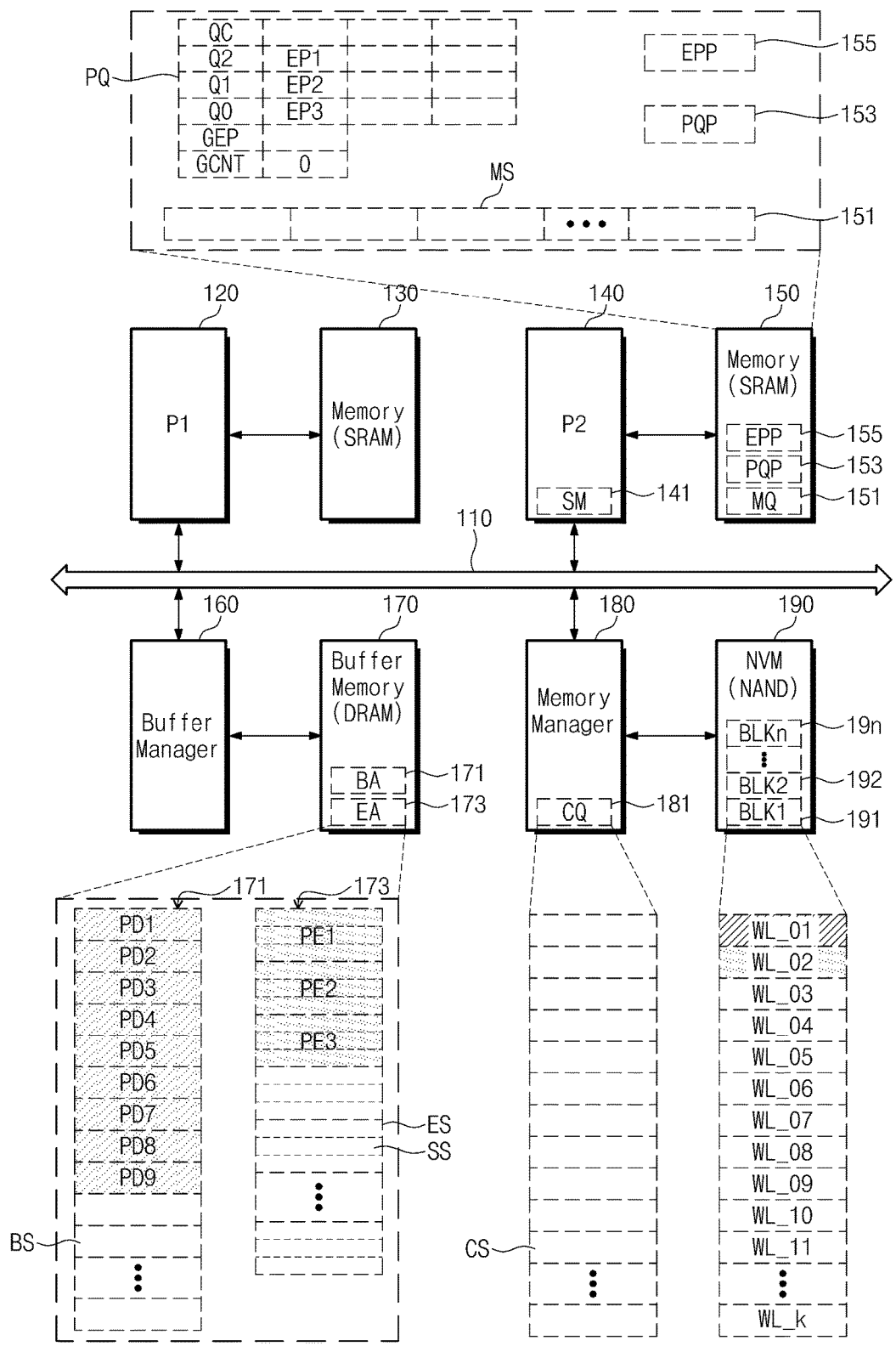

An example in which all pages of data corresponding to the program entity PE3 are collected is illustrated in FIG. 32. In FIG. 32, intermediate page data corresponding to the program entity PE3 is PD8 and MSB page data corresponding to the program entity PE3 is PD9.

If all pages of data corresponding to the program entity PE2 are collected, the entity pointer EP3 indicating the program entity PE3 is enqueued at a first stage Q0 of the program queue PQ.

Figure 33:
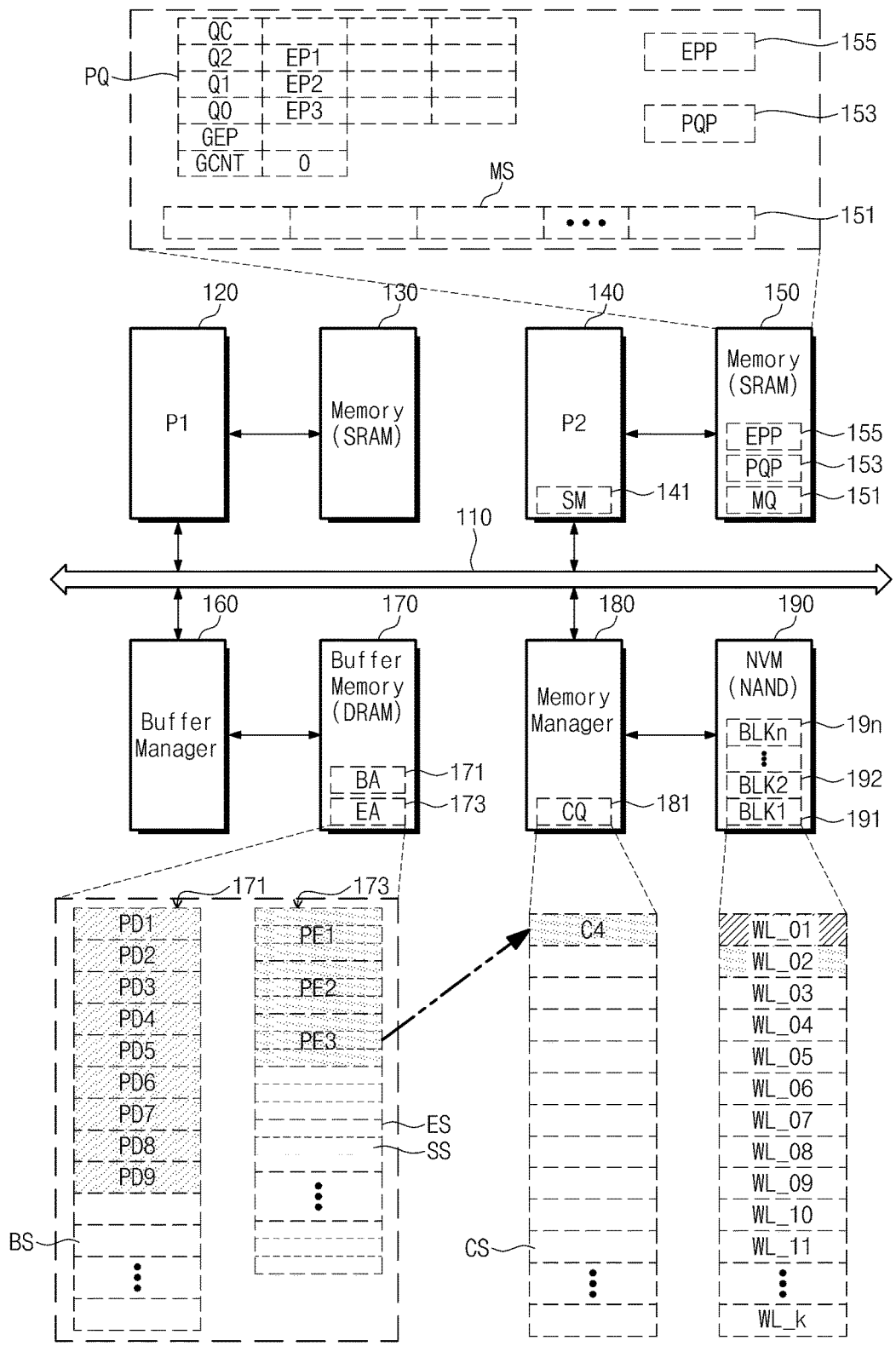

Referring to FIGS. 4, 30, and 33, as the entity pointer EP3 is enqueued at the first stage Q0 of the program queue PQ, the program entity PE3 directed by the entity pointer EP3 may be enqueued at a command queue 181 as a command C4. In other example embodiments, the command C4 may be generated on the basis of the program entity PE3, and may be enqueued at the command queue 181.

Figure 34:
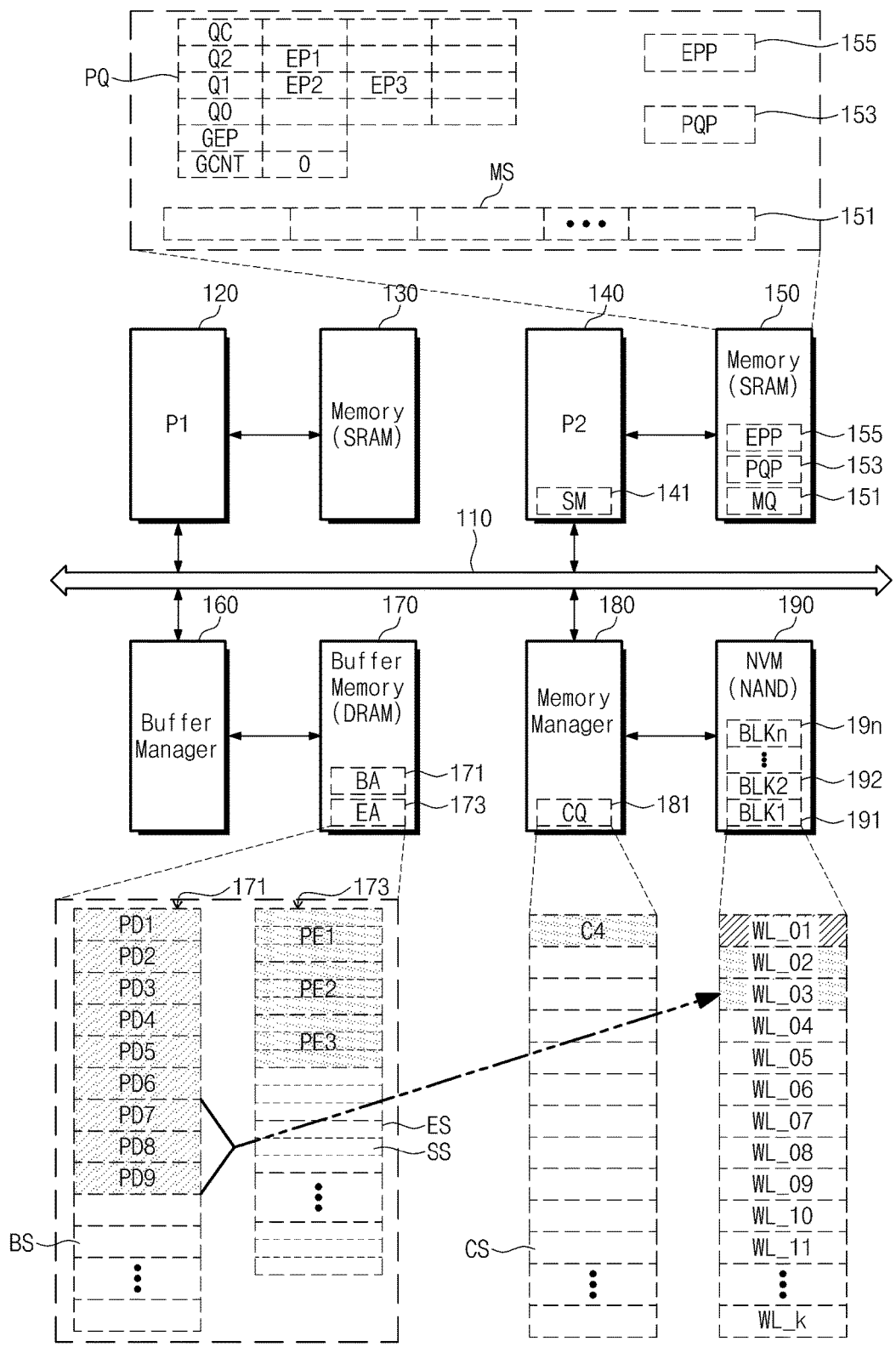

Referring to FIG. 34, as the command C4 is enqueued at the command queue 181, memory cells of the word line WL_03 directed by the program entity PE3 may be programmed based on the page data PD7, PD8, and PD9 directed by the program entity PE3. For example, at least two or more pages of data (e.g., at least LSB and intermediate page data) of the page data PD7, PD8, and PD9 may be sent to the nonvolatile memory 190. For example, at least two or more pages of data (e.g., at least LSB and intermediate page data) of the page data PD7, PD8, and PD9 may be programmed at the nonvolatile memory 190. Programming according to the entity pointer EP3 or the program entity PE3 registered at the first stage Q0 of the program queue PQ is 1-step programming of program steps of direct reprogram. The word line WL_03 connected to memory cells programmed by the 1-step programming is shown as a rectangular filled with dots.

As the command C4 is enqueued at the command queue 181, the entity pointer EP3 causing an enqueue of the command C4 is enqueued at a next stage Q1 of the program queue PQ.

Figure 35:
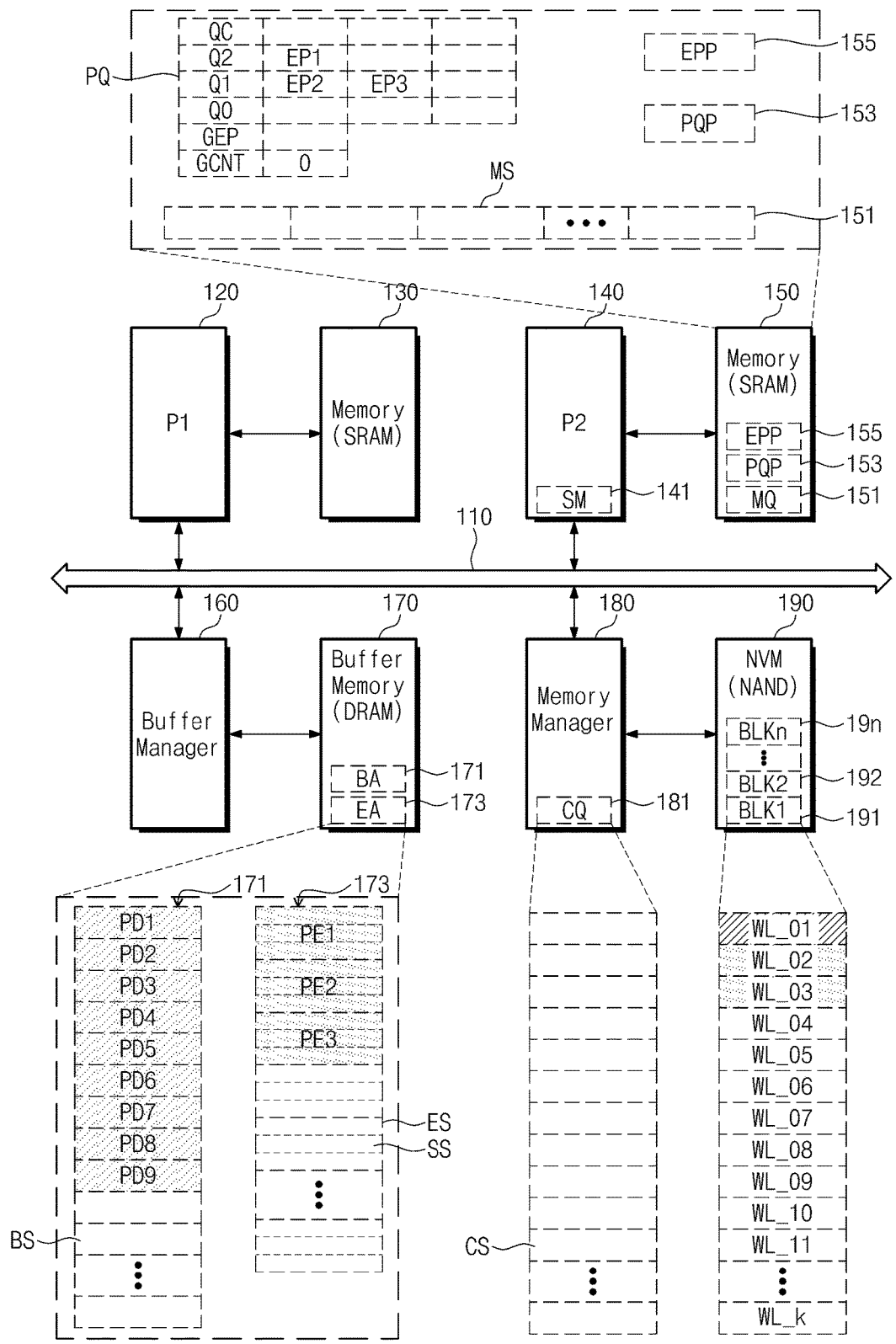

Referring to FIG. 35, if the 1-step programming based on the page data PD7, PD8, and PD9 is ended, the command C4 may be released from the command queue 181. At this time, the program entity PE3 and the page data PD7, PD8, and PD9 corresponding to the command C4 are not be released in the buffer memory 170.

As described with reference to FIG. 4, programming based on the entity pointer EP3 registered at the first stage Q0 of the program queue PQ is issued in the $3^{rd}$ state RS3. If the entity pointer EP3 is enqueued at a next stage Q1 of the program queue PQ, the state machine 141 may enter the $4^{th}$ state RS4.

For a simple description, it is described an example in which the state machine 141 enters the $4^{th}$ state RS4 after the 1-step programming based on the entity pointer EP3 is ended. However, the state machine 141 may enter the $4^{th}$ state RS4 when the command C4 is enqueued at the command queue 181 in response to an enqueue of the entity pointer EP3. Although programming according to the command C4 is being performed at the nonvolatile memory 190, the state machine 141 may enter the $4^{th}$ state RS4. The state machine 141 can enter the $4^{th}$ state RS4 before the command C4 is released.

$4^{th}$ State (RS4)

Figure 36:
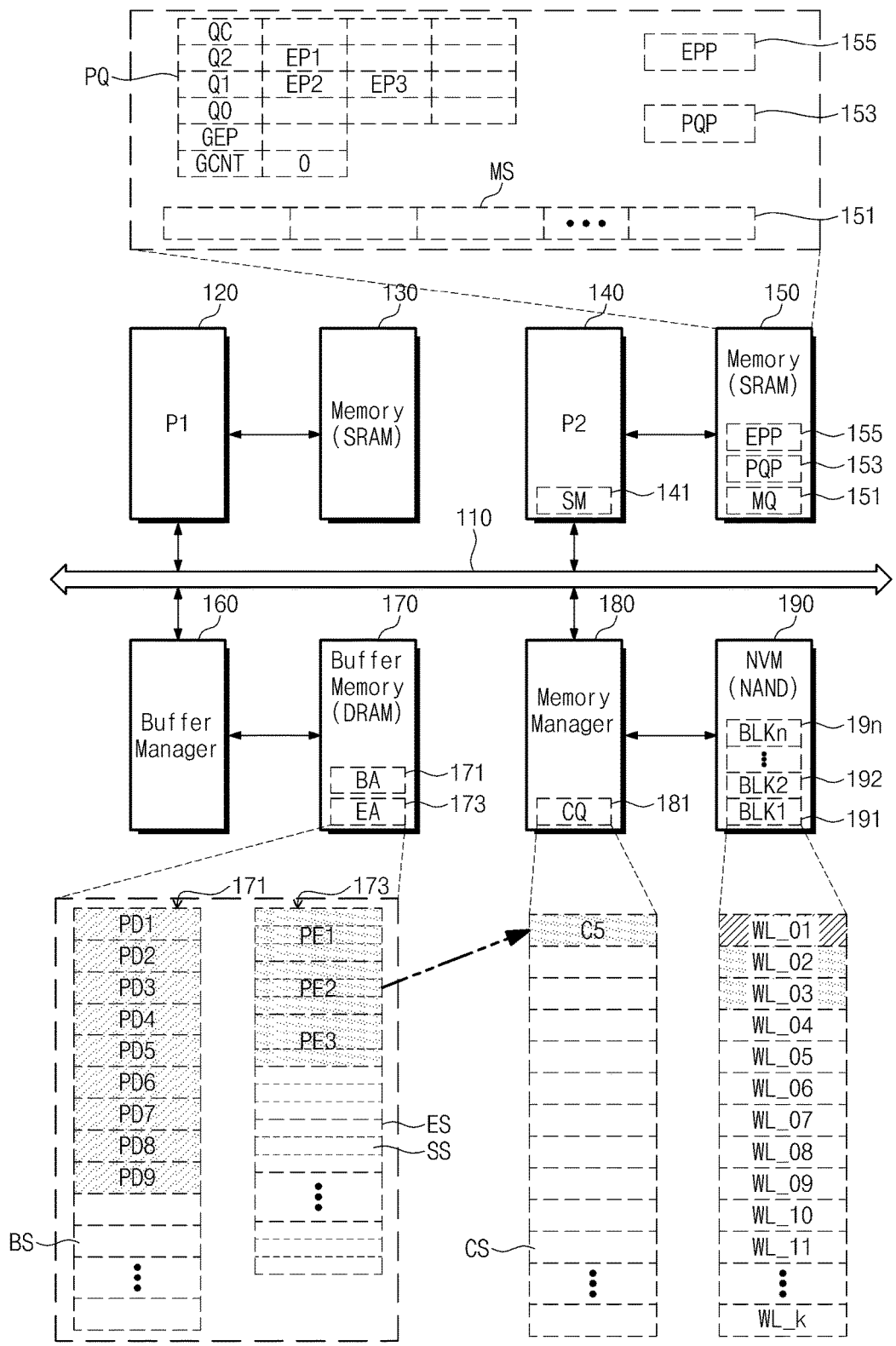

Referring to FIGS. 4 and 36, as programming corresponding to the command C5 is issued, an operation based on the second entity pointer EP2 registered at the second stage Q1 of the program queue PQ is performed. For example, program information of the program entity PE2 directed by the entity pointer EP2 may be enqueued at the command queue 181 as a command C5. In other example embodiments, a command C5 may be generated based on the program entity PE2, and may be enqueued at the command queue 181.

Figure 37:
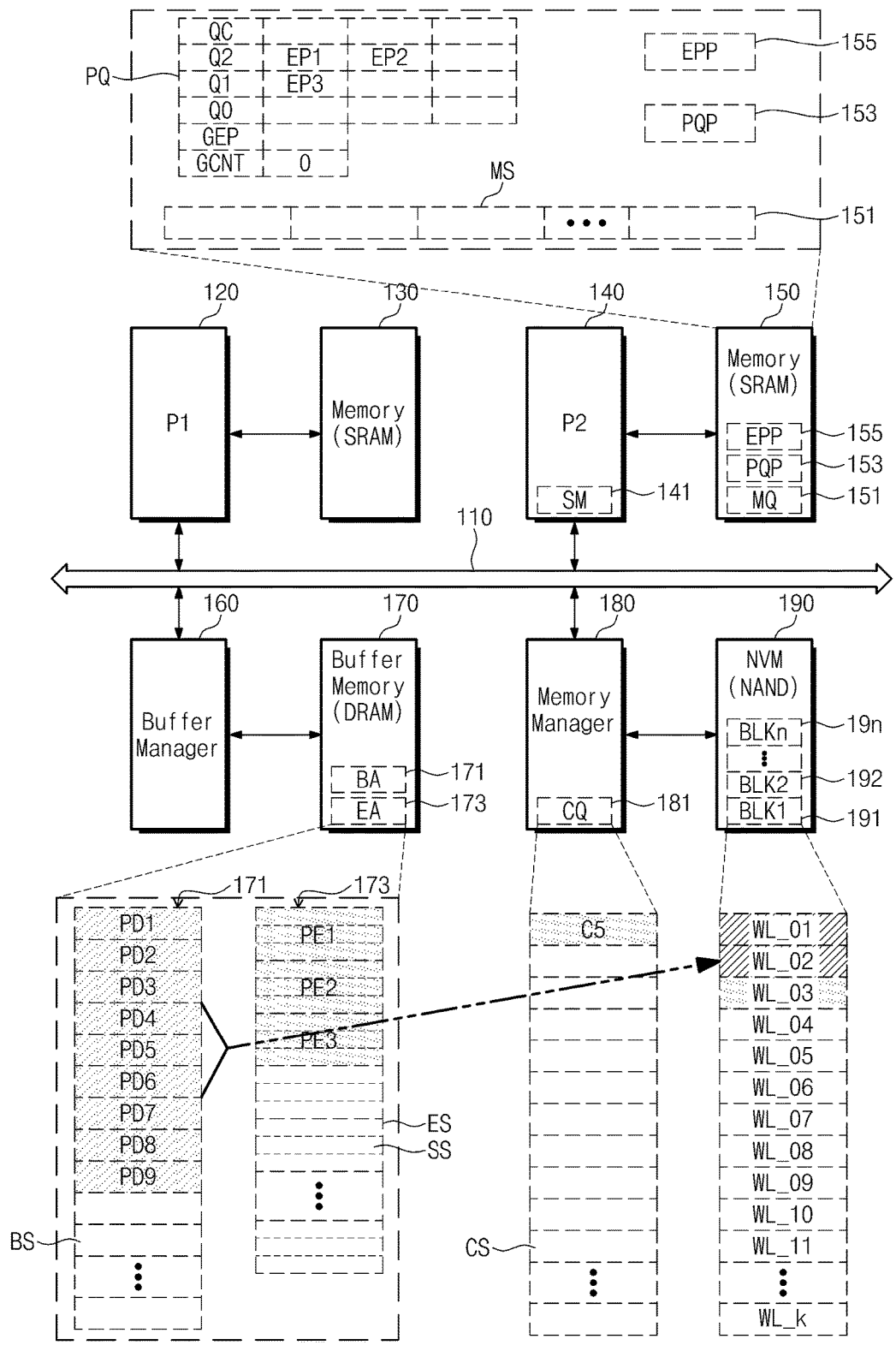

Referring to FIG. 37, as the command C5 is enqueued at the command queue 181, memory cells of the word line WL_02 directed by the program entity PE2 may be programmed based on the page data PD4, PD5, and PD6 directed by the program entity PE2. Programming according to the entity pointer EP2 or the program entity PE2 registered at the second stage Q1 of the program queue PQ is coarse programming of program steps of the direct reprogram. The word line WL_02 connected to memory cells programmed by the coarse programming is shown as a rectangular filled with oblique lines.

As the command C5 is enqueued at the command queue 181, the entity pointer EP2 causing an enqueue of the command C5 is enqueued at a next stage Q2 of the program queue PQ.

Figure 38:
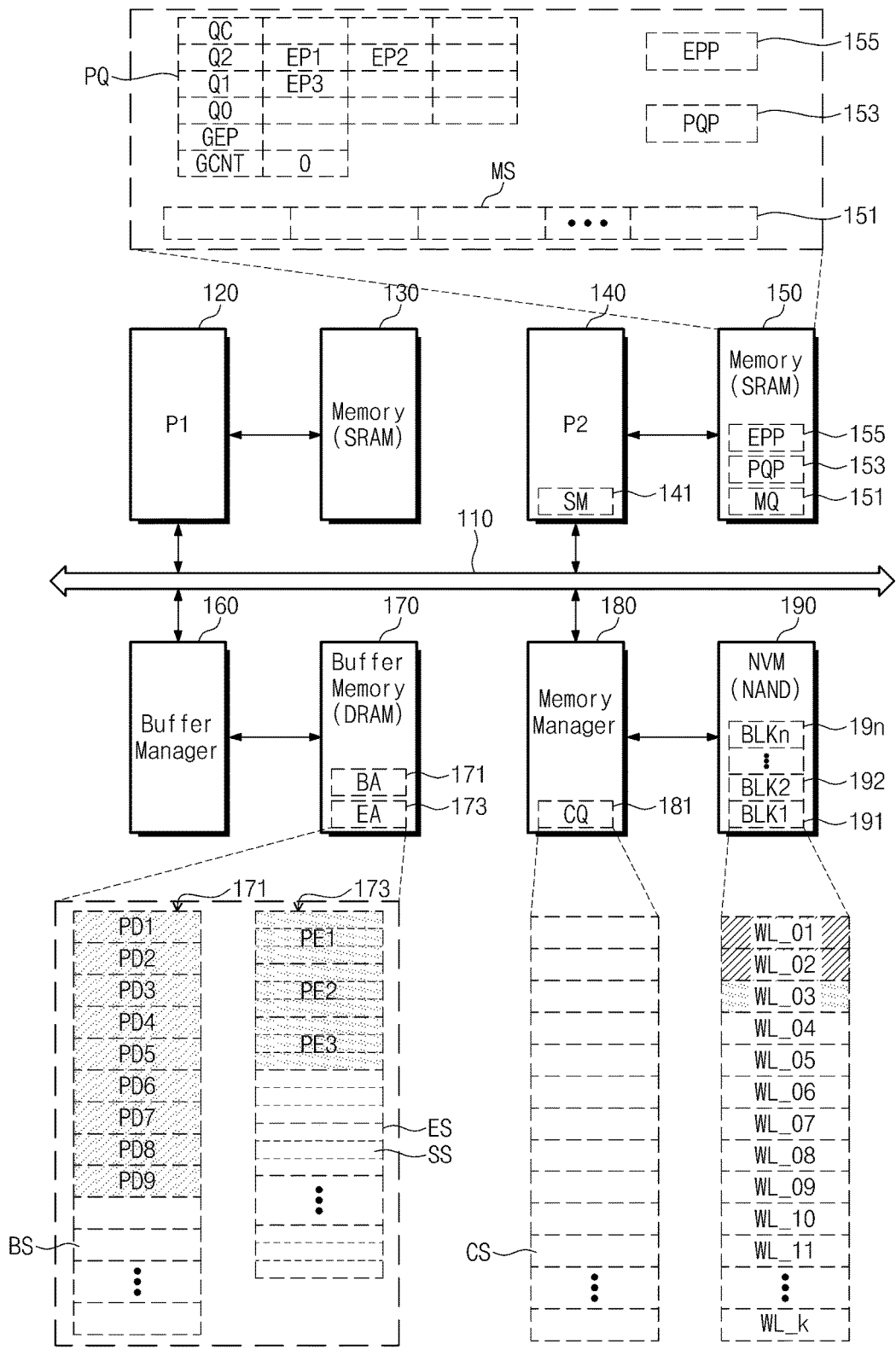

Referring to FIG. 38, if the coarse programming based on the page data PD4, PD5, and PD6 is ended, the command C5 may be released from the command queue 181. At this time, the program entity PE2 and the page data PD4, PD5, and PD6 corresponding to the command C5 are not released in the buffer memory 170.

As described with reference to FIG. 4, programming based on the entity pointer EP2 registered at the second stage Q1 of the program queue PQ may be issued in the $4^{th}$ state RS4. If the entity pointer EP2 is enqueued at a next stage of the program queue PQ, the state machine 141 may enter the $5^{th}$ state RS5.

$5^{th}$ State (RS5)

Figure 39:
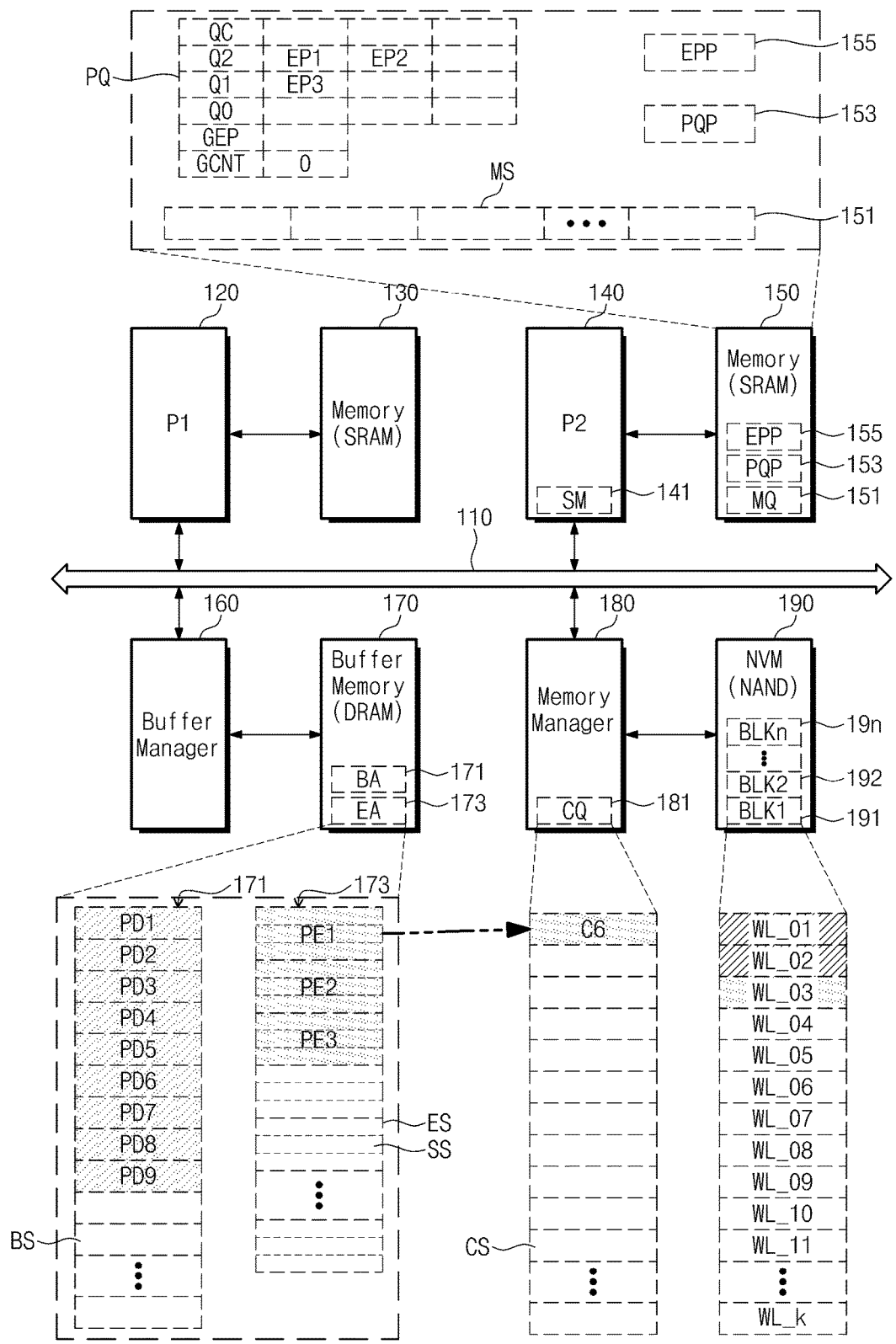

Referring to FIGS. 4 and 39, as programming according to the command C6 is issued, an operation based on the first entity pointer EP1 registered at a third stage Q2 of the program queue PQ is performed. For example, a program entity PE1 directed by the first entity pointer EP1 may be enqueued at the command queue 181 as a command C6. In other example embodiments, a command C6 may be generated based on the program entity PE1, and may be enqueued at the command queue 181.

Figure 40:
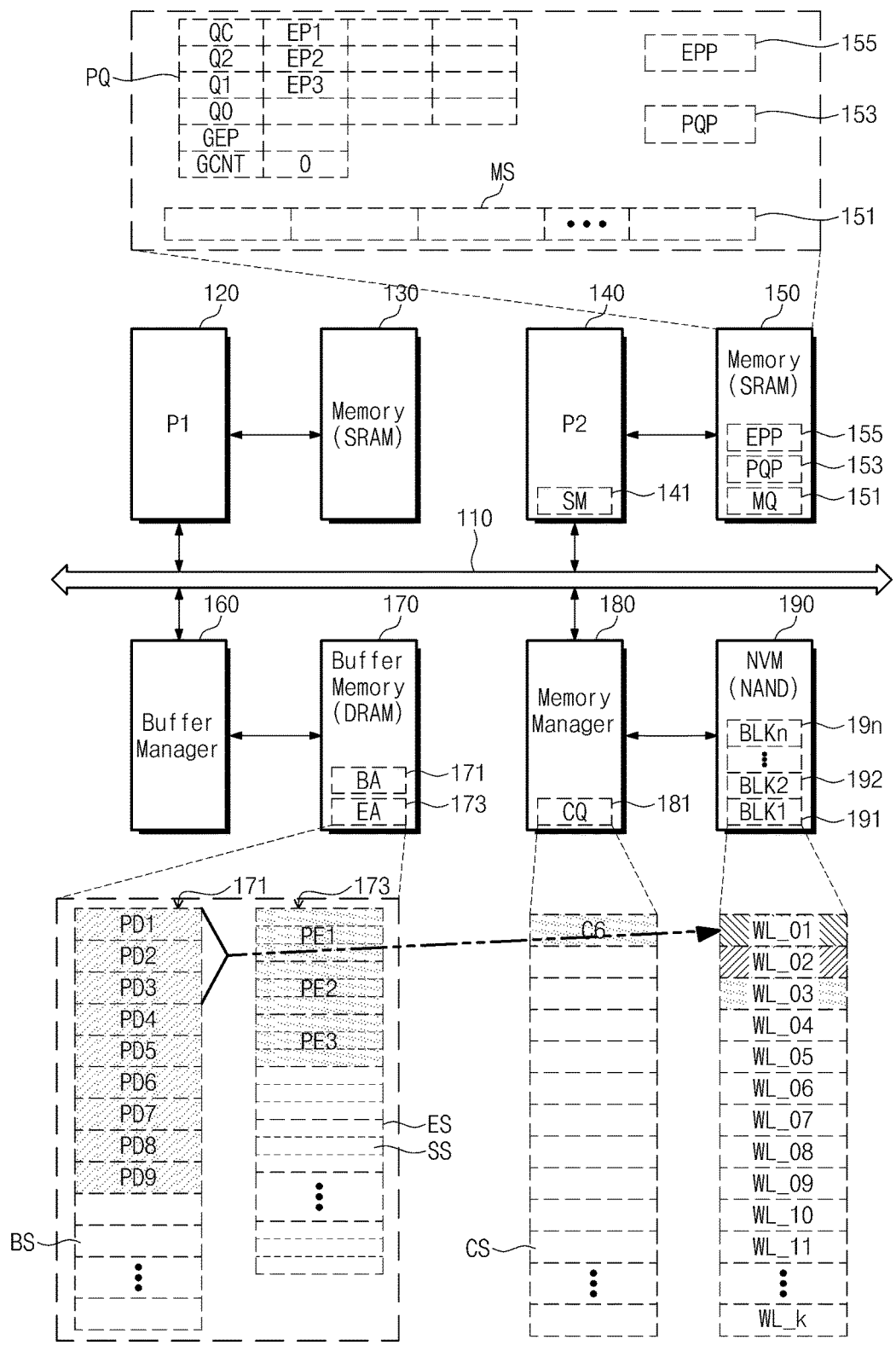

Referring to FIG. 40, as the command C6 is enqueued at the command queue 181, memory cells of the word line WL_01 directed by the program entity PE1 may be programmed based on the page data PD1, PD2, and PD3 directed by the program entity PE1. Programming according to the entity pointer EP1 or the program entity PE1 registered at the third stage Q2 of the program queue PQ is fine programming of program steps of the direct reprogram. The word line WL_01 connected to memory cells programmed by the fine programming is shown as the rectangular filled with oblique lines in a direction opposite to the oblique lines indicating coarse programmed memory cells.

As the command C6 is enqueued at the command queue 181, the entity pointer EP1 causing an enqueue of the command C6 is enqueued at a next stage QC of the program queue PQ.

Figure 41:
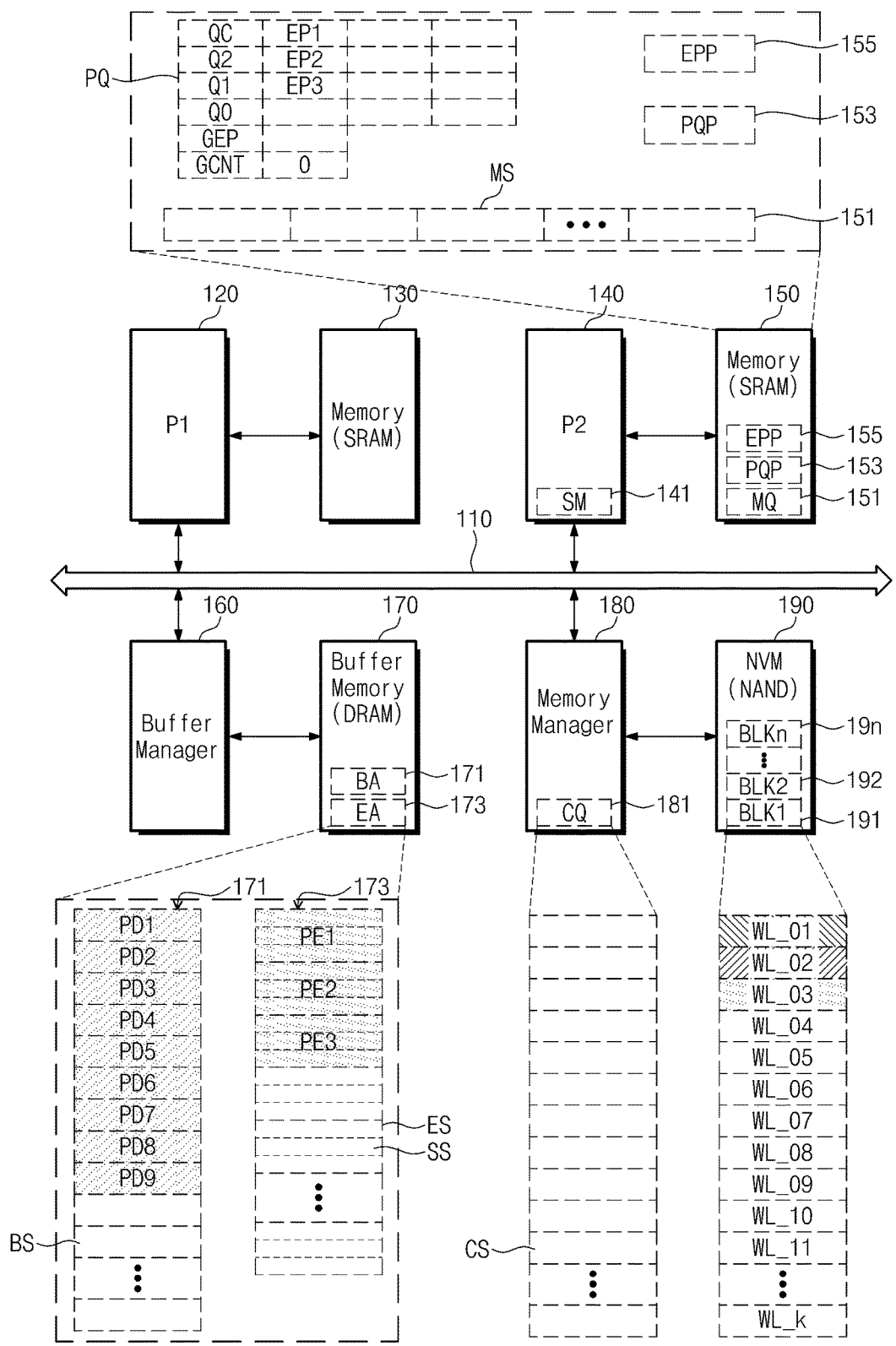

Referring to FIG. 41, if programming based on the page data PD1, PD2, and PD3 is ended, the command C6 may be released from the command queue 181. At this time, the program entity PE1 and the page data PD1, PD2, and PD3 corresponding to the command C6 may not be released.

In the event that the program queue PQ only includes basic stages Q0 to Q2 excluding an additional stage QC, the entity pointer EP1 may be released. If the entity pointer EP1 is released, the program entity PE1 and the page data PD1, PD2, and PD3 corresponding to the entity pointer EP1 may be released from a buffer memory 170.

After an operation according to the $5^{th}$ state RS5 is performed, the state machine 141 may enter into the $3^{rd}$ state RS3 or a $6^{th}$ state RS6.

In example embodiments, in a case where all page data to be programmed at the last word line WL_k of an allocated memory block in the nonvolatile memory 190 is not stored at the buffer memory 170, the state machine 141 may enter into the $3^{rd}$ state RS3. For example, as illustrated in FIG. 41, in the case that programming is performed until a third word line WL_03, the state machine 141 may wait at the 3$^{rd}$ state RS3 until all page data to be programmed at the next word line WL_04 is received.

If all page data to be programmed at the next word line WL_04 is received, at the 3$^{rd}$ state RS3, 1-step programming on the next word line WL_04 may be performed. At the 4$^{th}$ state RS4, coarse programming on the word line WL_03 may be performed. At the 5$^{th}$ state RS5, fine programming on the word line WL_02 may be performed.

That is, at the 3$^{rd}$ state RS3, page data of a word line WL_i (i being an integer less than k) may be received, and an entity pointer EPi and a program entity PEi corresponding to the word line WL_i may be generated. As the entity pointer EPi is enqueued at a first stage Q0 of the program queue PQ, 1-step programming on the word line WL_i may be performed. The entity pointer EPi may be enqueued at a second stage Q1 of the program queue PQ.

At the 4$^{th}$ state RS4, coarse programming on a word line WL_i-1 may be performed according to a first entity pointer EPi-1 registered at a second stage Q1 of the program queue PQ. The entity pointer EPi-1 may be enqueued at a third stage Q2 of the program queue PQ.

At the 5$^{th}$ state RS5, fine programming on a word line WL_i-2 may be performed according to a first entity pointer EPi-2 registered at a third stage Q2 of the program queue PQ. The entity pointer EPi-2 may be enqueued at an additional stage QC of the program queue PQ.

At the 3$^{rd}$ state RS3, page data of the last word line WL_k of the allocated memory block in the nonvolatile memory 190 may be received. An entity pointer EPk and a program entity PEk corresponding to the word line WL_k may be generated. As the entity pointer EPk is enqueued at a first stage Q0 of the program queue PQ, 1-step programming on the word line WL_k may be performed. The entity pointer EPk may be enqueued at a second stage Q1 of the program queue PQ.

At the 4$^{th}$ state RS4, coarse programming on a word line WL_k-1 may be performed according to a first entity pointer EPk-1 registered at a second stage Q1 of the program queue PQ. The entity pointer EPk-1 may be enqueued at a third stage Q2 of the program queue PQ.

At the 5$^{th}$ state RS5, fine programming on a word line WL_k-2 may be performed according to a first entity pointer EPk-2 registered at a third stage Q2 of the program queue PQ. The entity pointer EPk-2 may be enqueued at an additional stage QC of the program queue PQ.

At this state, page data corresponding to the last word line WL_k of the allocated memory block may be stored at a buffer area 171. Thus, the state machine 141 may determine the allocated memory block to be full, and may enter into the 6$^{th}$ state RS6.

At the 6$^{th}$ state RS6, coarse programming on a word line WL_k may be performed according to a first entity pointer EPk registered at a second stage Q1 of the program queue PQ. The entity pointer EPk may be enqueued at a third stage Q2 of the program queue PQ.

At the 7$^{th}$ state RS7, fine programming on a word line WL_k-1 may be performed according to a first entity pointer EPk-1 registered at a third stage Q2 of the program queue PQ. The entity pointer EPk-1 may be enqueued at an additional stage QC of the program queue PQ.

At the 8$^{th}$ state RS8, fine programming on the word line WL_k may be performed according to a first entity pointer EPk registered at a third stage Q2 of the program queue PQ. The entity pointer EPk may be enqueued at an additional stage QC of the program queue PQ.

The following table 1 may show an execution order of direct reprogram according to states of the state machine 141.

TABLE 1

| Word line | 1-step programming | Coarse programming | Fine programming |
| --- | --- | --- | --- |
| WL_k | I (RS3) | I + 3 (RS6) | I + 5 (RS8) |
| WL_k − 1 | I − 3 (RS3) | I + 1 (RS4) | I + 4 (RS7) |
| WL_k − 2 | . . . | I − 2 (RS4) | I + 2 (RS5) |
| WL_k − 3 | . . . | . . . | I − 1 (RS5) |
| . . . | . . . | . . . | . . . |
| WL_i + 2 | j + 6 (RS3) | . . . | . . . |
| WL_i + 1 | j + 3 (RS3) | j + 7 (RS4) | . . . |
| WL_i | j (RS3) | j + 4 (RS4) | j + 8 (RS5) |
| WL_i − 1 | . . . | j + 1 (RS4) | j + 5 (RS5) |
| WL_i − 2 | . . . | . . . | j + 2 (RS5) |
| . . . | . . . | . . . | . . . |
| WL_06 | 13(RS3) | . . . | . . . |
| WL_05 | 10 (RS3) | 14 (RS4) | . . . |
| WL_04 | 7 (RS3) | 11 (RS4) | 15 (RS5) |
| WL_03 | 4 (RS3) | 8 (RS4) | 12 (RS5) |
| WL_02 | 2 (RS1) | 5 (RS4) | 9 (RS5) |
| WL_01 | 1 (RS0) | 3 (RS2) | 6 (RS5) |

At the end state RSE, the program queue PQ may be released, and the allocated memory block may be closed. When the program queue PQ is released, entity pointers, program entities, and page data associated with the program queue PQ may be released.

In FIGS. 5 to 41, for a simple and distinct description of the inventive concepts, it is described an example in which programming on a word line is ended and then a program request on a next word line is received. However, a memory controller may process a plurality of requests in an asynchronous or pipeline manner.

For example, a first processor 120 may store data received from an external device (e.g., a host) at a buffer area 171 regardless of an operating state of another device in the memory controller. The first processor 120 may store data received from the external device, so long as the buffer area 171 includes an empty slot.

The first processor 120 may store a command or an address received from the external device (e.g., a host) at a message queue 151 as a message M regardless of an operating state of another device in the memory controller. The first processor 120 may register a new message M at the message queue 151, so long as the message queue 151 includes an empty slot.

A second processor 140 may sequentially process messages M stored at the message queue 151 regardless of an operating state of another device in the memory controller. The second processor 140 may sequentially process messages M stored at the message queue 151 according to a registration order of the messages M. An operation of processing a message M stored at the message queue 151 may include at least one of operations of allocating a program queue PQ, adding a message at a previously allocated program entity PE, managing a count of an entity pointer EP, and enqueuing the entity pointer EP at the program queue PQ.

The second processor 140 may sequentially process entity pointers EP registered at the program queue PQ regardless of an operating state of another device in the memory controller. The second processor 140 may operate according to a state transition diagram of FIG. 4 based on entity pointers EP registered at the program queue PQ. If a condition described with reference to a state transition diagram of FIG. 4 is satisfied, the second processor 140 may enter a next state regardless of an operating state of another device in the memory controller to perform an operation according to an entity pointer. The operation according to an entity pointer may include an operation of enqueuing a program entity PE at a command queue 181.

A memory manager 180 may sequentially process commands C registered at the command queue 181 regardless of an operating state of another device in the memory controller. The memory manager 180 may sequentially process commands C stored at the command queue 181 according to a registration order of the commands C. An operation in which the memory manager 180 processes a command C may include an operation of transferring page data stored at the buffer area 171 to a nonvolatile memory 190 or an operation of transferring a program command to the nonvolatile memory 190.

As previously mentioned, FIG. 42 is a diagram schematically illustrating a variation in threshold voltages of memory cells when 1-step programming, coarse programming and fine programming are performed. In FIG. 42, a horizontal axis indicates a threshold voltage and a vertical axis indicates the number of memory cells. That is, FIG. 42 shows threshold voltage distributions of memory cells.

Referring to FIG. 18 and a reference numeral 21 of FIG. 42, 1-step programming of a first word line WL_01 is performed. If the 1-step programming is performed, memory cells connected to the first word line WL_01 may be programmed according to LSB page data PD1 and intermediate page data PD2. The memory cells may be programmed to have an erase state and intermediate program states Q1, Q2, and Q3.

Referring to FIG. 25 and a reference numeral 22 of FIG. 42, 1-step programming of a second word line WL_02 is performed. At this time, threshold voltage distributions of memory cells connected with the first word line WL_01 may widen by influence of the coupling.

Referring to FIG. 28 and a reference numeral 23 of FIG. 42, coarse programming of the first word line WL_01 is performed. If the coarse programming is performed, memory cells connected with the first word line WL_01 may be programmed based on LSB page data, intermediate page data PD2, and MSB page data PD3. The memory cells may be programmed to have an erase state and intermediate program states P1', P2', P3', P4', P5', P6', and P7'.

Referring to FIG. 37 and a reference numeral 24 of FIG. 42, coarse programming of the second word line WL_02 is performed. At this time, threshold voltage distributions of memory cells connected with the first word line WL_01 may widen by influence of the coupling.

Referring to FIG. 40 and a reference numeral 25 of FIG. 42, fine programming of the first word line WL_01 is performed. If the fine programming is performed, memory cells connected with the first word line WL_01 is programmed based on LSB page data, intermediate page data PD2, and MSB page data PD3. The memory cells may be programmed to have an erase state and intermediate program states P1, P2, P3, P4, P5, P6, and P7.

Referring to a reference numeral 26 of FIG. 42, when fine programming of the second word line WL_02 is performed, threshold voltage distributions of memory cells connected with the first word line WL_01 may widen by influence of the coupling.

As illustrated in FIG. 42 and described previously, direct reprogram may be performed in an order of 1-step programming, coarse programming and fine programming. The 1-step programming, coarse programming and fine programming may have an increasingly improved precision in consideration of the coupling from an adjacent word line. The 1-step programming, coarse programming and fine programming may be performed based on data stored at a buffer memory 170, not data stored at a nonvolatile memory 190. Thus, when the 1-step programming, coarse programming and fine programming are sequentially performed, it is possible to prevent the coupling from an adjacent word line from being accumulated.

In example embodiments, a word line of the nonvolatile memory 190 may have three program addresses and three read addresses. The three program address may correspond to the 1-step programming, coarse programming and fine programming, respectively. At programming, the memory manager 180 may send one of the three program addresses and a program command to the nonvolatile memory 190. At reading, the memory manager 180 may send one of the three read addresses and a read command to the nonvolatile memory 190. The three read addresses may correspond to LSB, intermediate and MSB pages, respectively.

In example embodiments, a word line of the nonvolatile memory 190 may have a program address and three read addresses. At programming, the memory manager 180 may send one program address and a program command indicating 1-step programming, coarse programming or fine programming to the nonvolatile memory 190. At reading, the memory manager 180 may send one of the three read addresses and a read command to the nonvolatile memory 190. The three read addresses may correspond to LSB, intermediate and MSB pages, respectively.

Figure 43:
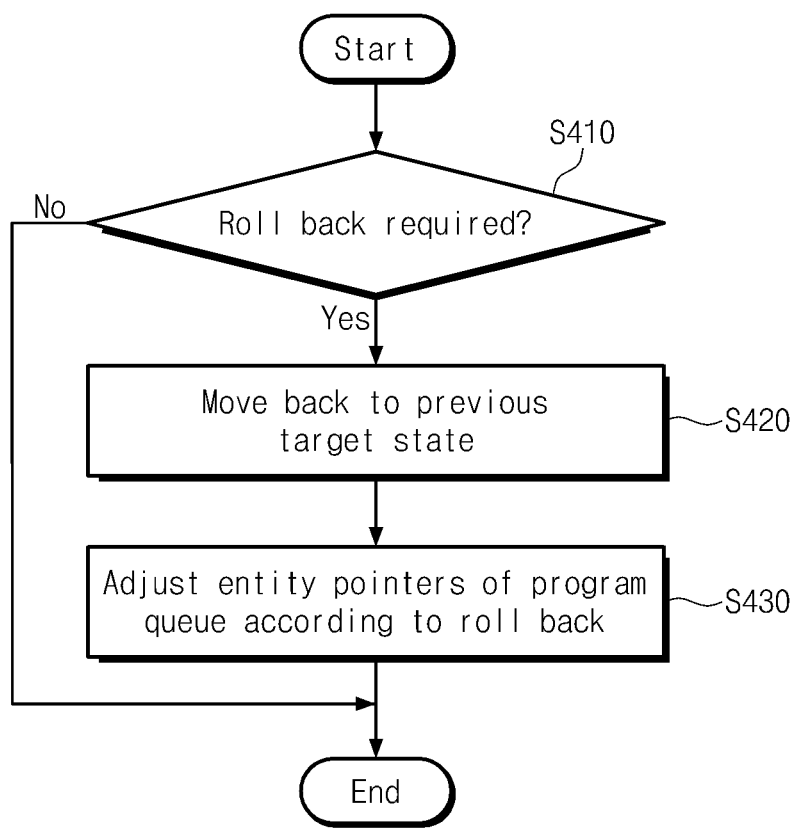
FIG. 43 is a flowchart schematically illustrating an operating method of a memory controller according to still another embodiment of the inventive concepts.

FIG. 43 is a flowchart schematically illustrating an operating method of a memory controller according to still another embodiment of the inventive concepts. In FIG. 43, there is illustrated a rollback operation in which a state machine 141 returns to a previous state from a specific state.

Referring to FIG. 43, in operation S410, whether a rollback operation is required may be determined. For example, when a program operation associated with an enqueued program command at a command queue 181 has not yet executed at a nonvolatile memory 190 and the enqueued program command is required to be cancelled, a rollback operation may be required. For example, a read request on a memory block corresponding to a program queue PQ may be generated with a plurality of commands being enqueued at the command queue 181. Programming corresponding to the commands enqueued at the command queue 181 may be stopped and the read operation requested may be performed. If the read operation requested fails, an operation of adjusting read voltage conditions or program voltage conditions of the memory block may be performed. At this time, a cancel of issued programming may be required.

In operation S420, a state of the state machine 141 may be returned to a previous target state.

In operation S430, as a state of the state machine 141 is returned, entity pointers of the program queue PQ may be adjusted to be suitable for the returned state.

In example embodiments, rollback may be sequentially performed with respect to each command stored at the command queue 181. A second processor 140 may determine whether the last command enqueued at the command queue 181 is issued to the nonvolatile memory 190. For example, the second processor 140 may determine whether an interrupt indicating that the last command is issued is received from a memory manager 180, and may determine whether the last command is issued to the nonvolatile memory 190, based on a determination result. If the last command is issued to the nonvolatile memory 190, no rollback may be performed.

If the last command is not issued to the nonvolatile memory 190, it may be released from the command queue 181. The state machine 141 may be rolled back to a state just previous to a current state. Also, the program queue PQ may be rolled back to a state just previous to a current state. The released command may be returned to a message queue 151. Afterwards, the same operation may be iterated with respect to the last command enqueued at the command queue 181.

The following table 2 may show an example of rollback executed at the state machine 141 after issuing of 1-step programming to the command queue 181 and before issuing of 1-step programming to the nonvolatile memory 190 according to FIG. 4 and the table 1. An example of canceling a command may be illustrated in table 2.

TABLE 2

| Target WL | Return state | Description |
| --- | --- | --- |
| WL_01 | RS1->RS0 | Return to state before issue of 1-step programming (RS0) of WL_01 |
| WL_02 | RS2->RS1 | Return to state before issue of 1-step programming (RS1) of WL_02 |
| WL_i | RS4->RS3 | Return to state before issue of 1-step programming (RS3) of WL_i |

The following table 3 may show an example of rollback executed at the state machine 141 after issuing of coarse programming to the command queue 181 and before issuing of coarse programming to the nonvolatile memory 190 according to FIG. 4 and the table 1. An example of canceling a command may be illustrated in table 3.

TABLE 3

| Target WL | Return state | Description |
| --- | --- | --- |
| WL_01 | RS3->RS2 | Return to state before issue of coarse programming (RS2) of WL_01 |
| WL_02 | RS5->RS4 | Return to state before issue of coarse programming (RS4) of WL_02 |
| WL_i | RS5->RS4 | Return to state before issue of coarse programming (RS4) of WL_i |
| WL_k | RS7->RS6 | Return to state before issue of coarse programming (RS6) of WL_k |

The following table 3 may show an example of rollback executed at the state machine 141 after issuing of fine programming to the command queue 181 and before issuing of fine programming to the nonvolatile memory 190 according to FIG. 4 and the table 1. An example of canceling a command may be illustrated in table 4.

TABLE 4

| Target WL | Return state | Description |
| --- | --- | --- |
| WL_01 | RS3->RS5 | Return to state before issue of fine programming (RS5) of WL_01 |
| WL_i | RS3->RS5 | Return to state before issue of fine programming (RS5) of WL_i |
| WL_k − 2 | RS6->RS5 | Return to state before issue of fine programming (RS5) of WL_k − 2 |
| WL_k − 1 | RS8->RS7 | Return to state before issue of fine programming (RS7) of WL_k − 1 |
| WL_k | RSE->RS8 | Return to state before issue of fine programming (RS8) of WL_k |

Figure 44:
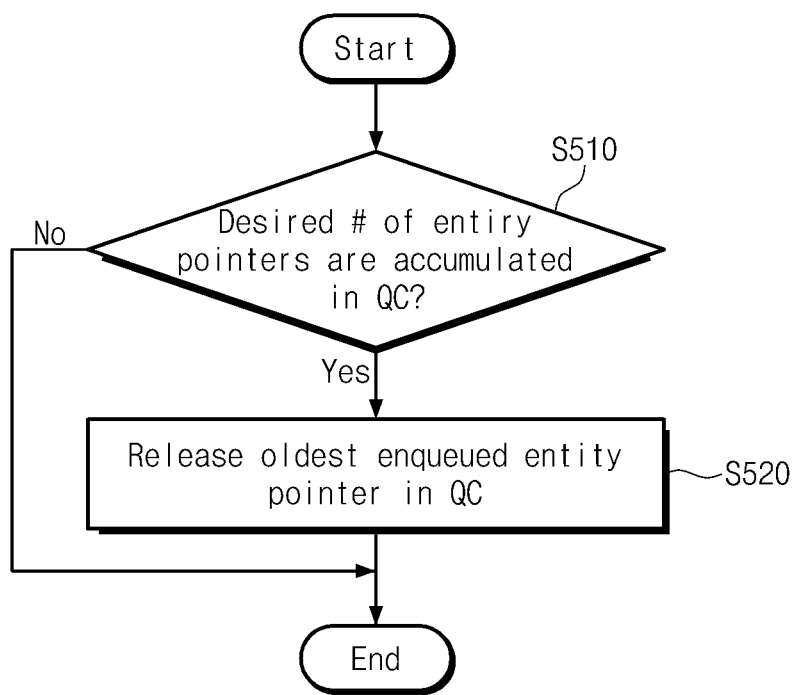
FIG. 44 is a flowchart schematically illustrating an operating method of a memory controller according to still another embodiment of the inventive concepts.

FIG. 44 is a flowchart schematically illustrating an operating method of a memory controller according to still another embodiment of the inventive concepts. In FIG. 44, there is illustrated an example in which a memory controller releases an entity pointer.

Referring to FIGS. 41 and 44, in operation S510, whether the desired (or, alternatively, predetermined) number of entity pointers is accumulated at an additional stage QC of a program queue PQ is determined. If the desired (or, alternatively, predetermined) number of entity pointers is not accumulated at the additional stage QC of the program queue PQ, no operation is performed. If the desired (or, alternatively, predetermined) number of entity pointers is accumulated at the additional stage QC of the program queue PQ, the method proceeds to operation S520. Herein, the desired (or, alternatively, predetermined) number may be the number of 2 or more.

In operation S520, the oldest entity pointer enqueued at the additional stage QC may be released. A program entity and page data stored in the buffer memory, which are associated with the released entity pointer, may be also released. That is, after an entity pointer is released from the additional stage QC, the program operation relating to the released entity pointer cannot be rolled back.

As described with reference to reference numerals 25 and 26 of FIG. 42, after fine programming on a specific word line is performed and fine programming on a word line next to the specific word line is performed, threshold voltage distributions of the specific word line may be finally stabilized. The additional stage QC may maintain the entity pointer on the specific word line until fine programming on the next word line is performed.

If the additional stage QC maintains the entity pointer on the specific word line, a first processor 120 may recognize programming on the specific word line not to be completed. Thus, when a read operation on the specific word line is requested from an external device, the first processor 120 may output data stored at a buffer memory 170 in response to the requested read operation.

If the entity pointer on the specific word line is released from the additional stage QC, a second processor 140 may provide the first processor 120 with a signal indicating that programming on the specific is completed, based on the entity pointer and information included in a program entity. Afterwards, if a read operation on the specific word line is requested from the external device, the first processor 120 may send the read request to the second processor 140. The second processor 140 may read data programmed at memory cells of the specific word line, and may output the read data to the external device through the buffer memory 170 and the host interface 125 under control of the first processor 120 and the second processor 140.

That is, if an additional stage QC is provided, reading on memory cells of a specific word line may be performed after threshold voltages of the memory cells of the specific word line are stabilized. Thus, the reliability of a memory system 100 may be improved.

In example embodiments, an entity pointer corresponding to the last word line WLk of a memory block may not be enqueued at the additional stage QC.

Figure 45:
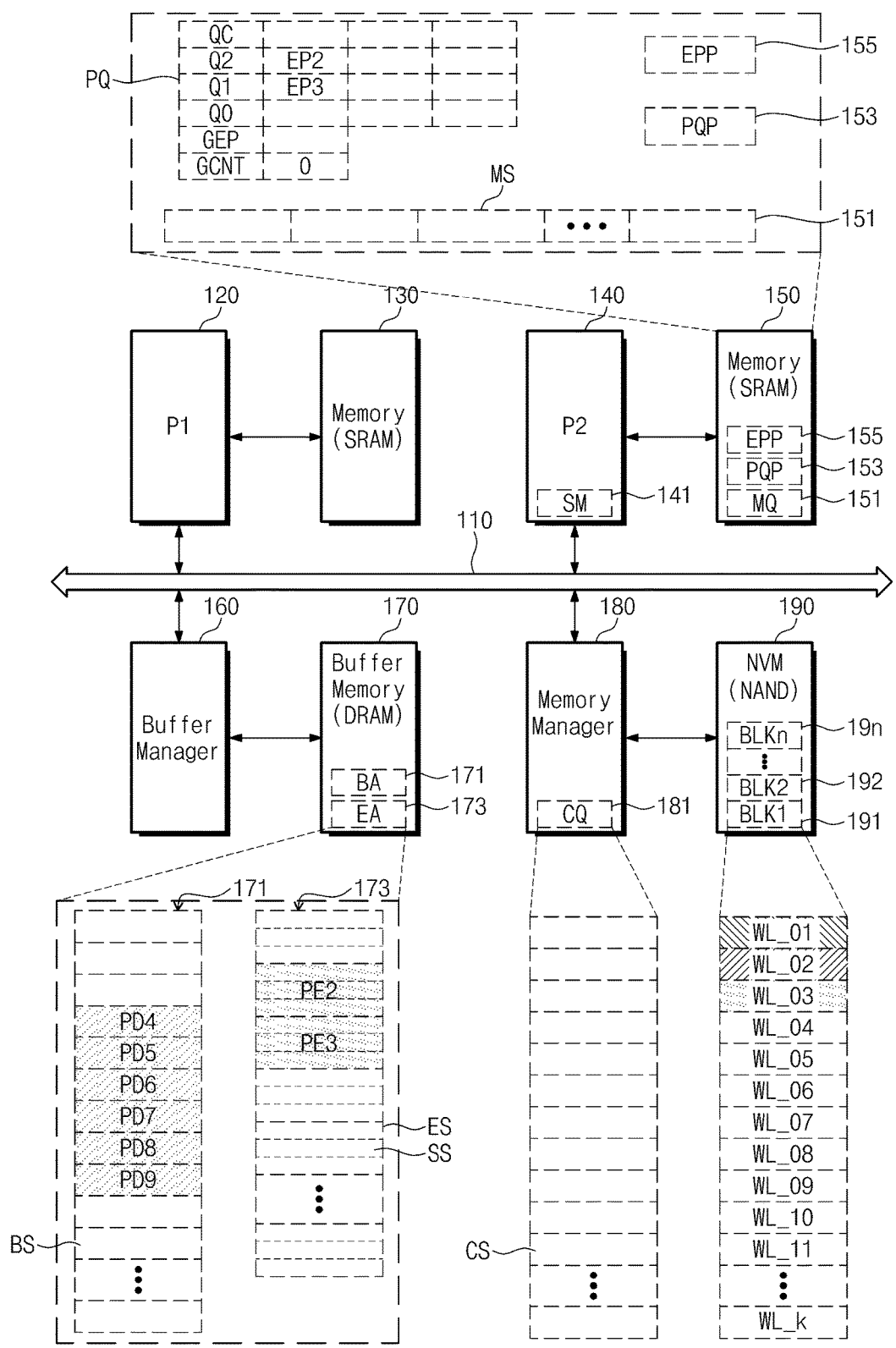
FIG. 45 is a diagram illustrating an example in which an entity pointer is released from a state of FIG. 41.

FIG. 45 is a diagram illustrating an example in which an entity pointer EP1 is released from a state of FIG. 41. Compared with FIG. 41, an entity pointer EP1 may be released from an additional stage QC. Also, a program entity PE1 and page data PD1, PD2, and PD3 corresponding to the entity pointer EP1 may be released. A storage area at which the released PD1, PD2, and PD3 is stored may be invalidated such that it is recognized as an over-writable storage area.

Figure 46:
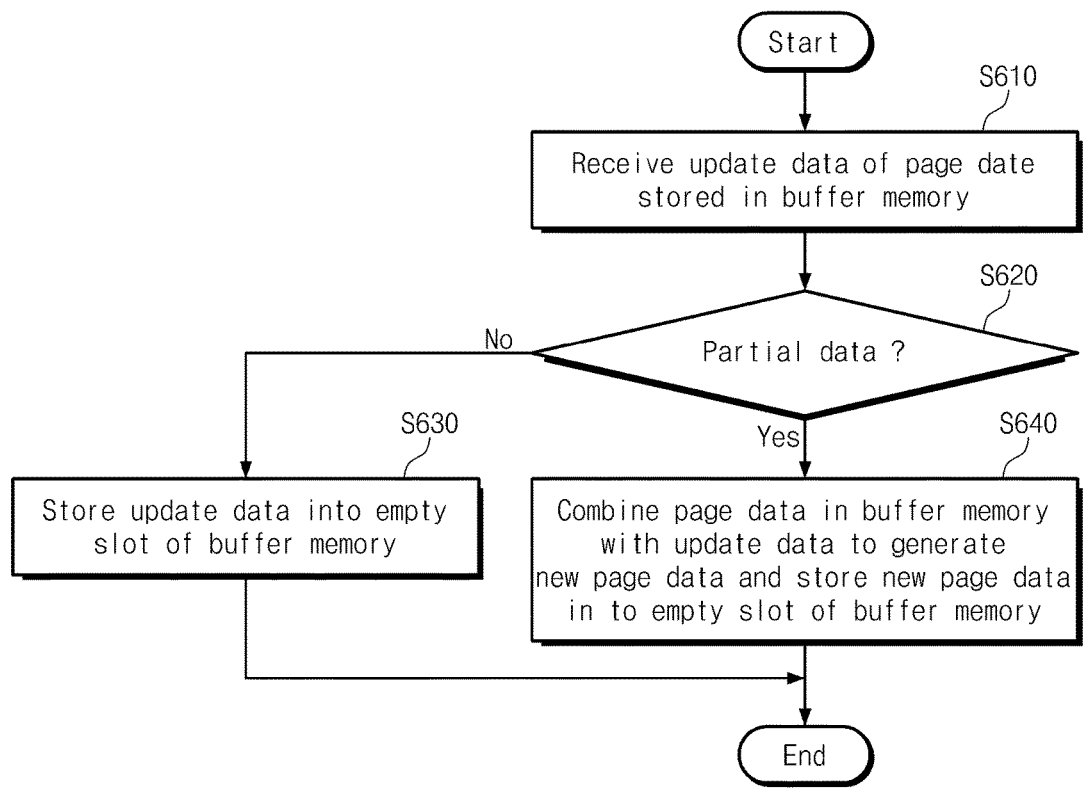
FIG. 46 is a flowchart schematically illustrating an operating method of a memory controller according to still another embodiment of the inventive concepts.

FIG. 46 is a flowchart schematically illustrating an operating method of a memory controller according to still another embodiment of the inventive concepts. In FIG. 46, there is illustrated an operating method of a memory controller when an update on page data stored at the buffer memory 170 is requested. In one embodiment, the method is executed by the second processor 140.

Referring to FIGS. 41 and 46, in operation S610, update data of page data stored at the buffer area 171 in the buffer memory 170 may be received. For example, if an address received with data from an external device (e.g., a host) is matched with an address (e.g., a logical address) of data stored at the buffer memory 170, data received from the external device may be decided to be update data.

In operation S620, whether the update data is partial data of the page data may be determined. For example, whether the update data is partial data of a page of data stored at the buffer memory 170 may be determined. For example, the second processor 140 may determine if the update data is valid and a same size as the page data. If so, the update data is not partial data of the page data. If the update data is not partial data of the page data, in operation S630, the update data may be stored at an empty buffer slot of the buffer memory 170. If the update data is partial data of the page data, the method may proceed to operation S640.

In operation S640, new page data may be generated by combining the update data and page data. The new page data may be stored at an empty buffer slot of the buffer memory 170. For example, new page data may be formed by combing the update data and the remaining data which does not corresponding to the update data and is from among original data stored at the buffer memory 170.

Figure 47:
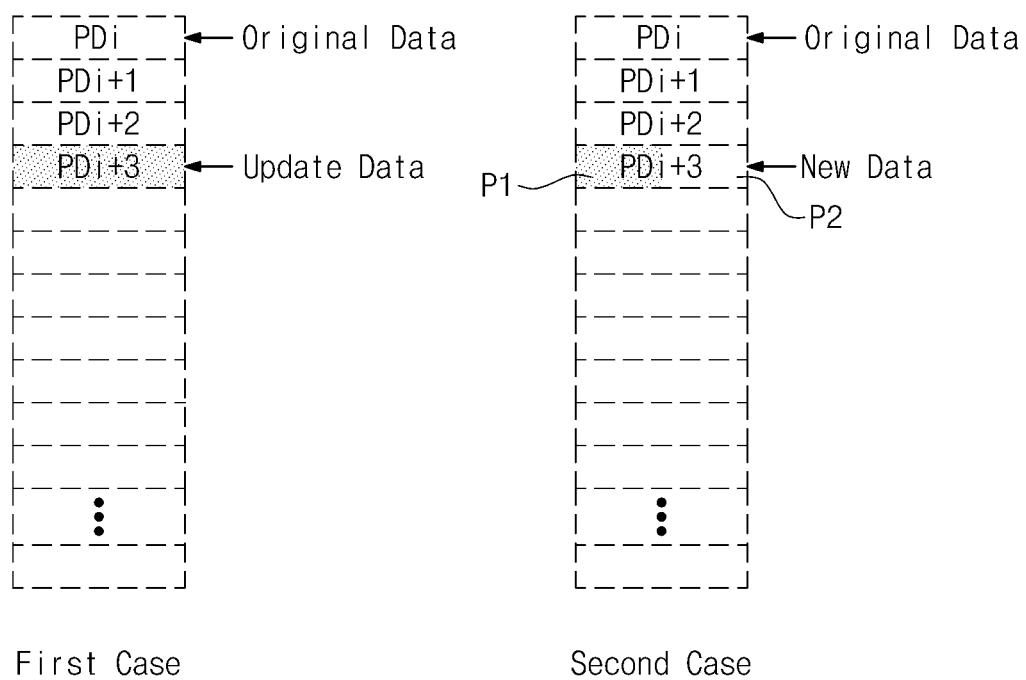
FIG. 47 is a diagram schematically illustrating an example in which update data is stored at a buffer memory according to a method of FIG. 46.

FIG. 47 is a diagram schematically illustrating an example in which update data is stored at a buffer memory 170 according to a method of FIG. 46. Referring to FIG. 47, in a first case, update data may be formed of a page of data PDi+3. In this case, the update data may be stored at a slot of a buffer memory 170.

In a second case, update data may be formed of partial data of page data. The update data may be formed of a first portion P1 of new page data PDi+3. A second portion P2 of the new page data PDi+3 may be formed by copying a portion, not corresponding to the update data, from among original data.

Figure 48:
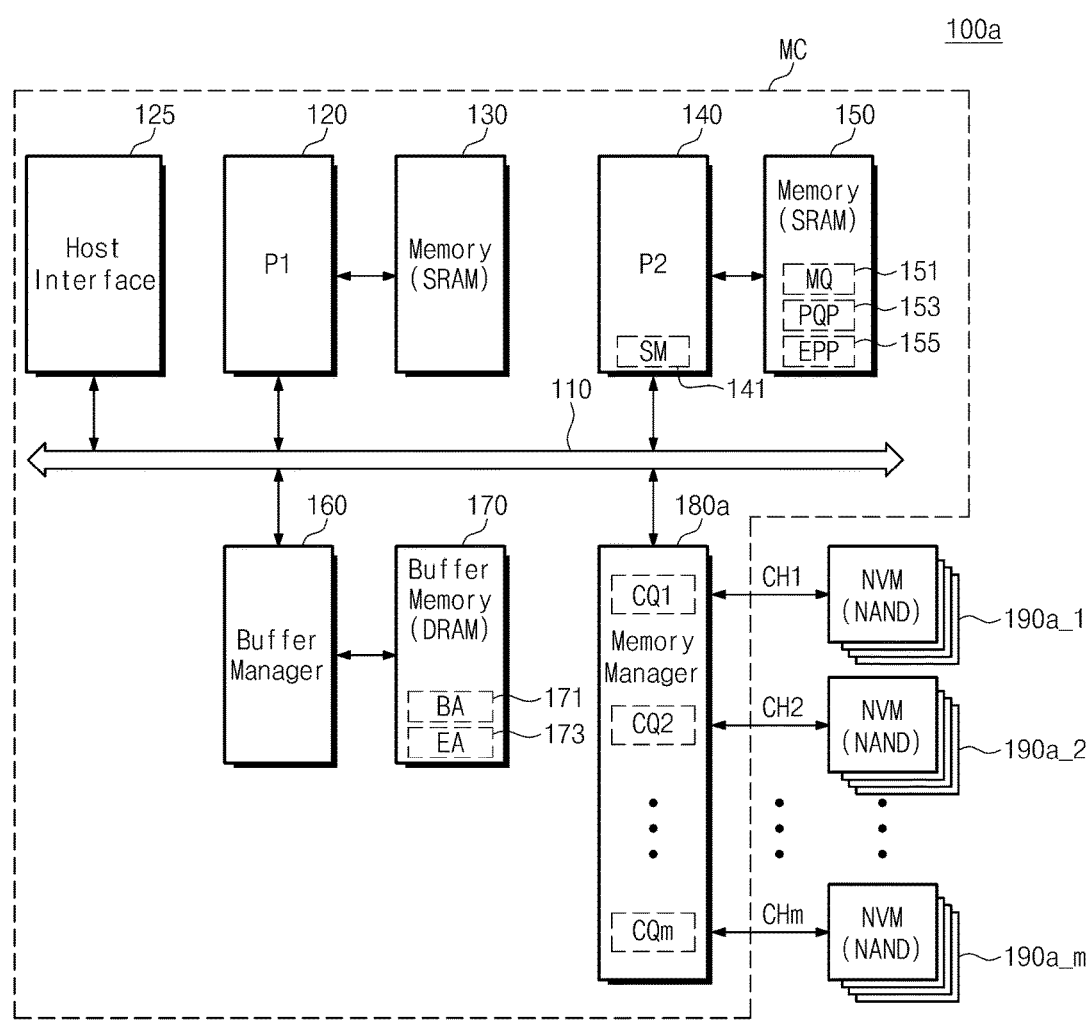
FIG. 48 is a block diagram schematically illustrating a memory system according to another embodiment of the inventive concepts.

FIG. 48 is a block diagram schematically illustrating a memory system 100a according to another embodiment of the inventive concepts. Referring to FIG. 48, a memory system 100a may include a memory controller MC, which includes a bus 110, a first processor 120, a first memory 130, a second processor 140, a second memory 150, a buffer manager 160, a buffer memory 170, a memory manager 180a. However, as will be appreciated, the buffer memory 170 may be separate from the memory controller MC. Also, the memory system 100a includes a plurality of nonvolatile memories 190a_1 to 190a_m.

The memory manager 180a may communicate with the nonvolatile memories 190a_1 to 190a_m through a plurality of channels CH1 to CHm. The channels CH1 to CHm may operate independently from each other. A plurality of nonvolatile memories may be connected with a channel.

The memory manager 180a may include a plurality of command queues CQ1 to CQm respectively corresponding to the channels CH1 to CHm. The command queues CQ1 to CQm may store commands respectively corresponding to the channels CH1 to CHm.

Figure 49:
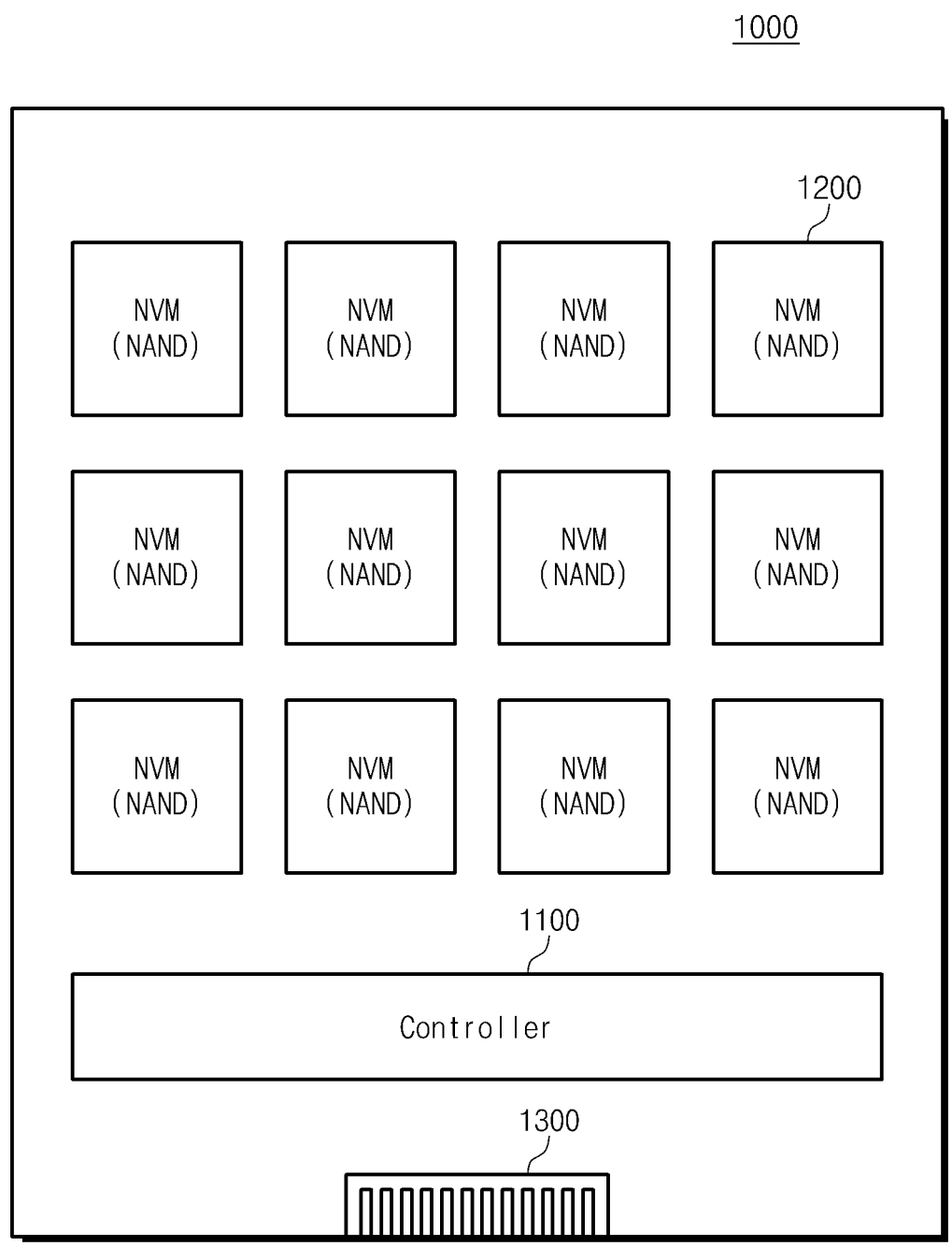
FIG. 49 is a block diagram schematically illustrating a solid state drive according to an embodiment of the inventive concepts.

FIG. 49 is a block diagram schematically illustrating a solid state drive according to an embodiment of the inventive concepts. Referring to FIG. 49, a solid state drive 1000 may include a memory controller 1100, a plurality of nonvolatile memories 1200, and a connector 1300.

The memory controller 1100 may be a memory controller described with reference to FIG. 1 or 48. The memory controller 1100 may control direct reprogram of the nonvolatile memories 1200 based on a program queue PQ.

The nonvolatile memories 1200 may include a flash memory, a phase-change RAM (PRAM), a magnetic RAM (MRAM), a resistive RAM (RRAM), a ferroelectric RAM (FRAM), and so on.

The connector 1300 may provide electric connection between the solid state drive 1000 and an external device (e.g., a host).

Figure 50:
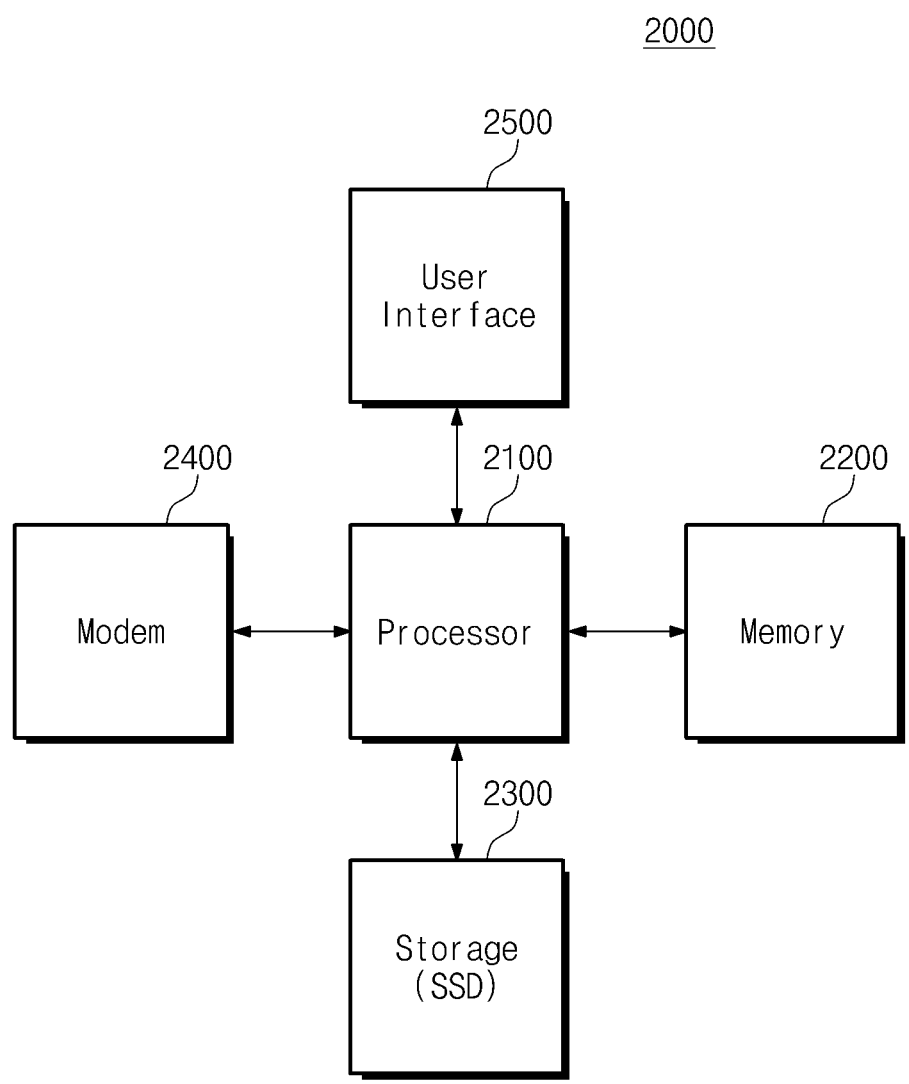
FIG. 50 is a block diagram schematically illustrating a computing device according to an embodiment of the inventive concepts.

FIG. 50 is a block diagram schematically illustrating a computing device 2000 according to an embodiment of the inventive concepts. Referring to FIG. 50, a computing device 2000 may include a processor 2100, a memory 2200, storage 2300, a modem 2400, and a user interface 2500.

The processor 2100 may control an overall operation of the computing device 2000, and may perform a logical operation. The processor 2100 may be formed of a system-on-chip (SoC). The processor 2100 may include a general purpose processor or an application processor.

The memory 2200 may communicate with the processor 2100. The memory 2200 may be a working memory (or, a main memory) of the processor 2100 or the computing device 2000. The memory 2200 may include a volatile memory such as a static RAM, a dynamic RAM, a synchronous DRAM, or the like or a nonvolatile memory such as a flash memory, a phase-change RAM (PRAM), a magnetic RAM (MRAM), a resistive RAM (RRAM), a ferroelectric RAM (FRAM), or the like.

The storage 2300 may store data which the computing device 2000 retains for a long time. The storage 2300 may include a hard disk drive or a nonvolatile memory such as a flash memory, a phase-change RAM (PRAM), a magnetic RAM (MRAM), a resistive RAM (RRAM), a ferroelectric RAM (FRAM), or the like.

The storage 2300 may include a memory system 100 or 100a described with reference to FIGS. 1 to 48. The storage 2300 may perform direct reprogram based on a program queue PQ. The storage 2300 may include a solid state drive 1000 described with reference to FIG. 49.

The modem 2400 may communicate with an external device according to a control of the processor 2100. For example, the modem 2400 may communicate with the external device in a wire or wireless manner. The modem 2400 may communicate based on at least one of wireless communications manners such as LTE (Long Term Evolution), WiMax, GSM (Global System for Mobile communication), CDMA (Code Division Multiple Access), Bluetooth, NFC (Near Field Communication), WiFi, RFID (Radio Frequency Identification, and so on or wire communications manners such as USB (Universal Serial Bus), SATA (Serial AT Attachment), SCSI (Small Computer Small Interface), Firewire, PCI (Peripheral Component Interconnection), and so on.

The user interface 2500 may communicate with a user according to a control of the processor 2100. For example, the user interface 2500 may include user input interfaces such as a keyboard, a keypad, a button, a touch panel, a touch screen, a touch pad, a touch ball, a camera, a microphone, a gyroscope sensor, a vibration sensor, and so on. The user interface 2500 may further include user output interfaces such as an LCD, an OLED (Organic Light Emitting Diode) display device, an AMOLED (Active Matrix OLED) display device, an LED, a speaker, a motor, and so on.

While the inventive concepts has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A memory system, comprising:
a non-volatile memory;
a buffer configured to store a plurality of sets of page data, and configured to store a plurality of program entities, each of the plurality of program entities associated with a different one of the plurality of sets of page data;
a processor of a memory controller configured such that at least two different program entities of the plurality of program entities are sequentially accessed, the processor configured to send commands to a memory manager of the memory controller based on the accessed program entities; and
the memory manager configured to store page data from the plurality of sets of page data in the non-volatile memory based on the commands,
wherein the processor triggers a roll back operation if a desired condition is met, the roll back operation being performed if at least one command has been sent to the memory manager and the at least one command has not been transferred to the non-volatile memory.

2. The memory system of claim 1, wherein the plurality of sets of page data includes least significant bit page data, intermediate significant bit page data and most significant bit page data.

3. The memory system of claim 1, wherein the memory manager transfers first, second and third commands to the non-volatile memory such that the non-volatile memory performs first, second and third program steps to store at least two page data into memory cells of a word line.

4. The memory system of claim 1, wherein when the roll back operation is triggered, the processor rolls back at least one program entities associated with the at least one command to previous stage.

5. The memory system of claim 1, wherein when the roll back operation is triggered, the memory manager does not transfer the at least one command to the non-volatile memory and release the at least one command.

6. The memory system of claim 1, wherein at least two page data related with the program entity are associated with memory cells of a word line.

7. The memory system of claim 1, wherein when a program entity is stored on the buffer, the processor enqueue a pointer in one stage of a plurality of stages related with the program entity.

8. The memory system of claim 7, wherein when the processor accesses the pointer, the processor sends a command to the non-volatile memory,
when the processor send a command related with the program entity to the non-volatile memory, the processor stage-up the pointer in the plurality of stages related with the program entity.

9. The memory system of claim 8, wherein the processor accesses the plurality of stages sequentially.

10. The memory system of claim 9, wherein each stage has at least two queue depth, and the processor accesses a pointer firstly enqueued in each stage.

11. The memory system of claim 8, wherein the command has a type corresponding to the one stage to which the pointer belongs.

12. The memory system of claim 8, wherein when a roll back operation is triggered, the processor detects first pointers which were staged-up upon sending first commands to the memory manager, the first commands having not been transferred to the non-volatile memory.

13. The memory system of claim 12, wherein the processor stage-down the first pointers.

14. The memory system of claim 8, wherein the plurality of stages include at least two base stages and at least one additional stage,
when the processor sends the command related with the program entity where the pointer is in top stage of the at least two base stages, the processor enqueue the pointer into the at least one additional stage and release the pointer from the at least two base stages.

15. The memory system of claim 8, wherein the pointer in the at least one additional stage does not cause sending the command.

16. A memory system, comprising:
a non-volatile memory;
a buffer configured to store a plurality of sets of page data, and configured to store a plurality of program entities, each of the plurality of program entities associated with a different one of the plurality of sets of page data;
a processor of a memory controller configured to read management information from a local memory, the memory controller including the local memory, the processor configured to access program information from the program entities and send commands based on the management information to a memory manager of the memory controller;
the memory manager configured to store page data from the plurality of sets of page data in the non-volatile memory based on the commands; and wherein
the processor is configured such that at least two different program entities of the plurality of program entities are sequentially accessed, and
wherein when a program entity is stored on the buffer, the processor enqueue a pointer in one stage of a plurality of stages related with the program entity.

17. A memory system, comprising:
a non-volatile memory;
a buffer configured to store a plurality of sets of page data, and configured to store a plurality of program entities, each of the plurality of program entities associated with a different one of the plurality of sets of page data;
a processor of a memory controller configured to read management information from a local memory, the memory controller including the local memory, the processor configured to access program information from the program entities and send commands based on the management information to a memory manager of the memory controller;
the memory manager configured to store page data from the plurality of sets of page data in the non-volatile memory based on the commands; and wherein
the processor is configured to send the commands such that (i) the memory manager programs a set of page data in a plurality of program steps, and (ii) at least two sequentially performed program steps are associated with different sets of pages data,
wherein the processor triggers a roll back operation if a desired condition is met, the roll back operation being performed if at least one command has been sent to the memory manager and the at least one command has not been transferred to the non-volatile memory.

* * * * *